US010616416B2

(12) United States Patent
Coffman et al.

(10) Patent No.: US 10,616,416 B2
(45) Date of Patent: Apr. 7, 2020

(54) USER INTERFACE FOR PHONE CALL ROUTING AMONG DEVICES

(71) Applicant: Apple Inc., Cupertino, CA (US)

(72) Inventors: Patrick L. Coffman, San Francisco, CA (US); Keith Walter Rauenbuehler, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/229,959

(22) Filed: Dec. 21, 2018

(65) Prior Publication Data

US 2019/0124203 A1    Apr. 25, 2019

Related U.S. Application Data

(63) Continuation of application No. 15/952,736, filed on Apr. 13, 2018, now Pat. No. 10,178,234, which is a
(Continued)

(51) Int. Cl.
*H04M 3/54*     (2006.01)
*G06F 3/0481*   (2013.01)
(Continued)

(52) U.S. Cl.
CPC ........ *H04M 3/543* (2013.01); *G06F 3/04817* (2013.01); *G06F 3/04842* (2013.01);
(Continued)

(58) Field of Classification Search
CPC ...... H04M 3/58; H04M 3/42263; H04M 3/54; H04M 2201/42; H04M 3/42374; H04M 3/543

See application file for complete search history.

(56) References Cited

U.S. PATENT DOCUMENTS 4,803,487 A    2/1989   Willard et al.
5,617,031 A    4/1997   Tuttle
(Continued)

FOREIGN PATENT DOCUMENTS

AU    2016100796 A4    6/2016
CA    2876587 A1       2/2014
(Continued)

OTHER PUBLICATIONS

Intention to Grant received for European Patent Application No. 12773460.6, dated Jun. 17, 2019, 4 pages.
(Continued)

*Primary Examiner* — Nafiz E Hoque
(74) *Attorney, Agent, or Firm* — Dentons US LLP

(57) ABSTRACT

A first electronic device receives a phone call that was routed to the first electronic device by a call-routing service. While receiving the call, the first electronic device receives a request to route the phone call to a second electronic device. In response to receiving the request to route the phone call to the second electronic device, in accordance with a determination that a first routing criteria have been met, the first electronic device sends a request to the call-routing service to route the phone call to the second electronic device instead of routing the phone call to the first electronic device. In accordance with a determination that a second routing criteria have been met, the first electronic device causes call data associated with the call to be routed through the first electronic device to the second electronic device.

39 Claims, 44 Drawing Sheets

Related U.S. Application Data continuation of application No. 14/503,327, filed on Sep. 30, 2014, now Pat. No. 9,967,401.

(60) Provisional application No. 62/005,990, filed on May 30, 2014.

(51) Int. Cl.
  *G06F 3/0484* (2013.01)
  *H04M 3/42* (2006.01)
  *H04M 3/58* (2006.01)
  *H04M 3/46* (2006.01)

(52) U.S. Cl.
  CPC ......... *H04M 3/42263* (2013.01); *H04M 3/54* (2013.01); *H04M 3/58* (2013.01); *H04M 3/465* (2013.01); *H04M 2201/42* (2013.01)

(56) References Cited

U.S. PATENT DOCUMENTS

| | | |
|---|---|---|
| 5,853,327 A | 12/1998 | Gilboa |
| 6,167,353 A | 12/2000 | Piernot et al. |
| 6,190,174 B1 | 2/2001 | Lam |
| 6,323,846 B1 | 11/2001 | Westerman et al. |
| 6,393,462 B1 | 5/2002 | Mullen-Schultz |
| 6,398,646 B1 | 6/2002 | Wei et al. |
| 6,515,988 B1 | 2/2003 | Eldridge et al. |
| 6,570,557 B1 | 5/2003 | Westerman et al. |
| 6,677,932 B1 | 1/2004 | Westerman |
| 6,889,138 B1 | 5/2005 | Krull et al. |
| 6,922,147 B1 | 7/2005 | Viksnins et al. |
| 7,081,905 B1 | 7/2006 | Raghunath |
| 7,130,664 B1 | 10/2006 | Williams |
| 7,305,350 B1 | 12/2007 | Bruecken |
| 7,370,244 B2 | 5/2008 | Breitling et al. |
| 7,415,720 B2 | 8/2008 | Jung |
| 7,454,192 B1 | 11/2008 | Zhu |
| 7,526,728 B2 | 4/2009 | Apparao et al. |
| 7,546,470 B2 | 6/2009 | Schultz |
| 7,614,008 B2 | 11/2009 | Ording |
| 7,633,076 B2 | 12/2009 | Huppi et al. |
| 7,644,019 B2 | 1/2010 | Woda et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,843,471 B2 | 11/2010 | Doan et al. |
| 7,844,914 B2 | 11/2010 | Andre et al. |
| 7,890,422 B1 | 2/2011 | Hirka et al. |
| 7,957,762 B2 | 6/2011 | Herz et al. |
| 8,006,002 B2 | 8/2011 | Kalayjian et al. |
| 8,042,157 B2 | 10/2011 | Bennett et al. |
| 8,050,997 B1 | 11/2011 | Nosek et al. |
| 8,060,571 B2 | 11/2011 | Rao |
| 8,077,157 B2 | 12/2011 | Sengupta et al. |
| 8,171,137 B1 | 5/2012 | Parks et al. |
| 8,195,507 B2 | 6/2012 | Postrel |
| 8,224,894 B1 | 7/2012 | Parks et al. |
| 8,225,191 B1 | 7/2012 | Kalman |
| 8,239,784 B2 | 8/2012 | Hotelling et al. |
| 8,260,879 B2 | 9/2012 | Chan |
| 8,279,180 B2 | 10/2012 | Hotelling et al. |
| 8,381,135 B2 | 2/2013 | Hotelling et al. |
| 8,386,563 B2 | 2/2013 | Parks et al. |
| 8,392,259 B2 | 3/2013 | MacGillivray et al. |
| 8,392,617 B1 | 3/2013 | Weber et al. |
| 8,434,133 B2 | 4/2013 | Kulkarni et al. |
| 8,453,940 B2 | 6/2013 | Diamond |
| 8,467,766 B2 | 6/2013 | Rackley et al. |
| 8,478,363 B2 | 7/2013 | Levien et al. |
| 8,478,816 B2 | 7/2013 | Parks et al. |
| 8,479,122 B2 | 7/2013 | Hotelling et al. |
| 8,613,070 B1 | 12/2013 | Borzycki et al. |
| 8,624,836 B1 | 1/2014 | Miller et al. |
| 8,718,556 B2 | 5/2014 | Lee et al. |
| 8,763,896 B2 | 7/2014 | Kushevsky et al. |
| 8,769,624 B2 | 7/2014 | Cotterill |
| 8,812,601 B2 | 8/2014 | Hsieh et al. |
| 8,831,677 B2 | 9/2014 | Villa-Real |
| 8,886,710 B2 | 11/2014 | Evans et al. |
| 8,892,474 B1 | 11/2014 | Inskeep et al. |
| 8,894,462 B2 | 11/2014 | Leyland et al. |
| 8,914,840 B2 | 12/2014 | Reisman |
| 8,931,703 B1 | 1/2015 | Mullen et al. |
| 9,002,322 B2 | 4/2015 | Cotterill |
| 9,095,779 B2 | 8/2015 | Chan et al. |
| 9,269,083 B1 | 2/2016 | Jarajapu et al. |
| 9,324,067 B2 | 4/2016 | Van Os et al. |
| 9,483,763 B2 | 11/2016 | Van Os et al. |
| 9,547,419 B2 | 1/2017 | Yang et al. |
| 9,574,896 B2 | 2/2017 | McGavran et al. |
| 9,680,927 B2 | 6/2017 | Knight et al. |
| 9,847,999 B2 | 12/2017 | Van Os et al. |
| 9,967,401 B2 | 5/2018 | Coffman et al. |
| 10,248,779 B2 | 4/2019 | Song et al. |
| 2001/0031622 A1 | 10/2001 | Kivela et al. |
| 2001/0039497 A1 | 11/2001 | Hubbard |
| 2002/0015024 A1 | 2/2002 | Westerman et al. |
| 2002/0029169 A1 | 3/2002 | Oki et al. |
| 2002/0059295 A1 | 5/2002 | Ludtke et al. |
| 2002/0068600 A1 | 6/2002 | Chihara et al. |
| 2002/0087262 A1 | 7/2002 | Bullock et al. |
| 2002/0142734 A1 | 10/2002 | Wickstead |
| 2003/0028639 A1 | 2/2003 | Yamamoto et al. |
| 2003/0055977 A1 | 3/2003 | Miller |
| 2003/0079057 A1 | 4/2003 | Ruskin et al. |
| 2003/0097413 A1 | 5/2003 | Vishik et al. |
| 2003/0128237 A1 | 7/2003 | Sakai |
| 2003/0171984 A1 | 9/2003 | Wodka et al. |
| 2003/0188183 A1 | 10/2003 | Lee et al. |
| 2003/0200184 A1 | 10/2003 | Dominguez et al. |
| 2003/0229900 A1 | 12/2003 | Reisman |
| 2004/0044953 A1 | 3/2004 | Watkins et al. |
| 2004/0073432 A1 | 4/2004 | Stone |
| 2004/0100389 A1 | 5/2004 | Naito et al. |
| 2004/0181695 A1 | 9/2004 | Walker |
| 2004/0242200 A1 | 12/2004 | Maeoka et al. |
| 2004/0254891 A1 | 12/2004 | Blinn et al. |
| 2005/0071188 A1 | 3/2005 | Thuerk |
| 2005/0093868 A1 | 5/2005 | Hinckley |
| 2005/0117601 A1 | 6/2005 | Anderson et al. |
| 2005/0144452 A1 | 6/2005 | Lynch et al. |
| 2005/0187873 A1 | 8/2005 | Labrou et al. |
| 2005/0190059 A1 | 9/2005 | Wehrenberg |
| 2005/0191159 A1 | 9/2005 | Benko |
| 2005/0237194 A1 | 10/2005 | Voba |
| 2006/0000900 A1 | 1/2006 | Fernandes et al. |
| 2006/0017692 A1 | 1/2006 | Wehrenberg et al. |
| 2006/0025923 A1 | 2/2006 | Dotan et al. |
| 2006/0026536 A1 | 2/2006 | Hotelling et al. |
| 2006/0033724 A1 | 2/2006 | Chaudhri et al. |
| 2006/0079973 A1 | 4/2006 | Bacharach |
| 2006/0132456 A1 | 6/2006 | Anson |
| 2006/0135064 A1 | 6/2006 | Cho et al. |
| 2006/0165060 A1 | 7/2006 | Dua |
| 2006/0185005 A1 | 8/2006 | Graves et al. |
| 2006/0197753 A1 | 9/2006 | Hotelling |
| 2006/0206709 A1 | 9/2006 | Labrou et al. |
| 2006/0217104 A1 | 9/2006 | Cho |
| 2006/0224882 A1 | 10/2006 | Chin |
| 2006/0288226 A1 | 12/2006 | Kowal |
| 2006/0294025 A1 | 12/2006 | Mengerink |
| 2007/0073649 A1 | 3/2007 | Kikkoji et al. |
| 2007/0096283 A1 | 5/2007 | Ljung et al. |
| 2007/0096765 A1 | 5/2007 | Kagan |
| 2007/0115933 A1 | 5/2007 | Muhamed et al. |
| 2007/0162963 A1 | 7/2007 | Penet et al. |
| 2007/0180492 A1 | 8/2007 | Hassan et al. |
| 2007/0186106 A1 | 8/2007 | Ting et al. |
| 2007/0188409 A1 | 8/2007 | Repetto et al. |
| 2007/0194113 A1 | 8/2007 | Esplin et al. |
| 2007/0226778 A1 | 9/2007 | Pietruszka |
| 2007/0254712 A1 | 11/2007 | Chitti |
| 2007/0283011 A1 | 12/2007 | Rakowski et al. |

(56) References Cited

U.S. PATENT DOCUMENTS

| | | |
|---|---|---|
| 2008/0011827 A1 | 1/2008 | Little et al. |
| 2008/0016368 A1 | 1/2008 | Adams |
| 2008/0016443 A1 | 1/2008 | Hiroshima et al. |
| 2008/0016537 A1 | 1/2008 | Little et al. |
| 2008/0027947 A1 | 1/2008 | Pritchett et al. |
| 2008/0040265 A1 | 2/2008 | Rackley, III et al. |
| 2008/0040786 A1 | 2/2008 | Chang |
| 2008/0041936 A1 | 2/2008 | Vawter |
| 2008/0077673 A1 | 3/2008 | Thomas |
| 2008/0114678 A1 | 5/2008 | Bennett et al. |
| 2008/0120029 A1 | 5/2008 | Zelek et al. |
| 2008/0160974 A1 | 7/2008 | Vartiainen et al. |
| 2008/0165136 A1 | 7/2008 | Christie et al. |
| 2008/0208762 A1 | 8/2008 | Arthur et al. |
| 2008/0214191 A1 | 9/2008 | Yach et al. |
| 2008/0229409 A1 | 9/2008 | Miller et al. |
| 2008/0259829 A1 | 10/2008 | Rosenblatt |
| 2008/0282202 A1 | 11/2008 | Sunday |
| 2008/0292074 A1 | 11/2008 | Boni et al. |
| 2008/0313257 A1 | 12/2008 | Allen et al. |
| 2008/0320391 A1 | 12/2008 | Lemay et al. |
| 2009/0031375 A1 | 1/2009 | Sullivan et al. |
| 2009/0036165 A1 | 2/2009 | Brede |
| 2009/0037326 A1 | 2/2009 | Chitti et al. |
| 2009/0054044 A1 | 2/2009 | Ikemori et al. |
| 2009/0057396 A1 | 3/2009 | Barbour et al. |
| 2009/0060170 A1 | 3/2009 | Coughlan et al. |
| 2009/0063851 A1 | 3/2009 | Nijdam |
| 2009/0088207 A1 | 4/2009 | Sweeney et al. |
| 2009/0094681 A1 | 4/2009 | Sadler et al. |
| 2009/0100383 A1 | 4/2009 | Sunday et al. |
| 2009/0119754 A1 | 5/2009 | Schubert |
| 2009/0122149 A1 | 5/2009 | Ishii |
| 2009/0135678 A1 | 5/2009 | Godat |
| 2009/0140960 A1 | 6/2009 | Mahowald |
| 2009/0144451 A1 | 6/2009 | Cabezas et al. |
| 2009/0158390 A1 | 6/2009 | Guan |
| 2009/0164581 A1 | 6/2009 | Bove et al. |
| 2009/0165107 A1 | 6/2009 | Tojo et al. |
| 2009/0193514 A1 | 7/2009 | Adams et al. |
| 2009/0195402 A1 | 8/2009 | Izadi et al. |
| 2009/0195497 A1 | 8/2009 | Fitzgerald et al. |
| 2009/0199130 A1 | 8/2009 | Tsern et al. |
| 2009/0199188 A1 | 8/2009 | Fujimaki |
| 2009/0203315 A1 | 8/2009 | Kawabata et al. |
| 2009/0207743 A1 | 8/2009 | Huq et al. |
| 2009/0210308 A1 | 8/2009 | Toomer et al. |
| 2009/0222748 A1 | 9/2009 | Lejeune et al. |
| 2009/0228938 A1 | 9/2009 | White et al. |
| 2009/0231960 A1 | 9/2009 | Hutcheson |
| 2009/0241169 A1 | 9/2009 | Dhand et al. |
| 2009/0244015 A1 | 10/2009 | Sengupta et al. |
| 2009/0248737 A1 | 10/2009 | Shukla et al. |
| 2009/0271744 A1 | 10/2009 | Anders, Jr. |
| 2009/0311993 A1 | 12/2009 | Horodezky |
| 2009/0325630 A1 | 12/2009 | Tiitola et al. |
| 2010/0023449 A1 | 1/2010 | Skowronek et al. |
| 2010/0042835 A1 | 2/2010 | Lee et al. |
| 2010/0082481 A1 | 4/2010 | Lin et al. |
| 2010/0107229 A1 | 4/2010 | Najafi et al. |
| 2010/0114731 A1 | 5/2010 | Kingston et al. |
| 2010/0131190 A1 | 5/2010 | Terauchi et al. |
| 2010/0149090 A1 | 6/2010 | Morris et al. |
| 2010/0153265 A1 | 6/2010 | Hershfield et al. |
| 2010/0159995 A1 | 6/2010 | Stallings et al. |
| 2010/0185446 A1 | 7/2010 | Homma et al. |
| 2010/0223145 A1 | 9/2010 | Dragt |
| 2010/0223542 A1 | 9/2010 | Vuong et al. |
| 2010/0267362 A1 | 10/2010 | Smith et al. |
| 2010/0269156 A1 | 10/2010 | Hohlfeld et al. |
| 2010/0272250 A1 | 10/2010 | Yap et al. |
| 2010/0287513 A1 | 11/2010 | Singh et al. |
| 2010/0299436 A1 | 11/2010 | Khalid et al. |
| 2011/0010470 A1 | 1/2011 | Hulbert et al. |
| 2011/0029891 A1 | 2/2011 | Kim et al. |
| 2011/0041102 A1 | 2/2011 | Kim |
| 2011/0054268 A1 | 3/2011 | Fidacaro et al. |
| 2011/0059769 A1 | 3/2011 | Brunolli |
| 2011/0065384 A1 | 3/2011 | Ceder et al. |
| 2011/0078025 A1 | 3/2011 | Shrivastav |
| 2011/0081860 A1 | 4/2011 | Brown et al. |
| 2011/0081923 A1 | 4/2011 | Forutanpour et al. |
| 2011/0088086 A1 | 4/2011 | Swink et al. |
| 2011/0099079 A1 | 4/2011 | White |
| 2011/0106671 A1 | 5/2011 | Minnis et al. |
| 2011/0138166 A1 | 6/2011 | Peszek et al. |
| 2011/0138295 A1 | 6/2011 | Momchilov et al. |
| 2011/0142234 A1 | 6/2011 | Rogers |
| 2011/0149874 A1 | 6/2011 | Reif |
| 2011/0153628 A1 | 6/2011 | Basu et al. |
| 2011/0159959 A1 | 6/2011 | Mallinson et al. |
| 2011/0179386 A1 | 7/2011 | Shaffer et al. |
| 2011/0187497 A1 | 8/2011 | Chin |
| 2011/0214158 A1 | 9/2011 | Pasquero et al. |
| 2011/0225426 A1 | 9/2011 | Agarwal et al. |
| 2011/0231914 A1 | 9/2011 | Hung |
| 2011/0250895 A1 | 10/2011 | Wohlert et al. |
| 2011/0251892 A1 | 10/2011 | Laracey |
| 2011/0275358 A1 | 11/2011 | Faenger |
| 2011/0279852 A1 | 11/2011 | Oda et al. |
| 2011/0281568 A1 | 11/2011 | Le Clech |
| 2011/0314398 A1 | 12/2011 | Yano |
| 2011/0319056 A1 | 12/2011 | Toy et al. |
| 2011/0320450 A1 | 12/2011 | Liu et al. |
| 2012/0016678 A1 | 1/2012 | Gruber et al. |
| 2012/0024947 A1 | 2/2012 | Naelon |
| 2012/0036029 A1 | 2/2012 | Esplin et al. |
| 2012/0036556 A1 | 2/2012 | Lebeau et al. |
| 2012/0040719 A1 | 2/2012 | Lee et al. |
| 2012/0044062 A1 | 2/2012 | Jersa et al. |
| 2012/0059813 A1 | 3/2012 | Sejnoha et al. |
| 2012/0078751 A1 | 3/2012 | Macphail et al. |
| 2012/0079126 A1 | 3/2012 | Evans et al. |
| 2012/0084210 A1 | 4/2012 | Farahmand |
| 2012/0089300 A1 | 4/2012 | Wolterman |
| 2012/0089507 A1 | 4/2012 | Zhang et al. |
| 2012/0096069 A1 | 4/2012 | Chan |
| 2012/0096076 A1 | 4/2012 | Chan |
| 2012/0096386 A1 | 4/2012 | Baumann et al. |
| 2012/0105358 A1 | 5/2012 | Momeyer et al. |
| 2012/0116669 A1 | 5/2012 | Lee et al. |
| 2012/0123937 A1 | 5/2012 | Spodak |
| 2012/0129496 A1 | 5/2012 | Park et al. |
| 2012/0143694 A1 | 6/2012 | Zargahi et al. |
| 2012/0191603 A1 | 7/2012 | Nuzzi |
| 2012/0192094 A1 | 7/2012 | Goertz |
| 2012/0198531 A1 | 8/2012 | Ort et al. |
| 2012/0214458 A1 | 8/2012 | Levien et al. |
| 2012/0221464 A1 | 8/2012 | Pasquero et al. |
| 2012/0223890 A1 | 9/2012 | Borovsky et al. |
| 2012/0236037 A1 | 9/2012 | Lessing et al. |
| 2012/0245985 A1 | 9/2012 | Cho et al. |
| 2012/0284297 A1 | 11/2012 | Aguera-Arcas et al. |
| 2012/0284673 A1 | 11/2012 | Lamb et al. |
| 2012/0287290 A1 | 11/2012 | Jain |
| 2012/0290449 A1 | 11/2012 | Mullen et al. |
| 2012/0290657 A1 | 11/2012 | Parks et al. |
| 2012/0290943 A1 | 11/2012 | Toney et al. |
| 2012/0297017 A1 | 11/2012 | Livshits et al. |
| 2012/0303268 A1 | 11/2012 | Su et al. |
| 2012/0310760 A1 | 12/2012 | Phillips et al. |
| 2012/0316777 A1 | 12/2012 | Kitta |
| 2012/0322370 A1 | 12/2012 | Lee |
| 2012/0322371 A1 | 12/2012 | Lee |
| 2013/0005487 A1 | 1/2013 | Frazzini et al. |
| 2013/0007203 A1 | 1/2013 | Szu |
| 2013/0027341 A1 | 1/2013 | Mastandrea |
| 2013/0031217 A1 | 1/2013 | Rajapakse |
| 2013/0041790 A1 | 2/2013 | Murugesan et al. |
| 2013/0046893 A1 | 2/2013 | Hauser et al. |
| 2013/0047034 A1 | 2/2013 | Salomon et al. |
| 2013/0047233 A1 | 2/2013 | Fisk et al. |
| 2013/0054697 A1 | 2/2013 | Cha |
| 2013/0063364 A1 | 3/2013 | Moore |

(56) References Cited

U.S. PATENT DOCUMENTS

| | | |
|---|---|---|
| 2013/0065482 A1 | 3/2013 | Trickett |
| 2013/0073286 A1 | 3/2013 | Bastea-forte et al. |
| 2013/0074194 A1 | 3/2013 | White et al. |
| 2013/0076591 A1 | 3/2013 | Sirpal et al. |
| 2013/0080177 A1 | 3/2013 | Chen |
| 2013/0080272 A1 | 3/2013 | Ronca et al. |
| 2013/0080275 A1 | 3/2013 | Ronca et al. |
| 2013/0080525 A1 | 3/2013 | Aoki et al. |
| 2013/0082819 A1 | 4/2013 | Cotterill |
| 2013/0085931 A1 | 4/2013 | Runyan |
| 2013/0086637 A1 | 4/2013 | Cotterill |
| 2013/0102281 A1 | 4/2013 | Kanda et al. |
| 2013/0102298 A1 | 4/2013 | Goodman et al. |
| 2013/0103519 A1 | 4/2013 | Kountotsis et al. |
| 2013/0106603 A1 | 5/2013 | Weast et al. |
| 2013/0110719 A1 | 5/2013 | Carter et al. |
| 2013/0115932 A1 | 5/2013 | Williams et al. |
| 2013/0120254 A1 | 5/2013 | Mun et al. |
| 2013/0124423 A1 | 5/2013 | Fisher |
| 2013/0125016 A1 | 5/2013 | Pallakoff et al. |
| 2013/0134212 A1 | 5/2013 | Chang |
| 2013/0141325 A1 | 6/2013 | Bailey |
| 2013/0141514 A1 | 6/2013 | Chao et al. |
| 2013/0145303 A1 | 6/2013 | Prakash et al. |
| 2013/0166679 A1 | 6/2013 | Kuwahara |
| 2013/0173699 A1 | 7/2013 | Parks et al. |
| 2013/0174044 A1 | 7/2013 | Hill |
| 2013/0189963 A1 | 7/2013 | Epp et al. |
| 2013/0191911 A1 | 7/2013 | Dellinger et al. |
| 2013/0200146 A1 | 8/2013 | Moghadam |
| 2013/0212212 A1 | 8/2013 | Addepalli et al. |
| 2013/0218721 A1 | 8/2013 | Borhan et al. |
| 2013/0219285 A1 | 8/2013 | Iwasaki |
| 2013/0219303 A1 | 8/2013 | Eriksson et al. |
| 2013/0222270 A1 | 8/2013 | Winkler et al. |
| 2013/0239202 A1 | 9/2013 | Adams et al. |
| 2013/0244615 A1 | 9/2013 | Miller |
| 2013/0246202 A1 | 9/2013 | Tobin |
| 2013/0254574 A1 | 9/2013 | Zacchio et al. |
| 2013/0262857 A1 | 10/2013 | Neuman et al. |
| 2013/0283199 A1 | 10/2013 | Selig et al. |
| 2013/0298024 A1 | 11/2013 | Rhee et al. |
| 2013/0304651 A1 | 11/2013 | Smith |
| 2013/0304758 A1 | 11/2013 | Gruber et al. |
| 2013/0311597 A1 | 11/2013 | Arrouye et al. |
| 2013/0311986 A1 | 11/2013 | Arrouye et al. |
| 2013/0311997 A1 | 11/2013 | Gruber et al. |
| 2013/0318158 A1 | 11/2013 | Teng et al. |
| 2013/0318249 A1 | 11/2013 | Mcdonough et al. |
| 2013/0322665 A1 | 12/2013 | Bennett et al. |
| 2013/0325967 A1 | 12/2013 | Parks et al. |
| 2013/0332162 A1 | 12/2013 | Keen |
| 2013/0332358 A1 | 12/2013 | Zhao |
| 2013/0332364 A1 | 12/2013 | Templeton et al. |
| 2013/0332560 A1 | 12/2013 | Knight et al. |
| 2013/0333006 A1 | 12/2013 | Tapling et al. |
| 2013/0339436 A1 | 12/2013 | Gray |
| 2013/0345975 A1 | 12/2013 | Vulcano et al. |
| 2013/0346068 A1 | 12/2013 | Solem et al. |
| 2013/0346273 A1 | 12/2013 | Stockton et al. |
| 2013/0346882 A1 | 12/2013 | Shiplacoff et al. |
| 2014/0003597 A1* | 1/2014 | Lazaridis ............ H04M 3/543 379/212.01 |
| 2014/0006285 A1 | 1/2014 | Chi et al. |
| 2014/0006562 A1 | 1/2014 | Handa et al. |
| 2014/0006949 A1 | 1/2014 | Briand et al. |
| 2014/0015546 A1 | 1/2014 | Frederick |
| 2014/0025513 A1 | 1/2014 | Cooke et al. |
| 2014/0032706 A1 | 1/2014 | Kuscher et al. |
| 2014/0047020 A1 | 2/2014 | Matus et al. |
| 2014/0047382 A1 | 2/2014 | Kim |
| 2014/0058860 A1 | 2/2014 | Roh et al. |
| 2014/0058935 A1 | 2/2014 | Mijares |
| 2014/0064155 A1 | 3/2014 | Evans |
| 2014/0068751 A1 | 3/2014 | Last |
| 2014/0073252 A1 | 3/2014 | Lee et al. |
| 2014/0074716 A1 | 3/2014 | Ni |
| 2014/0074717 A1 | 3/2014 | Evans |
| 2014/0075130 A1 | 3/2014 | Bansal et al. |
| 2014/0081854 A1 | 3/2014 | Sanchez et al. |
| 2014/0082136 A1 | 3/2014 | Garcia puga et al. |
| 2014/0082715 A1 | 3/2014 | Grajek et al. |
| 2014/0084857 A1 | 3/2014 | Liu et al. |
| 2014/0089196 A1 | 3/2014 | Paya et al. |
| 2014/0094124 A1 | 4/2014 | Dave et al. |
| 2014/0094143 A1 | 4/2014 | Ayotte |
| 2014/0101056 A1 | 4/2014 | Wendling |
| 2014/0122331 A1 | 5/2014 | Vaish et al. |
| 2014/0122730 A1 | 5/2014 | Burch et al. |
| 2014/0128035 A1 | 5/2014 | Sweeney |
| 2014/0129435 A1 | 5/2014 | Pardo et al. |
| 2014/0129441 A1 | 5/2014 | Blanco et al. |
| 2014/0134947 A1 | 5/2014 | Stouder-studenmund |
| 2014/0136481 A1 | 5/2014 | Quan et al. |
| 2014/0136986 A1 | 5/2014 | Martin et al. |
| 2014/0142851 A1 | 5/2014 | Larmo et al. |
| 2014/0143145 A1 | 5/2014 | Kortina et al. |
| 2014/0143737 A1 | 5/2014 | Mistry et al. |
| 2014/0149198 A1 | 5/2014 | Kim et al. |
| 2014/0149884 A1 | 5/2014 | Flynn et al. |
| 2014/0155031 A1 | 6/2014 | Lee et al. |
| 2014/0160033 A1 | 6/2014 | Brikman et al. |
| 2014/0164241 A1 | 6/2014 | Neuwirth |
| 2014/0165012 A1 | 6/2014 | Shen et al. |
| 2014/0167986 A1 | 6/2014 | Parada et al. |
| 2014/0168696 A1 | 6/2014 | Matsuhara et al. |
| 2014/0171064 A1 | 6/2014 | Das |
| 2014/0173447 A1 | 6/2014 | Das |
| 2014/0173455 A1 | 6/2014 | Shimizu et al. |
| 2014/0180582 A1 | 6/2014 | Pontarelli et al. |
| 2014/0187163 A1 | 7/2014 | Fujita |
| 2014/0188673 A1 | 7/2014 | Graham et al. |
| 2014/0189589 A1 | 7/2014 | Kim et al. |
| 2014/0191715 A1 | 7/2014 | Wechlin et al. |
| 2014/0223490 A1 | 8/2014 | Pan et al. |
| 2014/0237389 A1 | 8/2014 | Ryall et al. |
| 2014/0244495 A1 | 8/2014 | Davis et al. |
| 2014/0247229 A1 | 9/2014 | Cho et al. |
| 2014/0258292 A1 | 9/2014 | Thramann et al. |
| 2014/0279442 A1 | 9/2014 | Luoma et al. |
| 2014/0279497 A1 | 9/2014 | Qaim-maqami et al. |
| 2014/0279556 A1 | 9/2014 | Priebatsch et al. |
| 2014/0282240 A1 | 9/2014 | Flynn, III |
| 2014/0298432 A1 | 10/2014 | Brown |
| 2014/0310348 A1 | 10/2014 | Keskitalo et al. |
| 2014/0320387 A1 | 10/2014 | Eriksson et al. |
| 2014/0320425 A1 | 10/2014 | Jeong et al. |
| 2014/0325447 A1 | 10/2014 | Jin et al. |
| 2014/0337207 A1 | 11/2014 | Zhang et al. |
| 2014/0337450 A1 | 11/2014 | Choudhary et al. |
| 2014/0337931 A1 | 11/2014 | Cotterill |
| 2014/0343843 A1 | 11/2014 | Yanku |
| 2014/0344904 A1 | 11/2014 | Venkataramani et al. |
| 2014/0359140 A1 | 12/2014 | Shankarraman |
| 2014/0359454 A1 | 12/2014 | Lee et al. |
| 2014/0359481 A1 | 12/2014 | Dawson et al. |
| 2014/0359637 A1 | 12/2014 | Yan |
| 2014/0359709 A1 | 12/2014 | Nasser et al. |
| 2014/0365113 A1 | 12/2014 | Mcgavran et al. |
| 2014/0370807 A1 | 12/2014 | Lei et al. |
| 2014/0372309 A1 | 12/2014 | Shirey et al. |
| 2014/0375577 A1 | 12/2014 | Yeh et al. |
| 2014/0380187 A1 | 12/2014 | Gardenfors et al. |
| 2015/0006376 A1 | 1/2015 | Nuthulapati et al. |
| 2015/0012425 A1 | 1/2015 | Mathew |
| 2015/0012435 A1 | 1/2015 | Ramavarjula et al. |
| 2015/0017956 A1 | 1/2015 | Jeong |
| 2015/0019944 A1 | 1/2015 | Kalgi |
| 2015/0020081 A1 | 1/2015 | Cho et al. |
| 2015/0039494 A1 | 2/2015 | Sinton et al. |
| 2015/0044965 A1 | 2/2015 | Kamon et al. |
| 2015/0051846 A1 | 2/2015 | Masuya |
| 2015/0058146 A1 | 2/2015 | Gaddam et al. |
| 2015/0061972 A1 | 3/2015 | Seo et al. |

(56) References Cited

U.S. PATENT DOCUMENTS

| | | |
|---|---|---|
| 2015/0065035 A1 | 3/2015 | Kim et al. |
| 2015/0066758 A1 | 3/2015 | Denardis et al. |
| 2015/0067580 A1 | 3/2015 | Um et al. |
| 2015/0094031 A1 | 4/2015 | Liu |
| 2015/0095175 A1 | 4/2015 | Dua |
| 2015/0120545 A1 | 4/2015 | Fiore et al. |
| 2015/0121405 A1 | 4/2015 | Ekselius et al. |
| 2015/0127539 A1 | 5/2015 | Ye et al. |
| 2015/0135282 A1 | 5/2015 | Kong et al. |
| 2015/0143419 A1 | 5/2015 | Bhagwat et al. |
| 2015/0154589 A1 | 6/2015 | Li |
| 2015/0163188 A1 | 6/2015 | Faaborg et al. |
| 2015/0193069 A1 | 7/2015 | Di censo et al. |
| 2015/0193392 A1 | 7/2015 | Greenblatt et al. |
| 2015/0195133 A1 | 7/2015 | Sheets et al. |
| 2015/0199967 A1 | 7/2015 | Reddy et al. |
| 2015/0215128 A1 | 7/2015 | Pal |
| 2015/0215398 A1 | 7/2015 | Chang et al. |
| 2015/0229750 A1 | 8/2015 | Zhou et al. |
| 2015/0242611 A1 | 8/2015 | Cotterill |
| 2015/0242837 A1 | 8/2015 | Yarbrough et al. |
| 2015/0249540 A1 | 9/2015 | Khalil et al. |
| 2015/0254661 A1 | 9/2015 | Lanc |
| 2015/0257004 A1 | 9/2015 | Shanmugam et al. |
| 2015/0271120 A1 | 9/2015 | Langholz |
| 2015/0286694 A1 | 10/2015 | Kaplinger et al. |
| 2015/0295921 A1 | 10/2015 | Cao |
| 2015/0302856 A1 | 10/2015 | Kim et al. |
| 2015/0339466 A1 | 11/2015 | Gao et al. |
| 2015/0339652 A1 | 11/2015 | Park et al. |
| 2015/0347010 A1 | 12/2015 | Yang et al. |
| 2015/0348001 A1 | 12/2015 | Van Os et al. |
| 2015/0348002 A1 | 12/2015 | Van Os et al. |
| 2015/0348009 A1 | 12/2015 | Brown et al. |
| 2015/0348014 A1 | 12/2015 | Van Os et al. |
| 2015/0348029 A1 | 12/2015 | Van Os et al. |
| 2015/0350296 A1 | 12/2015 | Yang et al. |
| 2015/0350297 A1 | 12/2015 | Yang et al. |
| 2015/0350448 A1 | 12/2015 | Coffman et al. |
| 2015/0365400 A1 | 12/2015 | Cox |
| 2016/0005024 A1 | 1/2016 | Harrell |
| 2016/0006745 A1 | 1/2016 | Furuichi et al. |
| 2016/0012417 A1 | 1/2016 | Mizon |
| 2016/0014266 A1 | 1/2016 | Bhatt |
| 2016/0028869 A1 | 1/2016 | Bhatt |
| 2016/0034887 A1 | 2/2016 | Lee |
| 2016/0048705 A1 | 2/2016 | Yang |
| 2016/0050199 A1 | 2/2016 | Ganesan |
| 2016/0061613 A1 | 3/2016 | Jung et al. |
| 2016/0061623 A1 | 3/2016 | Pahwa et al. |
| 2016/0062572 A1 | 3/2016 | Yang et al. |
| 2016/0086176 A1 | 3/2016 | Silva pinto et al. |
| 2016/0092665 A1 | 3/2016 | Cowan et al. |
| 2016/0132864 A1 | 5/2016 | Barrese et al. |
| 2016/0134488 A1 | 5/2016 | Straub et al. |
| 2016/0173617 A1 | 6/2016 | Allinson |
| 2016/0238402 A1 | 8/2016 | Mcgavran et al. |
| 2016/0241543 A1 | 8/2016 | Jung et al. |
| 2016/0253665 A1 | 9/2016 | Van Os et al. |
| 2016/0259489 A1 | 9/2016 | Yang |
| 2016/0259656 A1 | 9/2016 | Sumner et al. |
| 2016/0260414 A1 | 9/2016 | Yang |
| 2016/0267779 A1 | 9/2016 | Kuang |
| 2016/0345172 A1 | 11/2016 | Cotterill |
| 2016/0358133 A1 | 12/2016 | Van Os et al. |
| 2016/0358134 A1 | 12/2016 | Van Os et al. |
| 2016/0358180 A1 | 12/2016 | Van Os et al. |
| 2016/0378961 A1 | 12/2016 | Park |
| 2017/0011210 A1 | 1/2017 | Cheong et al. |
| 2017/0032375 A1 | 2/2017 | Van Os et al. |
| 2017/0054731 A1 | 2/2017 | Cotterill |
| 2017/0083188 A1 | 3/2017 | Yang et al. |
| 2017/0160098 A1 | 6/2017 | Mcgavran et al. |
| 2017/0192730 A1 | 7/2017 | Yang et al. |
| 2017/0227935 A1 | 8/2017 | Su et al. |
| 2017/0289249 A1 | 10/2017 | Knight et al. |
| 2017/0339151 A1 | 11/2017 | Van Os et al. |
| 2017/0357973 A1 | 12/2017 | Van Os et al. |
| 2018/0109629 A1 | 4/2018 | Van Os et al. |
| 2018/0234549 A1 | 8/2018 | Coffman et al. |
| 2018/0302790 A1 | 10/2018 | Cotterill |
| 2019/0124510 A1 | 4/2019 | Cotterill et al. |
| 2019/0278900 A1 | 9/2019 | Yang et al. |
| 2019/0289079 A1 | 9/2019 | Van Os et al. |

FOREIGN PATENT DOCUMENTS

| | | |
|---|---|---|
| CN | 1452739 A | 10/2003 |
| CN | 1525723 A | 9/2004 |
| CN | 1908981 A | 2/2007 |
| CN | 101299694 A | 11/2008 |
| CN | 101341718 A | 1/2009 |
| CN | 101409743 A | 4/2009 |
| CN | 101877748 A | 11/2010 |
| CN | 102164213 A | 8/2011 |
| CN | 102209321 A | 10/2011 |
| CN | 102262506 A | 11/2011 |
| CN | 102396205 A | 3/2012 |
| CN | 102707994 A | 10/2012 |
| CN | 102737313 A | 10/2012 |
| CN | 102750086 A | 10/2012 |
| CN | 102754071 A | 10/2012 |
| CN | 103067625 A | 4/2013 |
| CN | 103139370 A | 6/2013 |
| CN | 103250138 A | 8/2013 |
| CN | 103458215 A | 12/2013 |
| CN | 103582873 A | 2/2014 |
| CN | 103853328 A | 6/2014 |
| CN | 104205785 A | 12/2014 |
| CN | 104272854 A | 1/2015 |
| CN | 104281430 A | 1/2015 |
| CN | 104346297 A | 2/2015 |
| EP | 836074 A2 | 4/1998 |
| EP | 1215575 A2 | 6/2002 |
| EP | 1357458 A2 | 10/2003 |
| EP | 1614992 A1 | 1/2006 |
| EP | 1705883 A1 | 9/2006 |
| EP | 1760584 A1 | 3/2007 |
| EP | 1858238 A2 | 11/2007 |
| EP | 2096413 A1 | 9/2009 |
| EP | 2247087 A1 | 11/2010 |
| EP | 2306692 A1 | 4/2011 |
| EP | 2341315 A1 | 7/2011 |
| EP | 2428947 A2 | 3/2012 |
| EP | 2466260 A1 | 6/2012 |
| EP | 2523439 A1 | 11/2012 |
| EP | 2632131 A1 | 8/2013 |
| EP | 2672377 A2 | 12/2013 |
| EP | 2720442 A1 | 4/2014 |
| EP | 2725473 A1 | 4/2014 |
| EP | 2725537 A1 | 4/2014 |
| EP | 2770708 A1 | 8/2014 |
| GB | 2466038 A | 6/2010 |
| GB | 2505476 A | 3/2014 |
| JP | 6-284182 A | 10/1994 |
| JP | 11-73530 A | 3/1999 |
| JP | 11-183183 A | 7/1999 |
| JP | 2000-200092 A | 7/2000 |
| JP | 2000-259477 A | 9/2000 |
| JP | 2001-331758 A | 11/2001 |
| JP | 2002-342356 A | 11/2002 |
| JP | 2003-16398 A | 1/2003 |
| JP | 2003-30245 A | 1/2003 |
| JP | 2003-346059 A | 12/2003 |
| JP | 2004-104813 A | 4/2004 |
| JP | 2004-252736 A | 9/2004 |
| JP | 2004-356816 A | 12/2004 |
| JP | 2005-521961 A | 7/2005 |
| JP | 2005-523505 A | 8/2005 |
| JP | 2006-114018 A | 4/2006 |
| JP | 2006-163960 A | 6/2006 |
| JP | 2006-197071 A | 7/2006 |
| JP | 2007-41976 A | 2/2007 |
| JP | 2007-334637 A | 12/2007 |

(56) References Cited

FOREIGN PATENT DOCUMENTS

| | | |
|---|---|---|
| JP | 2009-49878 A | 3/2009 |
| JP | 2009-239867 A | 10/2009 |
| JP | 2009-296577 A | 12/2009 |
| JP | 2009-543166 A | 12/2009 |
| JP | 2010-503082 A | 1/2010 |
| JP | 2010-245940 A | 10/2010 |
| JP | 2010-271779 A | 12/2010 |
| JP | 2011-209786 A | 10/2011 |
| JP | 2011-237857 A | 11/2011 |
| JP | 2012-508930 A | 4/2012 |
| JP | 2012-168966 A | 9/2012 |
| JP | 2013-20496 A | 1/2013 |
| JP | 2013-34322 A | 2/2013 |
| JP | 2013-506225 A | 2/2013 |
| JP | 2013-93699 A | 5/2013 |
| JP | 2013-175188 A | 9/2013 |
| JP | 2014-503861 A | 2/2014 |
| JP | 2014-44719 A | 3/2014 |
| JP | 2014-44724 A | 3/2014 |
| JP | 2015-8001 A | 1/2015 |
| JP | 2015-14923 A | 1/2015 |
| JP | 2015-501022 A | 1/2015 |
| JP | 2015-520456 A | 7/2015 |
| JP | 2015-524974 A | 8/2015 |
| JP | 2015-526776 A | 9/2015 |
| JP | 6023162 B2 | 11/2016 |
| KR | 10-2004-0049502 A | 6/2004 |
| KR | 10-0805341 B1 | 2/2008 |
| KR | 10-2008-0064395 A | 7/2008 |
| KR | 10-2011-0056561 A | 5/2011 |
| KR | 10-1253392 B1 | 4/2013 |
| KR | 10-2013-0063019 A | 6/2013 |
| KR | 10-2013-0075783 A | 7/2013 |
| KR | 10-2013-0082190 A | 7/2013 |
| KR | 10-2013-0108563 A | 10/2013 |
| KR | 10-2014-0031283 A | 3/2014 |
| KR | 10-2014-0137400 A | 12/2014 |
| KR | 10-2016-0045633 A | 4/2016 |
| KR | 10-1820573 B1 | 1/2018 |
| TW | 201012152 A | 3/2010 |
| TW | 201131471 A | 9/2011 |
| TW | 201137722 A | 11/2011 |
| TW | 201215086 A | 4/2012 |
| TW | 201316247 A | 4/2013 |
| TW | 201324310 A | 6/2013 |
| TW | 201409345 A | 3/2014 |
| TW | M474482 U | 3/2014 |
| TW | 201415345 A | 4/2014 |
| TW | 201416959 A | 5/2014 |
| TW | 201509168 A | 3/2015 |
| WO | 99/44114 A1 | 9/1999 |
| WO | 2003/083793 A2 | 10/2003 |
| WO | 2003/093765 A2 | 11/2003 |
| WO | 2005/053225 A1 | 6/2005 |
| WO | 2005/109829 A1 | 11/2005 |
| WO | 2007/000012 A1 | 1/2007 |
| WO | 2007/008321 A2 | 1/2007 |
| WO | 2007/073422 A1 | 6/2007 |
| WO | 2007/102110 A2 | 9/2007 |
| WO | 2007/105937 A1 | 9/2007 |
| WO | 2007/142703 A1 | 12/2007 |
| WO | 2007/149731 A1 | 12/2007 |
| WO | 2010/039337 A2 | 4/2010 |
| WO | 2010/056484 A2 | 5/2010 |
| WO | 2010/120972 A1 | 10/2010 |
| WO | 2010/128442 A2 | 11/2010 |
| WO | 2011/041427 A2 | 4/2011 |
| WO | 2011/063516 A1 | 6/2011 |
| WO | 2012/028773 A1 | 3/2012 |
| WO | 2012/051052 A1 | 4/2012 |
| WO | 2012/083113 A2 | 6/2012 |
| WO | 2012/126078 A1 | 9/2012 |
| WO | 2013/000150 A1 | 1/2013 |
| WO | 2013/023224 A2 | 2/2013 |
| WO | 2013/048880 A1 | 4/2013 |
| WO | 2013/097895 A1 | 7/2013 |
| WO | 2013/111239 A1 | 8/2013 |
| WO | 2013/132144 A1 | 9/2013 |
| WO | 2013/135270 A1 | 9/2013 |
| WO | 2013/169842 A2 | 11/2013 |
| WO | 2013/169875 A2 | 11/2013 |
| WO | 2013/173838 A2 | 11/2013 |
| WO | 2013/176847 A1 | 11/2013 |
| WO | 2013/177548 A1 | 11/2013 |
| WO | 2014/021967 A1 | 2/2014 |
| WO | 2014/074407 A1 | 5/2014 |
| WO | 2014/078965 A1 | 5/2014 |
| WO | 2014/115605 A1 | 7/2014 |
| WO | 2014/147297 A1 | 9/2014 |
| WO | 2014/171734 A2 | 10/2014 |
| WO | 2014/197279 A1 | 12/2014 |
| WO | 2015/062410 A1 | 5/2015 |

OTHER PUBLICATIONS

Notice of Allowance received for Chinese Patent Application No. 201780002398.4, dated Jun. 17, 2019, 2 pages (1 page of English Translation and 1 page of Official Copy).
Notice of Allowance received for Japanese Patent Application No. 2017-101107, dated Jun. 3, 2019, 5 pages (1 page of English Translation and 4 pages of Official Copy).
Office Action received for Chinese Patent Application No. 201810338038.8, dated May 14, 2019, 26 pages (13 pages of English Translation and 13 pages of Official Copy).
Office Action received for European Patent Application No. 15719347.5, dated Jun. 17, 2019, 4 pages.
Decision to Grant received for Japanese Patent Application No. 2017-075031, dated Jul. 1, 2019, 3 pages (1 page of English Translation and 2 pages of Official Copy).
Office Action received for Chinese Patent Application No. 201510288981.9, dated Jul. 1, 2019, 16 pages (8 pages of English Translation and 8 pages of Official Copy).
Office Action received for Chinese Patent Application No. 201580028505.1, dated Jun. 20, 2019, 7 pages (3 pages of English Translation and 4 pages of Official Copy).
Office Action received for Japanese Patent Application No. 2018-560107, dated Jun. 14, 2019, 26 pages (13 pages of English Translation and 13 pages of Official Copy).
Decision to Refuse received for European Patent Application No. 12770400.5, dated Nov. 8, 2018, 12 pages.
Final Office Action received for U.S. Appl. No. 14/841,455, dated Nov. 6, 2018, 14 pages.
Final Office Action received for U.S. Appl. No. 15/250,152, dated Nov. 16, 2018, 30 pages.
Intention to Grant received for European Patent Application No. 15713062.6, dated Oct. 8, 2018, 8 pages.
International Preliminary Report on Patentability received for PCT Patent Application No. PCT/US2017/031086, dated Dec. 27, 2018, 12 pages.
International Preliminary Report on Patentability received for PCT Patent Application No. PCT/US2017/032240, dated Nov. 29, 2018, 29 pages.
Minutes of the Oral Proceedings received for European Application No. 12770400.5, dated Nov. 6, 2018, 7 pages.
Non-Final Office Action received for U.S. Appl. No. 14/641,298, dated Sep. 19, 2018, 41 pages.
Non-Final Office Action received for U.S. Appl. No. 15/845,794, dated Oct. 15, 2018, 8 pages.
Non-Final Office Action received for U.S. Appli. No. 15/945,610, dated Sep. 20, 2018, 9 pages.
Notice of Allowance received for Korean Patent Application No. 10-2016-7032902, dated Sep. 7, 2018, 3 pages (1 page of English Translation and 2 pages of Official Copy).
Office Action received for Australian Patent Application No. 2015302298, dated Sep. 4, 2018, 5 pages.
Office Action received for Australian Patent Application No. 2016266010, dated Aug. 23, 2018, 4 pages.

(56) References Cited

OTHER PUBLICATIONS

Office Action received for Australian Patent Application No. 2016266010, dated Nov. 28, 2018, 5 pages.
Office Action received for Australian Patent Application No. 2017266867, dated Dec. 6, 2018, 3 pages.
Office Action received for Australian Patent Application No. 2018101014, dated Sep. 19, 2018, 4 pages.
Office Action received for Chinese Patent Application No. 201580028491.3, dated Oct. 8, 2018, 9 pages (3 pages of English Translation and 6 pages of Official Copy).
Office Action received for Chinese Patent Application No. 201780002398.4, dated Sep. 12, 2018, 17 pages (5 pages of English Translation and 12 pages of Official Copy).
Office Action Received for Danish Patent Application No. PA201670622, dated Aug. 17, 2018, 4 pages.
Office Action received for Danish Patent Application No. PA201770782, dated Nov. 22, 2018, 3 pages.
Office Action received for Japanese Patent Application No. 2017-101107, dated Sep. 7, 2018, 14 pages. (7 pages of English Translation and 7 pages of Official Copy).
Office Action received for Korean Patent Application No. 10-2016-7035555, dated Sep. 18, 2018, 9 pages (4 pages of Englsh Translation and 5 pages of Official Copy).
Office Action received for Korean Patent Application No. 10-2017-7012145, dated Sep. 13, 2018, 6 pages (3 pages of English Translation and 3 pages of Official Copy).
Office Action received for Korean Patent Application No. 10-2017-7022905, dated Oct. 22, 2018, 9 pages (4 pages of English Translation and 5 pages of official copy).
Office Action received for Korean Patent Application No. 10-2018-7033301, dated Dec. 14, 2018, 6 pages (2 pages of English Translation and 4 pages of Official Copy).
Summons to Attend Oral Proceedings received for European Patent Application No. 15711969.4, dated Oct. 22, 2018, 12 pages.
Extended European Search Report received for European Patent Application No. 19186538.5, dated Oct. 9, 2019, 10 pages.
Final Office Action received for U.S. Appl. No. 14/641,304, dated Oct. 15, 2019, 21 pages.
Notice of Allowance received for Korean Patent Application No. 10-2016-7035555, dated Sep. 23, 2019, 3 pages (1 page of English Translation and 2 pages of Official Copy).
Office Action received for Australian Patent Application No. 2018220115, dated Oct. 4, 2019, 3 pages.
Office Action received for German Patent Application No. 102015208532.5, dated Aug. 21, 2019, 15 pages (5 pages of English Translation and 10 pages of Official Copy).
Wikipedia, "QR code", Available online at: https://en.wikipedia.org/w/index.php?title=OR_code&oldid=452939488, Sep. 28, 2011, pp. 1-9.
Decision on Appeal received for U.S. Appl. No. 14/863,099, mailed on Aug. 22, 2019, 9 pages.
Notice of Allowance received for U.S. Appl. No. 16/131,767, dated Sep. 6, 2019, 7 pages.
Advisory Action received for U.S. App. No. 14/503,296, dated Oct. 2, 2015, 3 pages.
Advisory Action received for U.S. Appl. No. 14/869,877, dated Jan. 5, 2017, 3 pages.
Advisory Action received for U.S. Appl. No. 14/870,793, dated Apr. 13, 2017, 3 pages.
Advisory Action received for U.S. Appl. No. 15/137,944, dated May 11, 2017, 6 pages.
Akhgari, Ehsan, "Don't Leave a Trace: Private Browsing in Firefox", available online at "http://ehsanakhgari.org/blog/2008-11-04/dont-leave-trace-private-browsing-firefox", Nov. 4, 2008, 71 pages.
Beard, Chris, "Mozilla Labs Introducing Weave", available online at <https://blog.mozilla.org/labs/2007/12/introducing-weave/>, Dec. 21, 2007, 57 pages.
Bell, Killian, "Twitter Notifications, Icloud Tabs & Location-based Reminders Appear in Latest Os X 10.8 Beta", available online at "http://www.cultofmac.com/154522/twitter-notifications-icloud-tabs-location-based-reminders-appear-in-latest-os-x-10-8-beta/", Mar. 19, 2012, 10 pages.
Cazlar, "[ios] Mapsgps (formerly Pebbgps) is Now Available—Now with Colour Turn-by-turn Directions!", Online Available at <https://forums.pebble.com/t/ios-mapsgps-formerly-pebbgps-is-now-available-now-with-colour-turn-by-turn-directions/5584>, 2013, 31 pages.
Certification of Examination received for Australian Patent Application No. 2017100553, dated Jan. 17, 2018, 2 pages.
Chan, Christine, "Handoff Your Browser to Your Iphone or Ipad! Plus a Chance to Win a Copy!", Apr. 12, 2011, 2 pages.
Corrected Notice of Allowance received for U.S. Appl. No. 15/137,944, dated Jan. 11, 2018, 2 pages.
Corrected Notice of Allowance received for U.S. Appl. No. 15/137,944, dated Jan. 19, 2018, 2 pages.
Corrected Notice of Allowance received for U.S. Appl. No. 15/269,801, dated Oct. 3, 2017, 4 pshrd.
Corrected Notice of Allowance received for U.S. Appl. No. 15/952,736, dated Nov. 19, 2018, 2 pages.
Decision to Grant received for Danish Patent Application No. PA201570664, dated Feb. 20, 2017, 2 pages.
Decision to Grant received for Danish Patent Application No. PA201570665, dated Apr. 26, 2017, 2 pages.
Decision to Grant received for Danish Patent Application No. PA201670628, dated Nov. 20, 2017, 2 pages.
Decision to Grant received for European Patent Application No. 15724160.5, dated Jun. 14, 2018, 2 pages.
Dybwad, Barb, "Google Chrome Gets Bookmark Syncing", available online at "http://mashable.com/2009/11/02/chrome-bookmark-sync/", Nov. 3, 2009, 6 pages.
EasyVideoGuides, "Mapquest", available on: https://www.youtube.com/watch?v=7sDIDNM2bCI, Dec. 26, 2007, 4 pages.
Ehowtech, "How to Get Written Directions on a Garmin: Using a Garmin", available online at: https://www.youtube.com/watch?v=s_EKT6qH4LI, Dec. 2, 2012, 1 page.
Evaluation Report for Utility Model Patent received for Chinese Patent Application No. 201620051290.7, completed on Sep. 19, 2016, 11 pages (6 pages of English Translation and 5 pages of Official copy).
Extended European Search Report received for European Patent Application No. 13171047.7, dated Oct. 29, 2014, 8 pages.
Extended European Search Report received for European Patent Application No. 16201159.7, dated Mar. 27, 2017, 12 pages.
Extended European Search Report received for European Patent Application No. 16201195.1, dated Feb. 7, 2017, 13 pages.
Extended European Search Report received for European Patent Application No. 16201205.8, dated Jan. 5, 2017, 12 pages.
Extended European Search Report received for European Patent Application No. 16804040.0, dated Feb. 26, 2018, 9 pages.
Extended European Search Report received for European Patent Application No. 17799904.2, dated Jul. 30, 2018, 7 pages.
Extended European Search Report received for European Patent Application No. 18178147.7, dated Oct. 4, 2018, 8 pages.
Final Office Action received for U.S. Appl. No. 14/503,327, dated May 18, 2017, 10 pages.
Final Office Action received for U.S. Appl. No. 13/248,882, dated Dec. 4, 2013, 22 pages.
Final Office Action received for U.S. Appl. No. 13/492,057, dated Apr. 8, 2016, 29 pages.
Final Office Action received for U.S. Appl. No. 13/492,057, dated Mar. 30, 2015, 18 pages.
Final Office Action received for U.S. Appl. No. 14/285,378, dated Jul. 23, 2015, 19 pages.
Final Office Action received for U.S. Appl. No. 14/503,072, dated Mar. 2, 2017, 9 pages.
Final Office Action received for U.S. Appl. No. 14/503,072, dated Sep. 1, 2015, 16 pages.
Final Office Action received for U.S. Appl. No. 14/503,296, dated Jul. 2, 2015, 7 pages.
Final Office Action received for U.S. Appl. No. 14/641,289, dated Jul. 1, 2016, 32 page.
Final Office Action received for U.S. Appl. No. 14/641,298, dated Oct. 4, 2017, 30 pages.

(56) References Cited

OTHER PUBLICATIONS

Final Office Action received for U.S. Appl. No. 14/641,304, dated Jul. 24, 2018, 19 pages.
Final Office Action received for U.S. Appl. No. 14/719,217, dated Feb. 23, 2017, 37 pages.
Final Office Action received for U.S. Appl. No. 14/836,754, dated Jun. 14, 2017, 23 pages.
Final Office Action received for U.S. Appl. No. 14/839,897, dated Jan. 10, 2018, 16 pages.
Final Office Action received for U.S. Appl. No. 14/869,877, dated Aug. 3, 2016, 13 pages.
Final Office Action received for U.S. Appl. No. 14/870,726, dated Apr. 19, 2017, 17 pages.
Final Office Action received for U.S. Appl. No. 14/870,793, dated Jan. 19, 2017, 16 pages.
Final Office Action received for U.S. Appl. No. 15/128,952, dated Jul. 18, 2018, 19 pages.
Final Office Action received for U.S. Appl. No. 15/137,944, dated Feb. 27, 2017, 10 pages.
Final Office Action received for U.S. Appl. No. 14/836,754, dated Mar. 22, 2016, 17 pages.
Final Office Action received for U.S. Appl. No. 14/836,754, dated Mar. 31, 2017, 24 pages.
Final Office Action received for U.S. Appl. No. 15/250,152, dated Aug. 23, 2017, 24 pages.
Firefox Sync—Take Your Bookmarks, Tabs and Personal Information with You, Jun. 1, 2012, 3 pages.
Frakes, Dan, "How to Get Started with Airplay", available at: https://www.macworld.com/article/2039770/how-to-get-started-with-airplay.html, Macworld, May 27, 2013, 8 pages.
"G Pad", Nov. 19, 2013, 38 pages (2 pages of English Translation and 36 pges of Official copy).
Google Labs, "Google Browser Sync", available online at "https://web.archive.org/web/20120518050142/http://www.google.com/tools/firefox/browsersync/faq.html", May 18, 2012, 5 pages.
Haris, "Google Maps Navigation on Android 2.0", Sizzled Core, Online available at <http://www.sizzledcore.com/2009/10/29/google-maps-navigation-on-android-20/>, Oct. 29, 2009, 6 pages.
Intention to Grant received for Danish Patent Application No. PA201570665, dated Feb. 28, 2017, 2 pages.
Intention to Grant received for Danish Patent Application No. PA201670628, dated Aug. 28, 2017, 2 pages.
Intention to Grant received for European Patent Application No. 15724160.5, dated Mar. 7, 2018, 8 pages.
International Preliminary Report on Patentability received for PCT Patent Application No. PCT/US2012/057319, dated Apr. 10, 2014, 6 pages.
International Preliminary Report on Patentability received for PCT Patent Application No. PCT/US2012/057656, dated Apr. 10, 2014, 6 pages.
International Preliminary Report on Patentability received for PCT Patent Application No. PCT/US2013/044710, dated Dec. 18, 2014, 11 pages.
International Preliminary Report on Patentability received for PCT Patent Application No. PCT/US2015/019306, dated Dec. 15, 2016, 10 pages.
International Preliminary Report on Patentability received for PCT Patent Application No. PCT/US2015/019309, dated Dec. 15, 2016, 10 pages.
International Preliminary Report on Patentability received for PCT Patent Application No. PCT/US2015/019317, dated Dec. 15, 2016, 18 pages.
International Preliminary Report on Patentability received for PCT Patent Application No. PCT/US2015/025188, dated Mar. 2, 2017, 8 pages.
International Preliminary Report on Patentability received for PCT Patent Application No. PCT/US2015/030199, dated Dec. 15, 2016, 7 pages.
International Preliminary Report on Patentability received for PCT Patent Application No. PCT/US2015/033326, dated Dec. 8, 2016, 11 pages.
International Preliminary Report on Patentability received for PCT Patent Application No. PCT/US2015/033380, dated Dec. 8, 2016, 10 pages.
International Preliminary Report on Patentability received for PCT Patent Application No. PCT/US2015/046892, dated Mar. 16, 2017, 14 pages.
International Preliminary Report on Patentability received for PCT Patent Application No. PCT/US2015/047507, dated Mar. 16, 2017, 16 pages.
International Preliminary Report on Patentability received for PCT Patent Application No. PCT/US2015/055165, dated Sep. 21, 2017, 15 pages.
International Preliminary Report on Patentability received for PCT Patent Application No. PCT/US2016/016621, dated Aug. 24, 2017, 8 pages.
International Preliminary Report on Patentability received for PCT Patent Application No. PCT/US2016/021012, dated Sep. 21, 2017, 11 pages.
International Preliminary Report on Patentability received for PCT Patent Application No. PCT/US2016/034175, dated Dec. 14, 2017, 14 pages.
International Search Report and Written Opinion received for PCT Application No. PCT/US2015/019309, dated Jun. 25, 2015, 15 pages.
International Search Report and Written Opinion received for PCT Application No. PCT/US2015/033326, dated Aug. 10, 2015, 13 pages.
International Search Report and Written Opinion received for PCT Application No. PCT/US2015/047507, dated Feb. 22, 2016, 22 pages.
International Search Report and Written Opinion received for PCT Application No. PCT/US2015/046892, dated Jan. 27, 2016, 20 pages.
International Search Report and Written Opinion received for PCT Patent Application No. PCT/US17/31086, dated Sep. 8, 2017, 15 pages.
International Search Report and Written Opinion received for PCT Patent Application No. PCT/US2012/057319, dated Feb. 25, 2013, 7 pages.
International Search Report and Written Opinion received for PCT Patent Application No. PCT/US2012/057656, dated Feb. 25, 2013, 7 pages.
International Search Report and Written Opinion received for PCT Patent Application No. PCT/US2013/044710, dated Aug. 15, 2013, 11 pages.
International Search Report and Written Opinion received for PCT Patent Application No. PCT/US2015/019306, dated Jun. 17, 2015, 15 pages.
International Search Report and Written Opinion received for PCT Patent Application No. PCT/US2015/019317, dated Aug. 25, 2015, 24 pages.
International Search Report and Written Opinion received for PCT Patent Application No. PCT/US2015/025188, dated Jun. 23, 2015, 11 pages.
International Search Report and Written Opinion received for PCT Patent Application No. PCT/US2015/030199, dated Aug. 14, 2015, 11 pages.
International Search Report and Written Opinion received for PCT Patent Application No. PCT/US2015/033380, dated Aug. 10, 2015, 13 pages.
International Search Report and Written Opinion received for PCT Patent Application No. PCT/US2015/055165, dated Apr. 20, 2016, 22 pages.
International Search Report and Written Opinion received for PCT Patent Application No. PCT/US2016/016621, dated May 9, 2016, 12 pages.
International Search Report and Written Opinion received for PCT Patent Application No. PCT/US2016/021012, dated Jun. 2, 2016, 15 pages.

(56) References Cited

OTHER PUBLICATIONS

International Search Report and Written Opinion received for PCT Patent Application No. PCT/US2016/034175, dated Oct. 7, 2016, 17 pages.
International Search Report and Written Opinion received for PCT Patent Application No. PCT/US2017/032240, dated Sep. 21, 2017, 33 pages.
Invitation to Pay Additional Fee received for PCT Patent Application No. PCT/US17/31086, dated Jul. 14, 2017, 2 pages.
Invitation to Pay Additional Fee received for PCT Patent Application No. PCT/US17/32240, dated Jul. 12, 2017, 2 pages.
Invitation to Pay Additional Fees and Partial Search Report received for PCT Patent Application No. PCT/US2015/046892, dated Nov. 4, 2015, 5 pages.
Invitation to Pay Additional Fees received for PCT Patent Application No. PCT/US2015/019317, dated May 22, 2015, 7 pages.
Invitation to Pay Additional Fees received for PCT Patent Application No. PCT/US2015/047507, dated Jan. 4, 2016, 8 pages.
Invitation to Pay Additional Fees received for PCT Patent Application No. PCT/US2015/055165, dated Jan. 18, 2016, 6 pages.
Invitation to Pay Additional Fees received for PCT Patent Application No. PCT/US2016/034175, dated Aug. 11, 2016, 3 pages.
"iOS Security", Apr. 2015, 55 pages.
Kamijo, Noboru, "Next Generation Mobile System—Watchpad1. 5", Available at <http://researcher.ibm.com/researcher/view_group_subpage.php?id=5617>, retrieved on Jul. 4, 2015, 2 pages.
Kimura, Ryoji, "Keynote Presentation Practice Guide for ipad & iphone", K.K. Rutles, first edition, Feb. 29, 2012, 4 pages (Official copy only).
Kinect Gesture Commands—Kinect Voice Commands, 2013, 2 pages.
Mackie, Simon, "Emulate Safari's Reader Mode in Other Browsers with Readability", available online at "https://gigaom.com/2010/06/21/emulate-safaris-reader-mode-in-other-browsers-with-readability/", Jun. 21, 2010, 5 pages.
Mozilla Services, "Firefox Sync Terms of Service (for Versions Prior to Firefox 29)", available online at <https://services.mozilla.com/tos/>, Aug. 19, 2010, 4 pages.
Naver Blog, "How to Use Smart Wallet and Registered Card", Online Available at <http://feena74.blog.me/140185758401>, Mar. 29, 2013, 20 pages.
Non-Final Action received for U.S. Appl. No. 15/952,736, dated Jun. 1, 2018, 12 pages.
Non-Final Office Action received for U.S. Appl. No. 13/492,057, dated Dec. 17, 2015, 25 pages.
Non-Final Office Action received for U.S. Appl. No. 14/503,327, dated Sep. 12, 2016, 10 pages.
Non-Final Office Action received for U.S. Appl. No. 14/836,754, dated Nov. 17, 2015, 15 pages.
Non-Final Office Action received for U.S. Appl. No. 13/248,872, dated May 19, 2014, 6 pages.
Non-Final Office Action received for U.S. Appl. No. 13/248,882, dated Jul. 10, 2013, 14 pages.
Non-Final Office Action received for U.S. Appl. No. 13/492,057, dated Jul. 8, 2014, 14 pages.
Non-Final Office Action received for U.S. Appl. No. 14/285,378, dated Dec. 21, 2015, 18 pages.
Non-Final Office Action received for U.S. Appl. No. 14/285,378, dated Jan. 21, 2015, 19 pages.
Non-Final Office Action received for U.S. Appl. No. 14/503,072, dated Jan. 26, 2015, 12 pages.
Non-Final Office Action received for U.S. Appl. No. 14/503,072, dated Jun. 17, 2016, 19 pages.
Non-Final Office Action received for U.S. Appl. No. 14/503,296, dated Aug. 28, 2017, 14 pages.
Non-Final Office Action received for U.S. Appl. No. 14/503,296, dated Jan. 30, 2015, 16 pages.
Non-Final Office Action received for U.S. Appl. No. 14/503,296, dated Oct. 5, 2016, 11 pages.
Non-Final Office Action received for U.S. Appl. No. 14/503,381, dated May 13, 2015, 13 pages.
Non-Final Office Action received for U.S. Appl. No. 14/641,289, dated Jul. 16, 2015, 31 pages.
Non-Final Office Action received for U.S. Appl. No. 14/641,289, dated Mar. 11, 2016, 26 pages.
Non-Final Office Action received for U.S. Appl. No. 14/641,298, dated Mar. 6, 2017, 26 pages.
Non-Final Office Action received for U.S. Appl. No. 14/641,304, dated Sep. 11, 2017, 18 pages.
Non-Final Office Action received for U.S. Appl. No. 14/642,366, dated Aug. 24, 2015, 7 pages.
Non-Final Office Action received for U.S. Appl. No. 14/719,217, dated Jul. 26, 2018, 40 pages.
Non-Final Office Action received for U.S. Appl. No. 14/719,217, dated Jul. 28, 2016, 28 pages.
Non-Final Office Action received for U.S. Appl. No. 14/836,754, dated Aug. 16, 2017, 25 pages.
Non-Final Office Action received for U.S. Appl. No. 14/836,754, dated Oct. 21, 2016, 18 pages.
Non-Final Office Action received for U.S. Appl. No. 14/839,897, dated May 18, 2017, 11 pages.
Non-Final Office Action received for U.S. Appl. No. 14/839,903, dated Feb. 26, 2018, 10 pages.
Non-Final Office Action received for U.S. Appl. No. 14/839,913, dated Jul. 28, 2016, 12 pages.
Non-Final Office Action received for U.S. Appl. No. 14/839,913, dated Mar. 2, 2016, 11 pages.
Non-Final Office Action received for U.S. Appl. No. 14/841,455, dated Apr. 25, 2018, 13 pages.
Non-Final Office Action received for U.S. Appl. No. 14/864,011, dated Jan. 21, 2016, 10 pages.
Non-Final Office Action received for U.S. Appl. No. 14/864,011, dated Jun. 10, 2016, 10 pages.
Non-Final Office Action received for U.S. Appl. No. 14/869,877, dated Jan. 29, 2016, 18 pages.
Non-Final Office Action received for U.S. Appl. No. 14/869,877, dated Jun. 16, 2017, 17 pages.
Non-Final Office Action received for U.S. Appl. No. 14/870,726, dated Sep. 16, 2016, 12 pages.
Non-Final Office Action received for U.S. Appl. No. 14/870,793, dated Apr. 19, 2016, 17 pages.
Non-Final Office Action received for U.S. Appl. No. 15/128,952, dated Dec. 29, 2017, 13 pages.
Non-Final Office Action received for U.S. Appl. No. 15/134,638, dated Sep. 20, 2016, 6 pages.
Non-Final Office Action received for U.S. Appl. No. 15/137,944, dated Jul. 27, 2017, 13 pages.
Non-Final Office Action received for U.S. Appl. No. 15/137,944, dated Oct. 18, 2016, 10 pages.
Non-Final Office Action received for U.S. Appl. No. 15/269,801, dated Dec. 30, 2016, 17 pages.
Non-Final Office Action received for U.S. Appl. No. 15/294,439, dated Jan. 26, 2018, 18 pages.
Non-Final Office Action received for U.S. Appl. No. 15/433,238, dated Nov. 3, 2017, 6 pages.
Non-Final Office Action received for U.S. Appl. No. 15/620,666, dated Mar. 28, 2018, 14 pages.
Non-Final Office Action received for U.S. Appl. No. 14/503,364, dated Feb. 3, 2016, 16 pages.
Non-Final Office Action received for U.S. Appl. No. 15/250,152, dated Apr. 6, 2018, 31 pages.
Non-Final Office Action received for U.S. Appl. No. 15/250,152, dated Mar. 2, 2017, 26 pages.
Notice of Acceptance received for Australian Patent Application No. 2015201884, dated Oct. 4, 2016, 3 pages.
Notice of Acceptance received for Australian Patent Application No. 2015266650, dated Jan. 18, 2018, 3 pages.
Notice of Acceptance received for Australian Patent Application No. 2015266693, dated Jan. 19, 2018, 3 pages.
Notice of Acceptance received for Australian Patent Application No. 2015267671, dated Apr. 4, 2018, 3 pages.

(56) References Cited

OTHER PUBLICATIONS

Notice of Acceptance received for Australian Patent Application No. 2016230001, dated May 25, 2018, 3 pages.
Notice of Acceptance received for Australian Patent Application No. 2017201064, dated Feb. 20, 2018, 3 pages.
Notice of Allowance received for Chinese Patent Application No. 201280047459.6, dated Jan. 31, 2018, 2 pages (1 page of English Translation and 1 page of Official copy).
Notice of Allowance received for Chinese Patent Application No. 201520357381.9, dated Jul. 29, 2015, 4 pages (2 pages of English Translation and 2 pages of Official copy).
Notice of Allowance received for Chinese Patent Application No. 201520358683.8, dated Mar. 10, 2016, 5 pages (3 pages of English Translation and 2 pages of Official copy).
Notice of Allowance received for Chinese Patent Application No. 201620051290.7, dated Jun. 22, 2016, 2 pages (Official copy only).
Notice of Allowance received for Chinese Patent Application No. 201620480708.6, dated Apr. 20, 2017, 3 pages (2 pages of English Translation and 1 page of Official copy).
Notice of Allowance received for Chinese Patent Application No. 201620480846.4, dated Apr. 20, 2017, 3 pages (2 pages of English Translation and 1 page of Official copy).
Notice of Allowance received for Chinese Patent Application No. 201520364847.8, dated Nov. 5, 2015, 9 pages (7 pages of English Translation and 2 pages of Official copy).
Notice of Allowance received for Danish Patent Application No. PA201570771, dated Sep. 2, 2016, 2 pages.
Notice of Allowance received for Japanese Patent Application No. 2015-095183, dated Apr. 21, 2017, 3 pages (Official copy only).
Notice of Allowance received for Japanese Patent Application No. 2016-224508, dated Jun. 20, 2017, 3 pages (Official copy only).
Notice of Allowance received for Japanese Patent Application No. 2016-569669, dated Mar. 19, 2018, 4 pages (1 page of English Translation and 3 pages of Official copy).
Notice of Allowance received for Korean Patent Application No. 10-2015-0072162, dated Dec. 27, 2017, 4 pages (2 pages of English Translation and 2 pages of Official copy).
Notice of Allowance received for Taiwanese Patent Application No. 102120412, dated Oct. 28, 2015, 5 pages (2 pages of English Translation and 3 pages of Official copy).
Notice of Allowance received for Taiwanese Patent Application No. 104108223, dated Jan. 10, 2017, 3 pages (Official copy only).
Notice of Allowance received for Taiwanese Patent Application No. 104114953, dated Oct. 17, 2017, 3 pages (Official copy only).
Notice of Allowance received for Taiwanese Patent Application No. 104117041, dated Feb. 24, 2017, 3 pages (Official copy only).
Notice of Allowance received for Taiwanese Patent Application No. 104128700, dated Mar. 27, 2017, 3 pages (Official copy only).
Notice of Allowance received for Taiwanese Patent Application No. 104133756, dated Nov. 30, 2017, 5 pages (2 pages of English Translation and 3 pages of Official copy).
Notice of Allowance received for Taiwanese Patent Application No. 104133757, dated Jan. 18, 2017, 3 pages (Official copy only).
Notice of Allowance received for Taiwanese Patent Application No. 106144804, dated Jun. 27, 2018, 6 pages (2 pages of English Translation and 4 pages of Official copy).
Notice of Allowance received for Taiwanese Patent Application No. 104117042, dated Nov. 17, 2017, 5 pages (2 pages of English Translation and 3 pages of Official copy).
Notice of Allowance received for the U.S. Appl. No. 14/503,381, dated Dec. 16, 2015, 8 pages.
Notice of Allowance received for U.S. Appl. No. 13/248,872, dated Dec. 4, 2014, 7 pages.
Notice of Allowance received for U.S. Appl. No. 13/248,882, dated Mar. 13, 2014, 16 pages.
Notice of Allowance received for U.S. Appl. No. 13/492,057, dated Jan. 3, 2017, 5 pages.
Notice of Allowance received for U.S. Appl. No. 13/492,057, dated May 18, 2017, 3 pages.
Notice of Allowance received for U.S. Appl. No. 14/285,378, dated May 19, 2016, 10 pages.
Notice of Allowance received for U.S. Appl. No. 14/503,327, dated Mar. 22, 2018, 5 pages.
Notice of Allowance received for U.S. Appl. No. 14/503,327, dated Nov. 30, 2017, 5 pages.
Notice of Allowance received for U.S. Appl. No. 14/503,364, dated Jun. 16, 2016, 11 pages.
Notice of Allowance received for U.S. Appl. No. 14/641,289, dated Aug. 24, 2017, 6 pages.
Notice of Allowance received for U.S. Appl. No. 14/641,289, dated Dec. 12, 2017, 5 pages.
Notice of Allowance received for U.S. Appl. No. 14/642,366, dated Jan. 14, 2016, 8 pages.
Notice of Allowance received for U.S. Appl. No. 14/839,913, dated Aug. 11, 2016, 5 pages.
Notice of Allowance received for U.S. Appl. No. 14/864,011, dated Apr. 28, 2016, 5 pages.
Notice of Allowance received for U.S. Appl. No. 14/864,011, dated Oct. 5, 2016, 5 pages.
Notice of Allowance received for U.S. Appl. No. 15/134,638, dated Apr. 10, 2018, 7 pages.
Notice of Allowance received for U.S. Appl. No. 15/134,638, dated Jul. 27, 2018, 7 pages.
Notice of Allowance received for U.S. Appl. No. 15/137,944, dated Dec. 21, 2017, 8 pages.
Notice of Allowance received for U.S. Appl. No. 15/269,801, dated May 3, 2017, 6 pages.
Notice of Allowance received for U.S. Appl. No. 15/269,801, dated Sep. 7, 2017, 5 pages.
Notice of Allowance received for U.S. Appl. No. 15/952,736, dated Sep. 11, 2018, 16 pages.
NPASQUA, "Maps: Ability to Swipe Step by Step in Turn-by-turn Mode", 2012, Apple Support Communities, https://discussions.apple.com/thread/4424256?start=O&tstart=0, Oct. 12, 2012, 4 pages.
Oates, Nathan, "Pebbgps", Available online at:- https://pebble.devpost.com/submissions/21694-pebbgps, Mar. 16, 2014, 2 pages.
Office Action received for Australian Patent Application No. 2015201884, dated Oct. 12, 2015, 4 pages.
Office Action received for Australian Patent Application No. 2015100490, dated Jun. 9, 2015, 6 pages.
Office Action received for Australian Patent Application No. 2015100490, dated Dec. 15, 2016, 2 pages.
Office Action received for Australian Patent Application No. 2015100708, dated Sep. 8, 2015, 4 pages.
Office Action received for Australian Patent Application No. 2015100709, dated Sep. 9, 2015 (examination Report 1), 4 pages.
Office Action received for Australian Patent Application No. 2015100709, dated Sep. 9, 2015 (examination Report 2), 4 pages.
Office Action received for Australian Patent Application No. 2015266650, dated Apr. 10, 2017, 4 pages.
Office Action received for Australian Patent Application No. 2015266693, dated Apr. 10, 2017, 4 pages.
Office Action received for Australian Patent Application No. 2015267671, dated Apr. 5, 2017, 2 pages.
Office Action received for Australian Patent Application No. 2015302298, dated Apr. 4, 2018, 3 pages.
Office Action received for Australian Patent Application No. 2015302298, dated Jul. 20, 2018, 3 pages.
Office Action received for Australian Patent Application No. 2015302298, dated Sep. 14, 2017, 3 pages.
Office Action received for Australian Patent Application No. 2015385757, dated Sep. 11, 2017, 3 pages.
Office Action received for Australian Patent Application No. 2016100155, dated May 4, 2016, 7 pages.
Office Action received for Australian Patent Application No. 2016100367, dated May 25, 2016, 3 pages.
Office Action received for Australian Patent Application No. 2016100367, dated Oct. 26, 2016, 3 pages.
Office Action received for Australian Patent Application No. 2016100383, dated Jun. 9, 2016, 2 pages.
Office Action received for Australian Patent Application No. 2016100383, dated Nov. 11, 2016, 3 pages.

(56) References Cited

OTHER PUBLICATIONS

Office Action received for Australian Patent Application No. 2016100796, dated Aug. 26, 2016, 6 pages.
Office Action received for Australian Patent Application No. 2016100796, dated Feb. 13, 2017, 4 pages.
Office Action received for Australian Patent Application No. 2016230001, dated Feb. 7, 2018, 3 pages.
Office Action received for Australian Patent Application No. 2016266010, dated May 4, 2018, 4 pages.
Office Action received for Australian Patent Application No. 2016266010, dated Nov. 30, 2017, 5 pages.
Office Action received for Australian Patent Application No. 2017100070, dated Mar. 16, 2017, 6 pages.
Office Action received for Australian Patent Application No. 2017100231, dated Apr. 13, 2017, 3 pages.
Office Action received for Australian Patent Application No. 2017100553, dated Aug. 4, 2017, 5 pages.
Office Action received for Australian Patent Application No. 2017101375, dated Dec. 1, 2017, 3 pages.
Office Action received for Australian Patent Application No. 2017101375, dated Feb. 19, 2018, 4 pages.
Office Action received for Australian Patent Application No. 2017101563, dated Jan. 22, 2018, 2 pages.
Office Action received for Australian Patent Application No. 2017101563, dated Jun. 26, 2018, 3 pages.
Office Action received for Australian Patent Application No. 2017201064, dated Mar. 9, 2017, 2 pages.
Office Action received for Australian Patent Application No. 2017201068, dated Jan. 17, 2018, 5 pages.
Office Action received for Australian Patent Application No. 2017201068, dated Mar. 10, 2017, 2 pages.
Office Action received for Chinese Patent Application No. 201510288981.9, dated Jul. 3, 2018, 19 pages (8 pages of English Translation and 11 pages of Official copy).
Office Action received for Chinese Patent Application No. 201520358683.8, dated Sep. 2, 2015, 4 pages (2 pages of English Translation and 2 pages of Official copy).
Office Action received for Chinese Patent Application No. 201620119869.2, dated Jun. 3, 2016, 2 pages (1 page of English Translation and 1 page of Official copy).
Office Action received for Chinese Patent Application No. 201620119869.2, dated Nov. 22, 2016, 2 pages (Official copy only).
Office Action received for Chinese Patent Application No. 201620480708.6, dated Jan. 9, 2017, 3 pages (1 page of English Translation and 2 pages of Official copy).
Office Action received for Chinese Patent Application No. 201620480708.6, dated Sep. 14, 2016, 3 pages (1 page of English Translation and 2 pages of Official copy).
Office Action received for Chinese Patent Application No. 201620480846.4, dated Jan. 9, 2017, 3 pages (1 page of English Translation and 2 pages of Official copy).
Office Action received for Chinese Patent Application No. 201620480846.4, dated Sep. 14, 2016, 3 pages (1 page of English Translation and 2 pages of Official copy).
Office Action received for Chinese Patent Application No. 201620509515.9, dated Nov. 9, 2016, 2 pages (1 page of English Translation and 1 page of Official copy).
Office Action received for Danish Patent Application No. PA201570256, dated Jul. 7, 2015, 2 pages.
Office Action received for Danish Patent Application No. PA201570256, dated Mar. 17, 2016, 5 pages.
Office Action received for Danish Patent Application No. PA201570256, dated May 23, 2017, 3 pages.
Office Action received for Danish Patent Application No. PA201570256, dated Oct. 10, 2016, 3 pages.
Office Action received for Danish Patent Application No. PA201570664, dated Dec. 14, 2016, 2 pages.
Office Action received for Danish Patent Application No. PA201570664, dated Jun. 3, 2016, 3 pages.
Office Action received for Danish Patent Application No. PA201570664, dated Mar. 15, 2016, 10 pages.
Office Action received for Danish Patent Application No. PA201570665, dated Mar. 31, 2016, 9 pages.
Office Action received for Danish Patent Application No. PA201570665, dated Sep. 5, 2016, 3 pages.
Office Action received for Danish Patent Application No. PA201570771, dated Jun. 13, 2016, 3 pages.
Office Action received for Danish Patent Application No. PA201570771, dated Mar. 17, 2016, 8 pages.
Office Action received for Danish Patent Application No. PA201570773, dated Feb. 15, 2017, 3 pages.
Office Action received for Danish Patent Application No. PA201570773, dated Mar. 18, 2016, 9 pages.
Office Action received for Danish Patent Application No. PA201570773, dated Sep. 12, 2016, 3 pages.
Office Action received for Danish Patent Application No. PA201670074, dated Apr. 7, 2016, 8 pages.
Office Action received for Danish Patent Application No. PA201670074, dated Jun. 28, 2016, 5 pages.
Office Action received for Danish Patent Application No. PA201670074, dated Mar. 16, 2017, 2 pages.
Office Action received for Danish Patent Application No. PA201670362, dated Jan. 29, 2018, 3 pages.
Office Action received for Danish Patent Application No. PA201670362, dated Jun. 1, 2017, 6 pages.
Office Action received for Danish Patent Application No. PA201670362, dated Nov. 21, 2016, 11 pages.
Office Action received for Danish Patent Application No. PA201670622, dated May 30, 2017, 4 pages.
Office Action received for Danish Patent Application No. PA201670622, dated Nov. 1, 2017, 5 pages.
Office Action received for Danish Patent Application No. PA201670622, dated Oct. 31, 2016, 11 pages.
Office Action received for Danish Patent Application No. PA201670628, dated Jun. 6, 2017, 3 pages.
Office Action received for Danish Patent Application No. PA201670628, dated Oct. 26, 2016, 7 pages.
Office Action received for Danish Patent Application No. PA201670749, dated Jan. 30, 2017, 11 pages.
Office Action received for Danish Patent Application No. PA201670749, dated Oct. 3, 2017, 3 pages.
Office Action received for Danish Patent Application No. PA201670751, dated Jan. 13, 2017, 9 pages.
Office Action received for Danish Patent Application No. PA201670751, dated Nov. 13, 2017, 2 pages.
Office Action received for Danish Patent Application No. PA201770782, dated Jan. 26, 2018, 8 pages.
Office Action received for European Patent Application No. 12770400.5, dated Mar. 10, 2015, 5 pages.
Office Action received for European Patent Application No. 12773460.6, dated Feb. 19, 2018, 6 pages.
Office Action received for European Patent Application No. 13171047.7, dated May 24, 2017, 7 pages.
Office Action received for European Patent Application No. 15711969.4, dated Nov. 17, 2017, 9 pages.
Office Action received for European Patent Application No. 15713062.6, dated Dec. 6, 2017, 7 pages.
Office Action received for European Patent Application No. 15727291.5, dated Jan. 15, 2018, 8 pages.
Office Action received for European Patent Application No. 15728352.4, dated Jan. 25, 2018, 10 pages.
Office Action received for European Patent Application No. 16201195.1, dated Feb. 14, 2018, 12 pages.
Office Action received for European Patent Application No. 16201205.8, dated Feb. 16, 2018, 12 pages.
Office Action received for German Patent Application No. 202015004267.8, dated Nov. 4, 2015, 4 pages (3 pages of English Translation and 1 page of Official copy).
Office Action received for Hong Kong Patent Application No. 151051633, dated Jun. 5, 2015, 11 pages (Official copy only).

(56) References Cited

OTHER PUBLICATIONS

Office Action received for Japanese Patent Application No. 2015095183, dated Jun. 3, 2016, 13 pages (6 pages of English Translation and 7 pages of Official copy).
Office Action received for Japanese Patent Application No. 2016-224507, dated Dec. 1, 2017, 14 pages (7 pages of English Translation and 7 pages of Official copy).
Office Action received for Japanese Patent Application No. 2016-224507, dated Jun. 16, 2017, 16 pages (8 pages of English Translation and 8 pages of Official copy).
Office Action received for Japanese Patent Application No. 2016-558332, dated Dec. 8, 2017, 12 pages (6 pages of English Translation and 6 pages of Official copy).
Office Action received for Japanese Patent Application No. 2017-075031, dated Jul. 30, 2018, 16 pages (8 pages of English Translation and 8 pages of Official copy).
Office Action received for Japanese Patent Application No. 2017-507413, dated May 25, 2018, 14 pages (7 pages of English Translation and 7 pages of Official copy).
Office Action received for Japanese Patent Application No. 2017-543762, dated Jul. 9, 2018, 8 pages (4 pages of English Translation and 4 pages of Official copy).
Office Action received for Korean Patent Application No. 10-2015-0072162, dated Apr. 20, 2016, 11 pages (6 pages of English Translation and 5 pages of Official copy).
Office Action received for Korean Patent Application No. 10-2015-0072162, dated Feb. 27, 2017, 12 pages (6 pages of English Translation and 6 pages of Official copy).
Office Action received for Korean Patent Application No. 10-2016-7035555, dated Dec. 26, 2017, 5 pages (2 pages of English Translation and 3 pages of Official copy).
Office Action received for Korean Patent Application No. 10-2017-0022365, dated Jun. 26, 2017, 10 pages (4 pages of English Translation and 6 pages of Official copy).
Office Action received for Korean Patent Application No. 10-2017-0022546, dated Jun. 21, 2017, 12 pages (5 pages of English Translation and 7 pages of Official copy).
Office Action received for Korean Patent Application No. 10-2018-0035949, dated Jun. 20, 2018, 9 pages (4 pages of English Translation and 5 pges of Official copy).
Office Action received for Taiwanese Patent Application No. 102120412, dated Feb. 25, 2015, 15 pages (6 pages of English Translation and 9 pages of Official copy).
Office Action received for Taiwanese Patent Application No. 104108223, dated Apr. 25, 2016, 10 pages (5 pages of English Translation and 5 pages of Official copy).
Office Action received for Taiwanese Patent Application No. 104114953, dated Feb. 18, 2017, 9 pages (4 pages of English Translation and 5 pages of Official copy).
Office Action received for Taiwanese Patent Application No. 104114953, dated Jun. 8, 2016, 11 pages (5 pages of English Translation and 6 pages of Official copy).
Office Action received for Taiwanese Patent Application No. 104117041, dated Aug. 22, 2016, 6 pages (3 pages of English Translation and 3 pages of Official copy).
Office Action received for Taiwanese Patent Application No. 104117042, dated Apr. 20, 2017, 18 pages (7 pages of English Translation and 11 pages of Official copy).
Office Action received for Taiwanese Patent Application No. 104117508, dated Jul. 14, 2017, 9 pages (4 pages of English Translation and 5 pages of Official copy).
Office Action received for Taiwanese Patent Application No. 104117508, dated Jul. 20, 2016, 19 pages (8 pages of English Translation and 11 pages of Official copy).
Office Action received for Taiwanese Patent Application No. 104117508, dated Mar. 20, 2017, 22 pages (9 pages of English Translation and 13 pages of Official copy).
Office Action received for Taiwanese Patent Application No. 104128689, dated Aug. 21, 2017, 8 pages (3 pages of English Translation and 5 pages of Official copy).
Office Action received for Taiwanese Patent Application No. 104128689, dated Nov. 14, 2016, 12 pages (5 pages of English Translation and 7 pages of Official copy).
Office Action received for Taiwanese Patent Application No. 104128700, dated Aug. 31, 2016, 13 pages (6 pages of English Translation and 7 pages of Official copy).
Office Action received for Taiwanese Patent Application No. 104133756, dated May 17, 2017, 13 pages (6 pages of English Translation and 7 pages of Official copy).
Office Action received for Taiwanese Patent Application No. 104133757, dated Jul. 6, 2016, 22 pages (9 pages of English Translation and 13 pages of Official copy).
"Q Pair", Dec. 7, 2013, 47 pages (29 of English Translation and 18 pages of Official copy).
"Q pair", Dec. 20, 2013, 22 pages (10 pages of English Translation and 12 pages of Official copy).
Real Solution of Two-step-authentication Password Management for Authentication Enhancement, Mar. 24, 2014, 11 pages (3 pages of English Translation and 8 pages of Official copy).
Search Report received for Netherlands Patent Application No. 2014737, dated Oct. 29, 2015, 9 pages.
Shankland, Stephen, "Chrome Os Gets 'ok Google' Voice Search Control", available online at <http://www.cnet.com/news/chrome-os-gets-ok-google-voice-search-control/>, May 21, 2014, 4 pages.
Smith, Eddie, "The Expert's Guide to Instapaper", available online at "http://www.macworld.com/article/1166898/the_experts_guide_to_instapaper.html", May 23, 2012, 8 pages.
Summons to Attend Oral Proceedings received for European Patent Application No. 12770400.5, dated Mar. 19, 2018, 10 pages.
Summons to Attend Oral Proceedings received for European Patent Application No. 13171047.7, dated Jul. 9, 2018, 12 pages.
The Gadget Pill, "Sygic for Android Navigation with Hud", Available online at:- https://www.youtube.com/watch?v=fGqrycRevGU, Mar. 23, 2014, 1 page.
Walker, Alissa, "Apple Watch's Walking Directions Buzz Your Wrist When It's Time to Turn", available online at: http://gizmodo.com/apple-watch-will-give-you-a-buzz-when-its-time-to-turn-1632557384, Sep. 9, 2014, 2 pages.
Intention to Grant received for European Patent Application No. 12773460.6, dated Feb. 4, 2019, 8 pages.
Intention to Grant received for European Patent Application No. 13171047.7, dated Jan. 23, 2019, 8 pages.
Non-Final Office Action received for U.S. Appl. No. 14/719,217, dated Feb. 13, 2019, 13 pages.
Notice of Allowance received for U.S. Appl. No. 15/845,794, dated Feb. 14, 2019, 6 pages.
Office Action received for Australian Patent Application No. 2018101014, dated Jan. 18, 2019, 5 pages.
Office Action received for Chinese Patent Application No. 201580028505.1, dated Jan. 16, 2019, 15 pages (5 pages of English Translation and 10 pages of Official Copy).
Office Action received for Chinese Patent Application No. 201580043701.6, dated Dec. 24, 2018, 20 pages (5 pages of English Translation and 15 pages of Official copy).
Office Action received for Korean Patent Application No. 10-2014-7008348, dated Jan. 22, 2019, 16 pages (1 page of English Translation and 15 pages of Official Copy).
Office Action received for Korean Patent Application No. 10-2018-0035949, dated Dec. 24, 2018, 7 pages (3 pages of English Translation and 4 pages of Official Copy).
Corrected Notice of Allowance received for U.S. Appl. No. 14/719,217, dated Apr. 22, 2019, 2 pages.
Decision to Grant received for European Patent Application No. 15713062.6, dated Apr. 11, 2019, 2 pages.
Non-Final Office Action received for U.S. Appl. No. 14/841,455, dated Apr. 11, 2019, 13 pages.
Office Action received for Australian Patent Application No. 2018202751, dated Apr. 2, 2019, 4 pages.
Non-Final Office Action received for U.S. Appl. No. 15/433,320, dated May 2, 2019, 27 pages.
Notice of Allowance received for U.S. Appl. No. 15/250,152, dated May 1, 2019, 12 pages.

(56) References Cited

OTHER PUBLICATIONS

Office Action received for German Patent Application No. 102015208532.5, dated Apr. 1, 2019, 20 pages (10 pages of English Translation and 10 pages of Official Copy).
Intention to Grant received for Danish Patent Application No. PA201770782, dated Aug. 8, 2019, 2 pages.
Notice of Allowance received for Korean Patent Application No. 10-2017-7022905, dated Jul. 31, 2019, 4 pages (2 pages of English Translation and 2 pages of Official Copy).
Corrected Notice of Allowance received for U.S. Appl. No. 15/845,794, dated Feb. 25, 2019, 2 pages.
Extended European Search Report received for European Patent Application No. 18208881.5, dated Jan. 8, 2019, 7 pages.
Non-Final Office Action received for U.S. Appl. No. 14/641,304, dated Feb. 27, 2019, 18 pages.
Notice of Allowance received for Korean Patent Application No. 10-2018-7033301, dated Feb. 20, 2019, 5 pages (2 pages of English Translation and 3 pages of Official Copy).
Notice of Allowance received for Korean Patent Application No. 10-2014-7008348, dated Feb. 21, 2019, 5 pages (2 pages of English Translation and 3 pages of Official Copy).
Office Action received for Japanese Patent Application No. 2018-080122, dated Jan. 28, 2019, 11 pages (6 pages of English Translation and 5 pages of Official Copy).
Extended European Search Report received for European Patent Application No. 19150528.8, dated May 15, 2019, 9 pages.
Intention to Grant received for European Patent Application No. 15711969.4, dated May 29, 2019, 11 pages.
Office Action received for European Patent Application No. 18208881.5, dated Jun. 11, 2019, 5 pages.
Final Office Action received for U.S. Appl. No. 14/641,298, dated May 16, 2019, 50 pages.
Minutes of the Oral Proceedings received for European Application No. 15711969.4, dated May 16, 2019, 7 pages.
Notice of Allowance received for Chinese Patent Application No. 201580028491.3, dated Mar. 29, 2019, 2 pages (1 page of English Translation and 1 page of Official Copy).
Notice of Allowance received for U.S. Appl. No. 15/945,610, dated May 20, 2019, 7 pages.
Office Action received for Chinese Patent Application No. 201810338826.7, dated Apr. 3, 2019, 21 pages (13 pages of English Translation and 8 pages of Official Copy).
Office Action received for Japanese Patent Application No. 2017-543762, dated Apr. 8, 2019, 5 pages (2 pages of English Translation and 3 pages of Official copy).
Office Action received for Korean Patent Application No. 10-2018-0035949, dated Apr. 24, 2019, 9 pages (4 pages of English Translation and 5 pages of Official Copy).
Advisory Action received for U.S. Appl. No. 15/250,152, dated Mar. 25, 2019, 5 pages.
Certificate of Examination received for Australian Patent Application No. 201810014, dated Mar. 20, 2019, 2 pages.
Corrected Notice of Allowance received for U.S. Appl. No. 14/719,217, dated Mar. 20, 2019, 2 pages.
Intention to Grant received for European Patent Application No. 15713062.6, dated Mar. 25, 2019, 7 pages.
Non-Final Office Action received for U.S. Appl. No. 15/128,952, dated Apr. 1, 2019, 20 pages.
Notice of Acceptance received for Australian Patent Application No. 2017266867, dated Mar. 6, 2019, 3 pages.
Office Action received for Chinese Patent Application No. 201510288981.9, dated Mar. 6, 2019, 20 pages (10 pages of English Translation and 10 pages of Official Copy).
Office Action received for Chinese Patent Application No. 201780002398.4, dated Feb. 27, 2019, 6 pages (3 pages of English Translation and 3 pages of Official Copy).
Office Action received for European Patent Application No. 16710590.7, dated Mar. 15, 2019, 10 pages.

Office Action received for Japanese Patent Application No. 2017-507413, dated Feb. 22, 2019, 11 pages (5 pages of English Translation and 6 pages of Official.
Advisory Action received for U.S. Appl. No. 14/863,099, dated Sep. 8, 2016, 3 pages.
Dharmasena, Anusha, "iMessage-send as text message Option", YouTube, Available online at: https://www.youtube.com/watch?v=hXG-MdlW6FA, Feb. 18, 2013, 1 page.
Examiner's Answer to Appeal Brief received for U.S. Appl. No. 14/774,664, dated May 31, 2018, 28 pages.
Examiner's Answer to Appeal Brief received for U.S. Appl. No. 14/863,099, dated Jul. 28, 2017, 31 pages.
Final Office Action received for U.S. Appl. No. 14/774,664, dated Aug. 25, 2017, 23 pages.
Final Office Action received for U.S. Appl. No. 14/863,099, dated Apr. 21, 2016, 20 pages.
International Preliminary Report on Patentability received for PCT Patent Application No. PCT/US2014/027882, dated Sep. 24, 2015, 8 pages.
International Search Report and Written Opinion received for PCT Patent Application No. PCT/US2013/032498, dated Feb. 10, 2014, 18 pages.
International Search Report and Written Opinion received for PCT Patent Application No. PCT/US2014/027882, dated Oct. 10, 2014, 11 pages.
Invitation to Pay Addition Fees received for PCT Patent Application No. PCT/US2014/027882, dated Aug. 5, 2014, 2 pages.
Non-Final Office Action received for U.S. Appl. No. 14/774,664, dated Mar. 7, 2017, 23 pages.
Non-Final Office Action received for U.S. Appl. No. 14/863,099, dated Dec. 2, 2015, 12 pages.
Office Action received for Japanese Patent Application No. 2017-507413, dated Jul. 22, 2019, 4 pages (1 page of English Translation and 3 pages of Official Copy).
Office Action received for Korean Patent Application No. 10-2016-7035555, dated Jul. 18, 2019, 9 pages (4 pages of English Translation and 5 pages of Official Copy).
Office Action received for Korean Patent Application No. 10-2017-7012145, dated Jul. 18, 2019, 5 pages (2 pages of English Translation and 3 pages of Official Copy).
Decision to Grant received for European Patent Application No. 12773460.6, dated Jun. 27, 2019, 2 pages.
Decision to Grant received for European Patent Application No. 13171047.7, dated Jun. 27, 2019, 2 pages.
Office Action received for Korean Patent Application No. 10-2019-7014494, dated Jun. 14, 2019, 11 pages (5 pages of English Translation and 6 pages of Official Copy).
Decision on Appeal received for U.S. Appl. No. 14/774,664, dated Sep. 12, 2019, 8 pages.
Decision to Grant received for European Patent Application No. 15711969.4, dated Sep. 26, 2019, 2 pages.
Notice of Acceptance received for Australian Patent Application No. 2018202751, dated Sep. 4, 2019, 3 pages.
Notice of Allowance received for Chinese Patent Application No. 201580028505.1, dated Sep. 19, 2019, 2 pages (1 page of English Translation and 1 page of Official Copy).
Office Action received for Japanese Patent Application No. 2018-080122, dated Aug. 9, 2019, 5 pages (2 pages of English Translation and 3 pages of Official Copy).
Decision to Grant received for Danish Patent Application No. PA201770782, dated Oct. 25, 2019, 2 pages.
Notice of Allowance received for Korean Patent Application No. 10-2017-7012145, dated Oct. 30, 2019, 3 pages (1 page of English Translation and 2 pages of Official Copy).
Notice of Allowance received for U.S. Appl. No. 14/841,455, dated Oct. 22, 2019, 10 pages.
Office Action received for Australian Patent Application No. 2019203473, dated Oct. 25, 2019, 2 pages.
Office Action received for Chinese Patent Application No. 201810338826.7, dated Oct. 21, 2019, 19 pages (12 pages of English Translation and 7 pages of Official Copy).

(56) References Cited

OTHER PUBLICATIONS

Office Action received for Chinese Patent Application No. 201910475434.X, dated Dec. 4, 2019, 14 pages (8 pages of English Translation and 6 pages of Official Copy).

* cited by examiner

USER INTERFACE FOR PHONE CALL ROUTING AMONG DEVICES

CROSS-REFERENCE TO RELATED APPLICATIONS

This application is a continuation of U.S. patent application Ser. No. 15/952,736, titled "USER INTERFACE FOR PHONE CALL ROUTING AMONG DEVICES," filed Apr. 13, 2018, which is a continuation of U.S. patent application Ser. No. 14/503,327, titled "USER INTERFACE FOR PHONE CALL ROUTING AMONG DEVICES," filed Sep. 30, 2014, which claims priority from U.S. Provisional Patent Application Ser. No. 62/005,990, titled "USER INTERFACE FOR PHONE CALL ROUTING AMONG DEVICES," filed May 30, 2014. All of these applications are incorporated by reference herein in their entirety.

FIELD OF THE DISCLOSURE

The present disclosure relates generally to user interfaces for routing phone calls among electronic devices.

BACKGROUND OF THE DISCLOSURE

Electronic devices that provide communications capabilities (e.g., voice, text, and/or video communications) come in various form factors (e.g., phone, tablet, laptop, desktop, etc.). However, transferring a call from a phone to a tablet, for example, may be impossible in many cases.

SUMMARY OF THE DISCLOSURE

Many electronic devices provide communications capabilities (e.g., voice, text, and/or video communications). There is a need to provide a fast, efficient, and intuitive way for users to route phone calls (and other communications) among electronic devices. In particular, a call-routing service may or may not be able to route a phone call directly to a second electronic device in response to a request from the first electronic device (e.g., routing-service routing). Instead, the first electronic device optionally routes the phone call through the first electronic device to the second electronic device (e.g., through-device routing). The embodiments described herein provide an intuitive way for a first electronic device to cause a phone call to be routed from the first electronic device to a second electronic device using routing-service routing if it is available, and falling back on through-device routing if routing-service routing is unavailable. Further, embodiments described herein provide an intuitive way for a first electronic device to pull a phone call from the second electronic device to the first electronic device and/or to push a phone call from the first electronic device to the second electronic device.

In accordance with some embodiments, a non-transitory computer-readable storage medium storing one or more programs, the one or more programs comprising instructions, which when executed by a first electronic device, cause the first electronic device to perform a method. The method includes: generating for presentation on a display a user interface including a user interface object indicating that a phone call has been routed to a second electronic device; while the user interface is presented on the display, receiving a request to route the phone call to the first electronic device; in response to the request, requesting call data associated with the phone call; and after requesting the call data, presenting the phone call at the first electronic device.

In accordance with some embodiments, a method is performed at a first electronic device with one or more processors and memory. The method includes: generating for presentation on a display a user interface including a user interface object indicating that a phone call has been routed to a second electronic device; while the user interface is presented on the display, receiving a request to route the phone call to the first electronic device; in response to the request, requesting call data associated with the phone call; and after requesting the call data, presenting the phone call at the first electronic device.

In accordance with some embodiments, a first electronic device comprises a memory; a display; and a processor coupled to the display and the memory. The processor is configured to perform a method comprising: generating for presentation on the display a user interface including a user interface object indicating that a phone call has been routed to a second electronic device; while the user interface is presented on the display, receiving a request to route the phone call to the first electronic device; in response to the request, requesting call data associated with the phone call; and after requesting the call data, presenting the phone call at the first electronic device.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
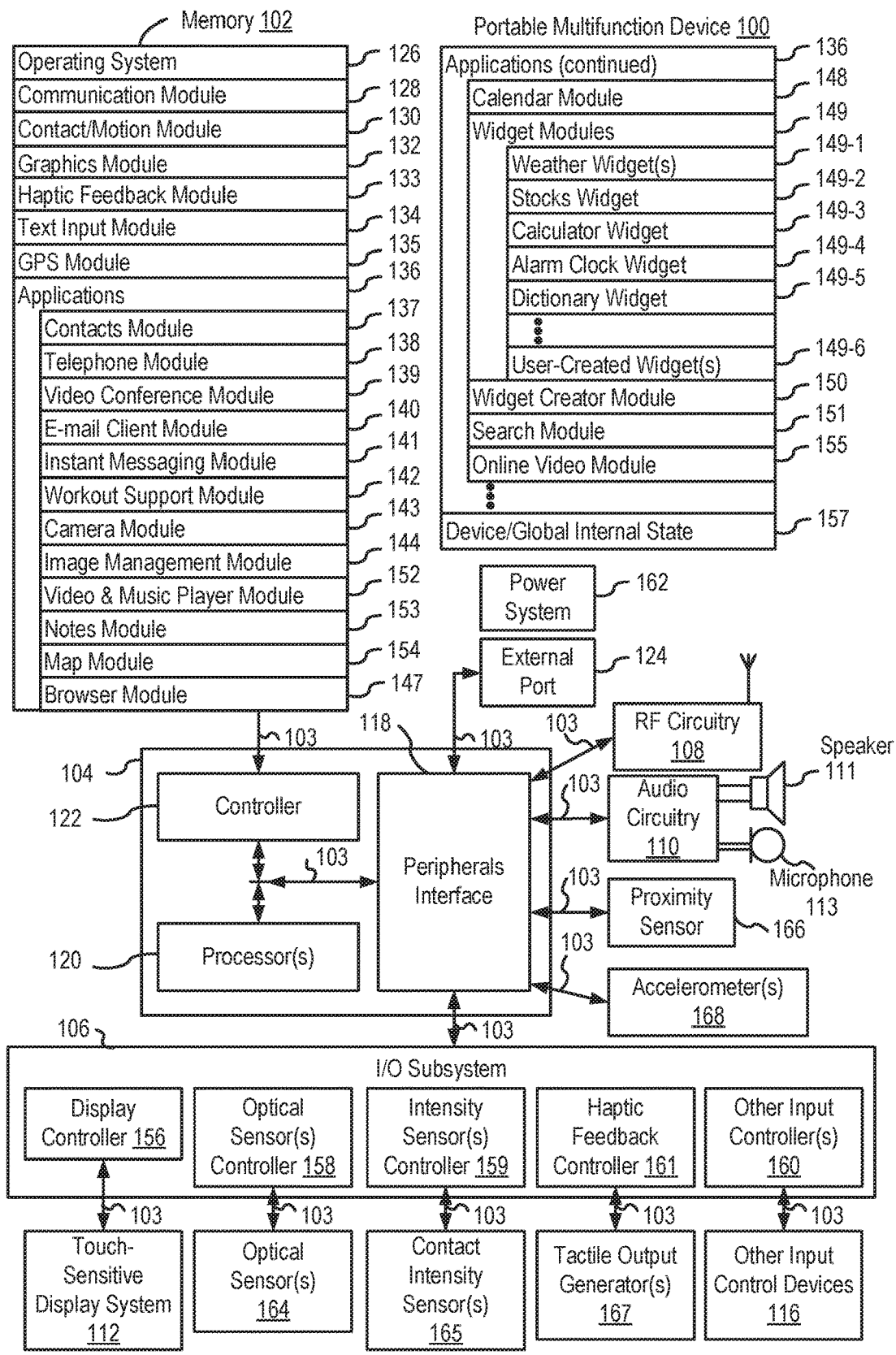
FIG. 1A is a block diagram illustrating a multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
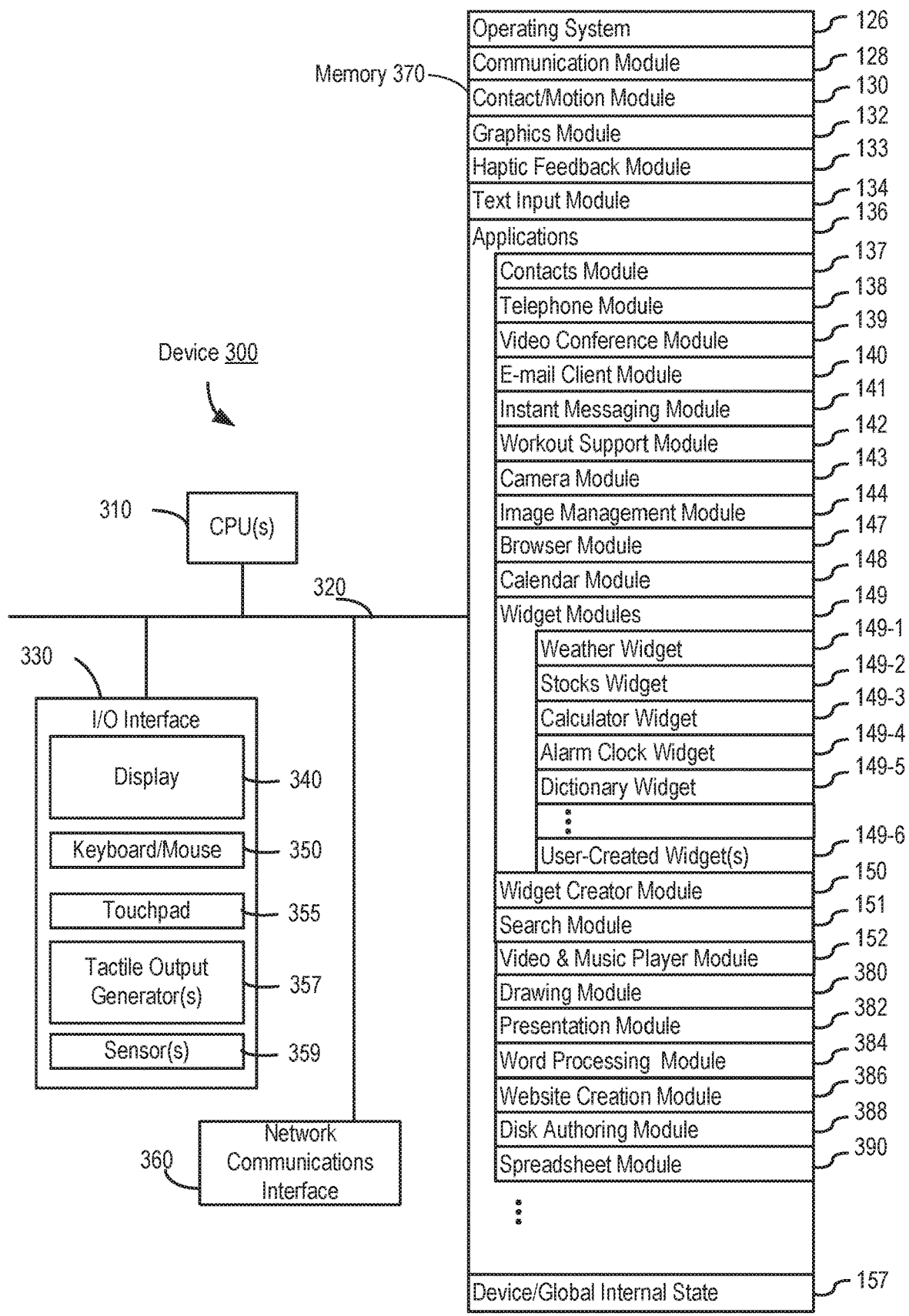
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:

Contacts module 137 (sometimes called an address book or contact list);
Telephone module 138;
Video conferencing module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XIVIPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
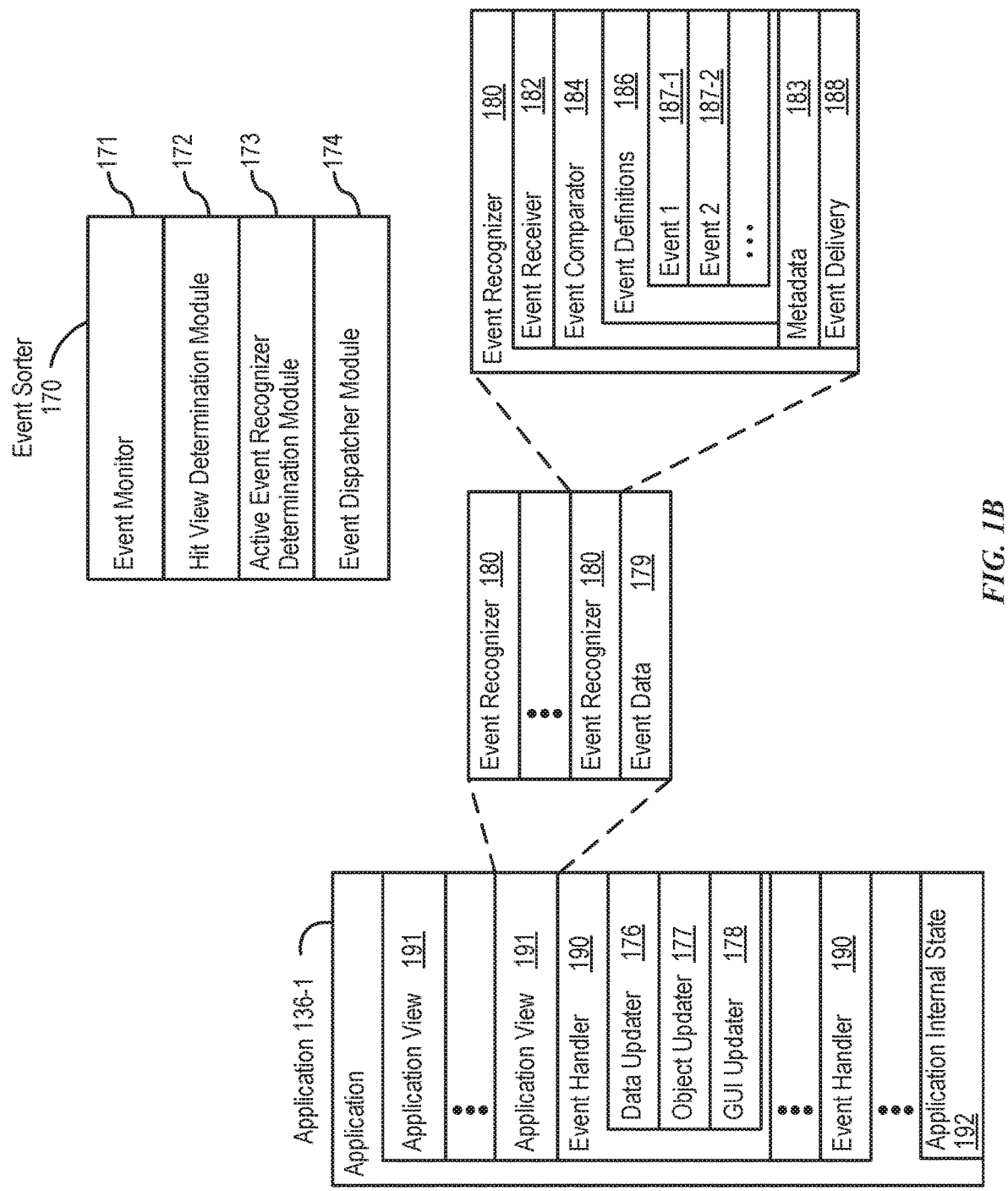
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
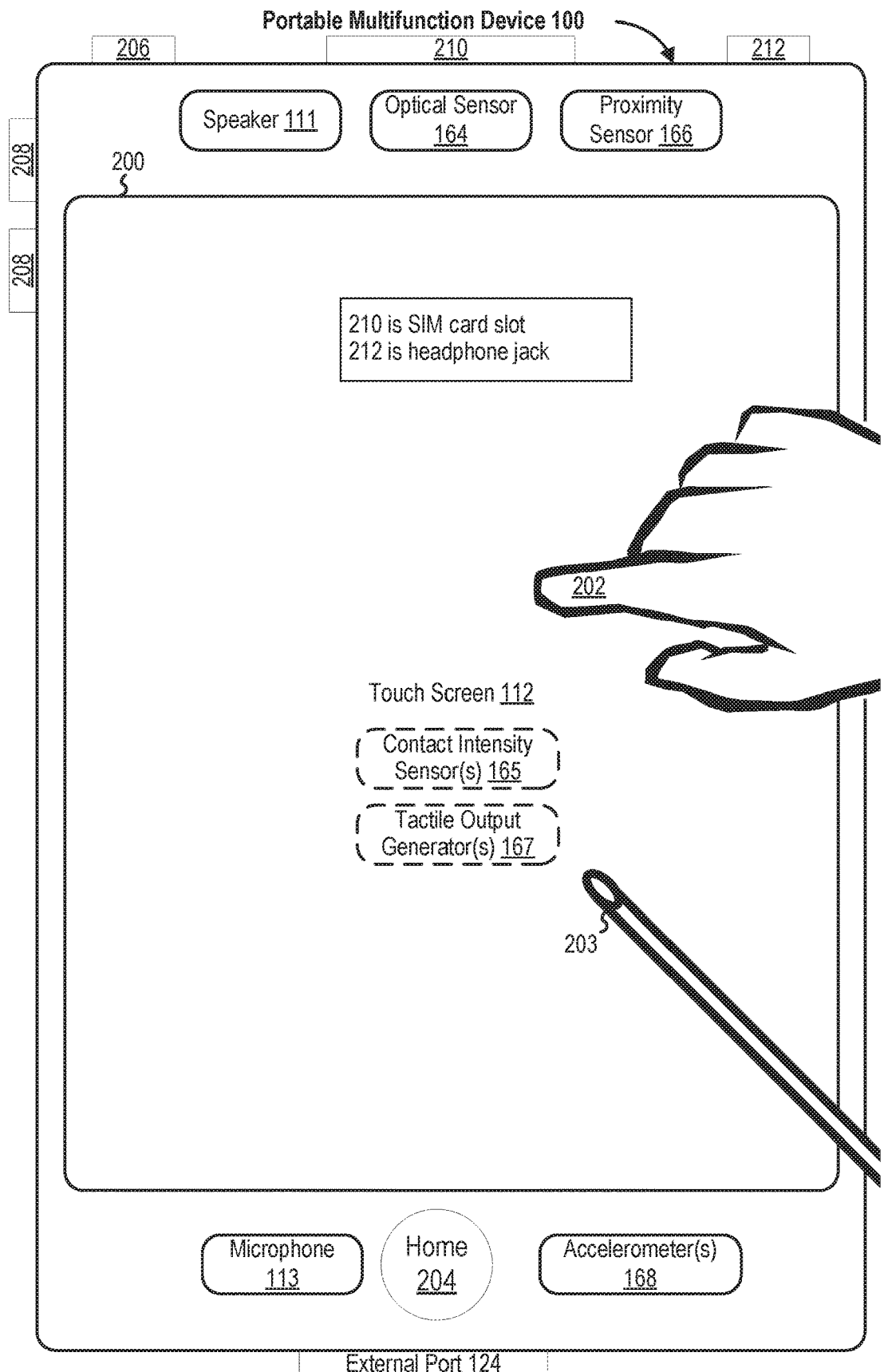
FIG. 2 illustrates a multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
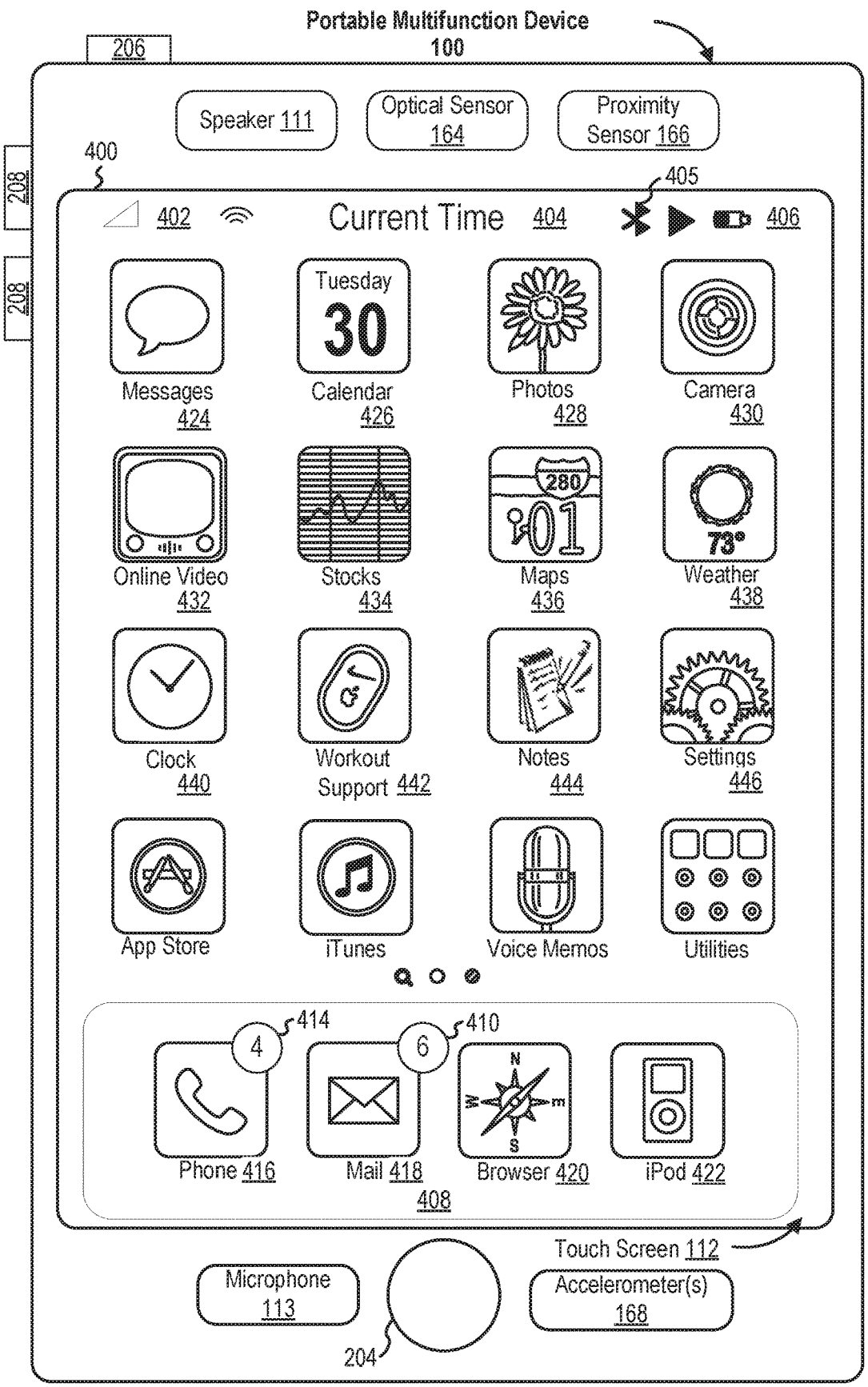
FIG. 4A illustrates an exemplary user interface for a menu of applications on portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
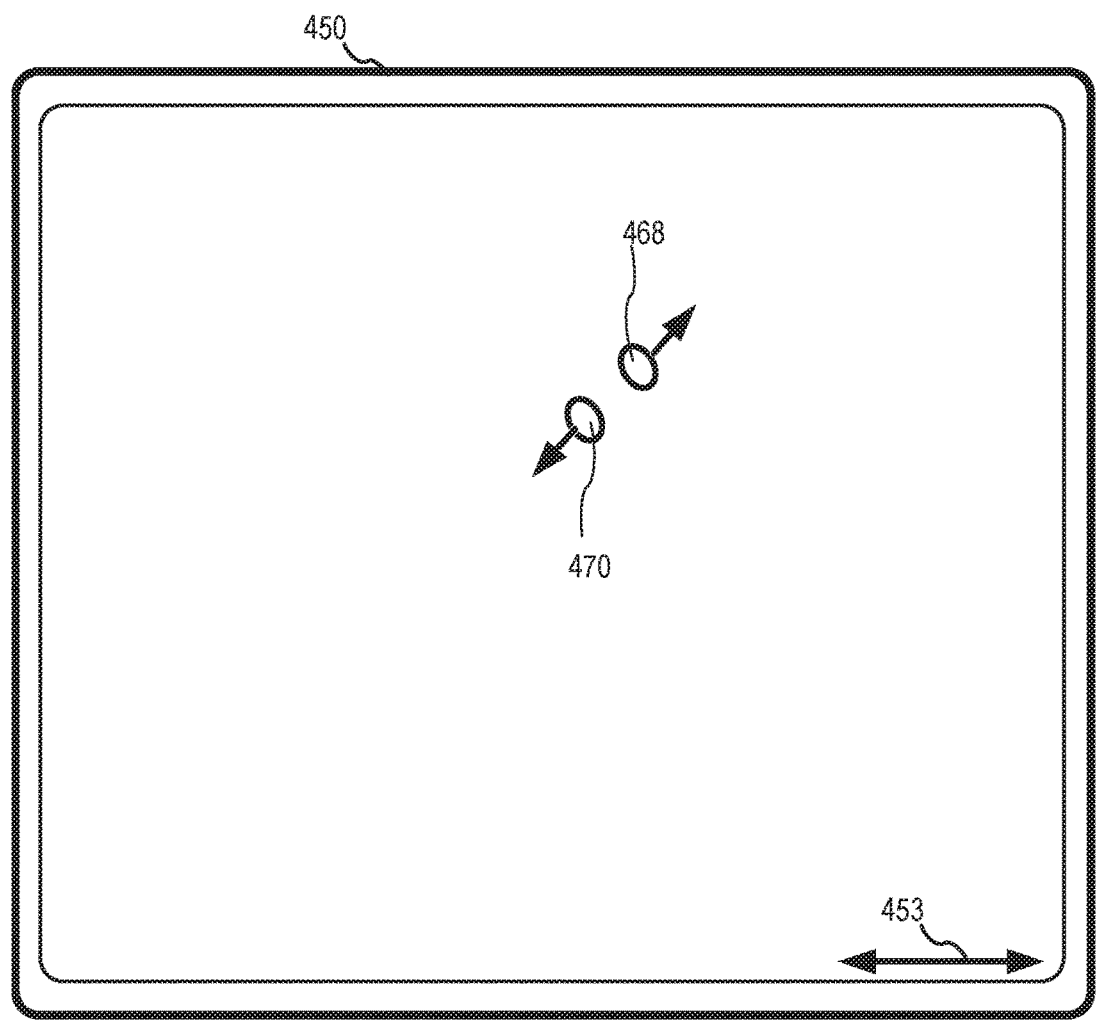
FIG. 4B illustrates an exemplary user interface on a device with a touch-sensitive surface that is separate from the display in accordance with some embodiments.
Figure 4B:
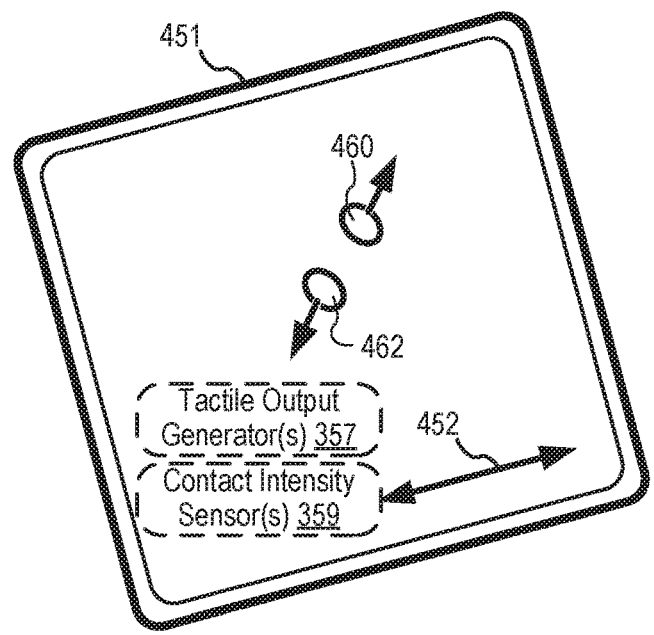

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

FIGS. 5A-5F illustrate block diagrams of exemplary electronic devices in communication according to some embodiments of the disclosure. First electronic device 500 and second electronic device 502 are optionally any electronic device, such as multifunction devices 100 or 300, as illustrated in FIGS. 1A-B, 2, and 3. For example, the first and second electronic devices 500 and 502 are optionally phones, tablets, laptops, desktops, etc., and devices 500 and 502 are optionally different kinds of electronic devices (e.g., a phone and a tablet, a laptop and a phone, etc.). Further, although FIGS. 5A-5F illustrate only first and second electronic devices in communication, the methods and/or processes described herein (e.g., method 700, 900, and/or 1100) are optionally performed at the first electronic device 500 (or other electronic devices) to route phone calls among any number of electronic devices.

Figure 5A:
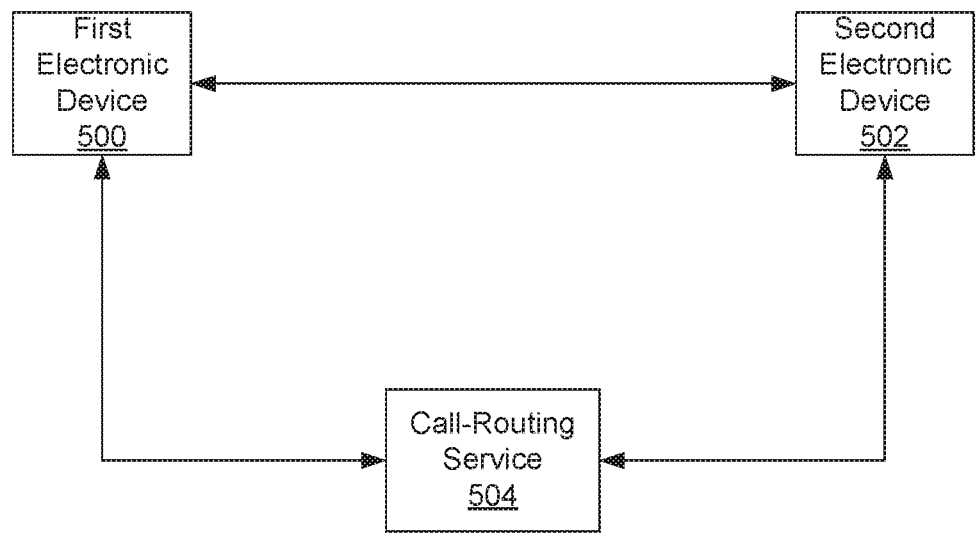
FIGS. 5A-5F illustrate block diagrams of exemplary electronic devices in communication according to some embodiments of the disclosure.
Figure 5B:
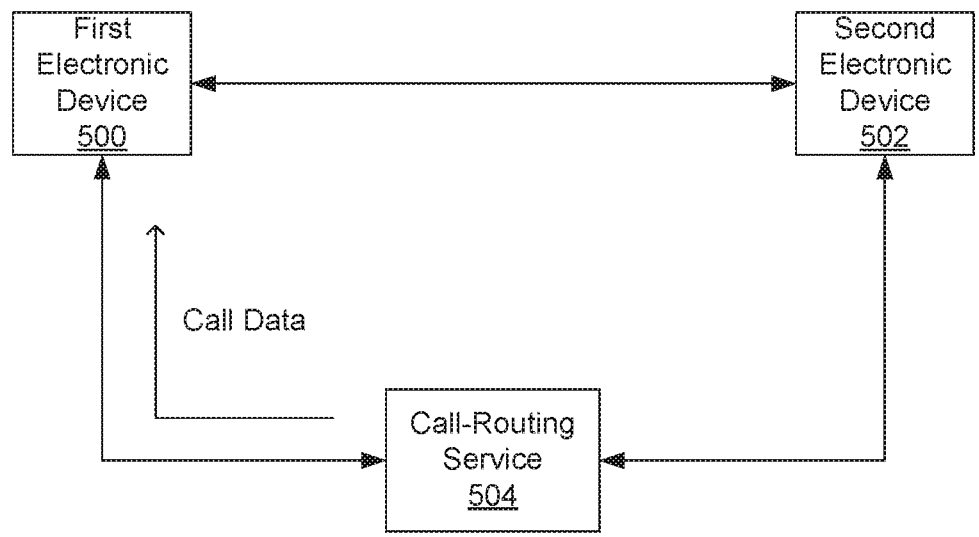
Figure 5C:
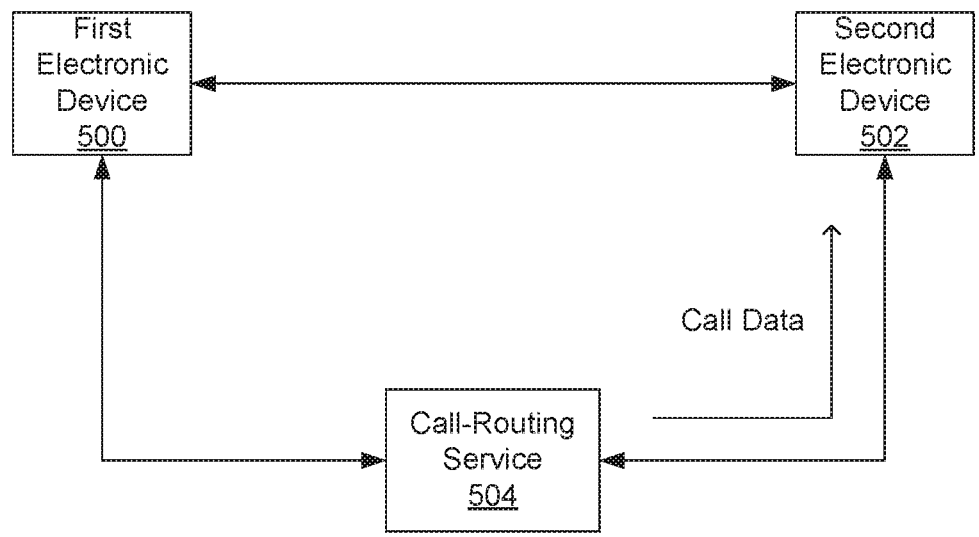

The first and second electronic devices 500 and 502 are optionally in communication with a call-routing service 504. A call-routing service 504 is a local exchange carrier, a mobile network operator (MNO), a voice over Internet Protocol (VoIP) provider, other phone carrier, etc. The call-routing service 504 sends call data associated with a phone call to one or both of the first electronic device 500 (as illustrated in FIG. 5B) and the second electronic device 502 (as illustrated in FIG. 5C).

Figure 5D:
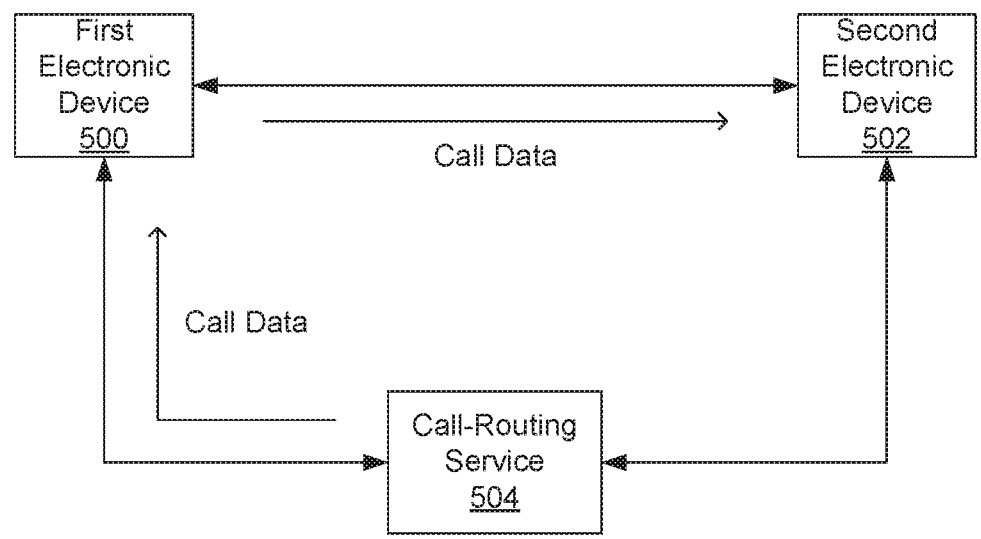
Figure 5E:
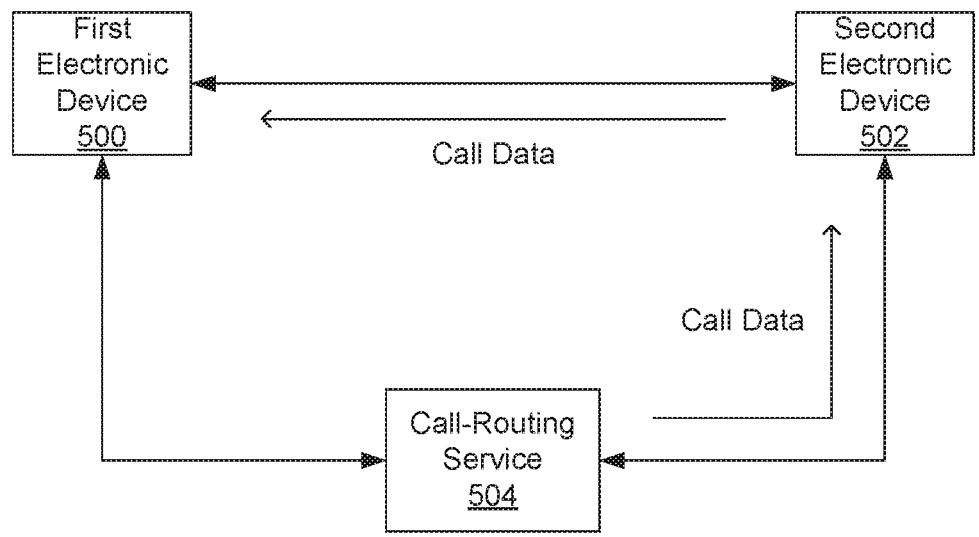

In some embodiments, the first electronic device 500 optionally causes the phone call to be routed to the second electronic device 502, either by routing-service routing or by through-device routing (illustrated in FIGS. 5D and 5E). According to routing-service routing, the first device 500 optionally sends a request to the call-routing service 504 to route the phone call directly to the second electronic device 502. According to routing-service routing, the first electronic device 500 optionally routes the call data through the first electronic device 500 to the second electronic device 502, as illustrated in FIG. 5D. Although examples described herein refer to routing a phone call through a first electronic device to a second electronic device, embodiments of the disclosure are not so limited and also apply to routing a phone call through a second electronic device 502 to a first electronic device 500, as illustrated in FIG. 5E.

Figure 5F:
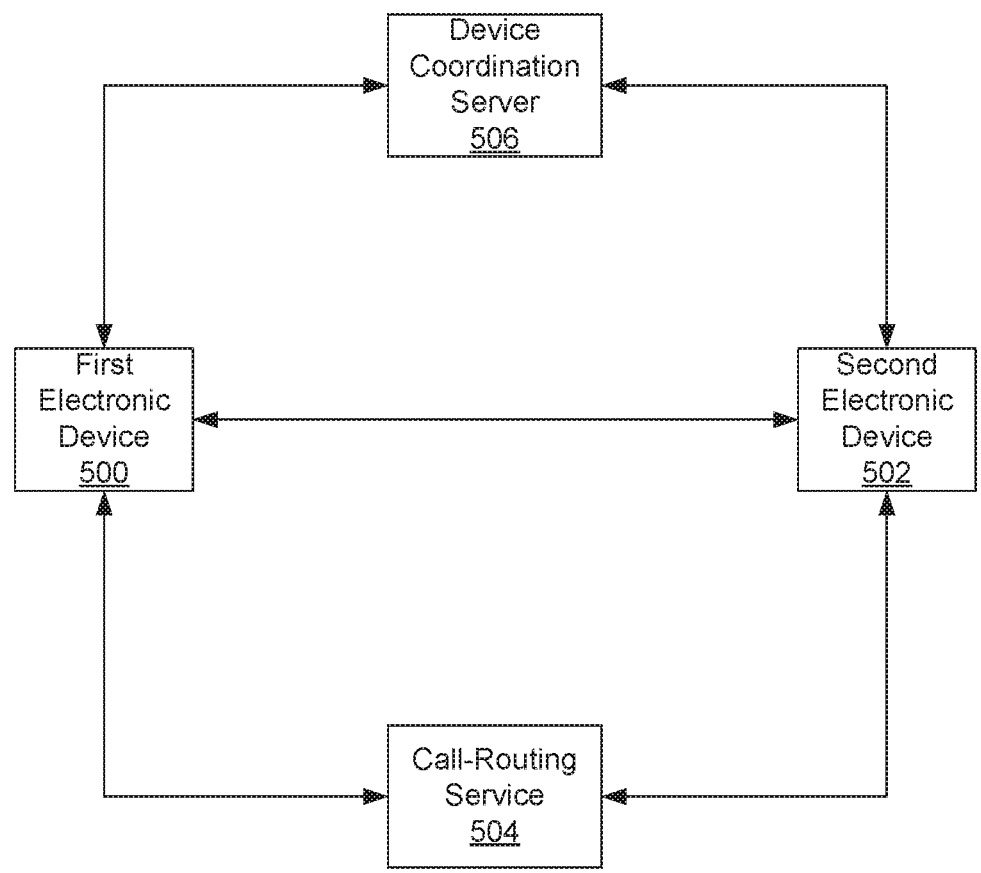

In some embodiments, the first electronic device 500 and the second electronic device 502 are optionally in communication with a device coordination server 506, as illustrated in FIG. 5F. The device coordination server 506 (e.g., a server at a carrier, phone service provider, internet service provider, other service provider, etc.) optionally stores information regarding the first and second electronic devices and other electronic devices. The device coordination server 506 optionally sends the information to the electronic devices. For example, the device coordination server 506 optionally stores information that the phone call has been routed to the second electronic device 502 and sends the information to the first electronic device 500 so that the first electronic device can request that the call be routed to the first electronic device.

User Interfaces and Associated Processes

Through-Device Routing and Routing-Service Routing

Many electronic devices provide communications capabilities (e.g., voice, text, and/or video communications). There is a need to provide a fast, efficient, and intuitive way for users to route phone calls (and other communications) among electronic devices. In particular, a call-routing service may or may not provide routing-service routing. The embodiments described below provide an intuitive way for a first electronic device to cause a phone call to be routed from the first electronic device to a second electronic device using routing-service routing if it is available, and falling back on through-device routing if routing-service routing is unavailable. In some embodiments, the first electronic device causes the phone call to be routed from the first electronic device to the second electronic device using through-device routing if available, and falling back on routing-service routing if routing-service routing is unavailable. In some embodiments, other criteria are used to determine the particular routing scheme to use.

FIGS. 6A-6D illustrate exemplary user interfaces for causing a phone call to be routed from a first electronic device to a second electronic device in accordance with some embodiments of the disclosure. The user interfaces in these figures are used to illustrate the processes described below, including the processes described below with reference to FIGS. 7A-7D.

Figure 6A:
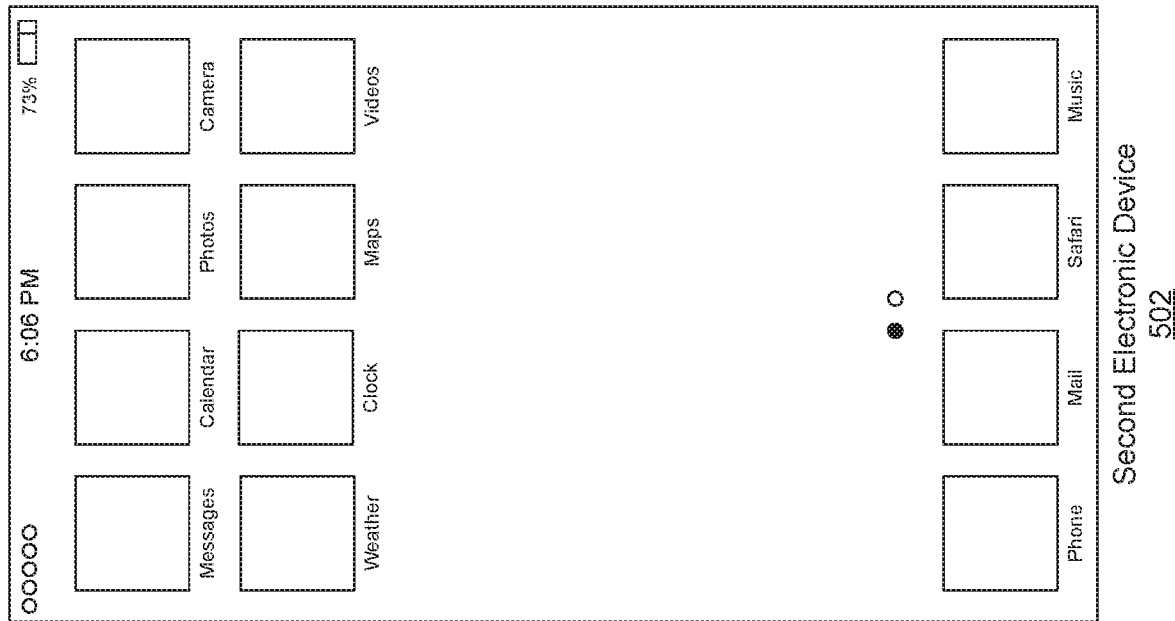
FIGS. 6A-6D illustrate exemplary user interfaces for causing a phone call to be routed from a first electronic device to a second electronic device in accordance with some embodiments of the disclosure.
Figure 6A:
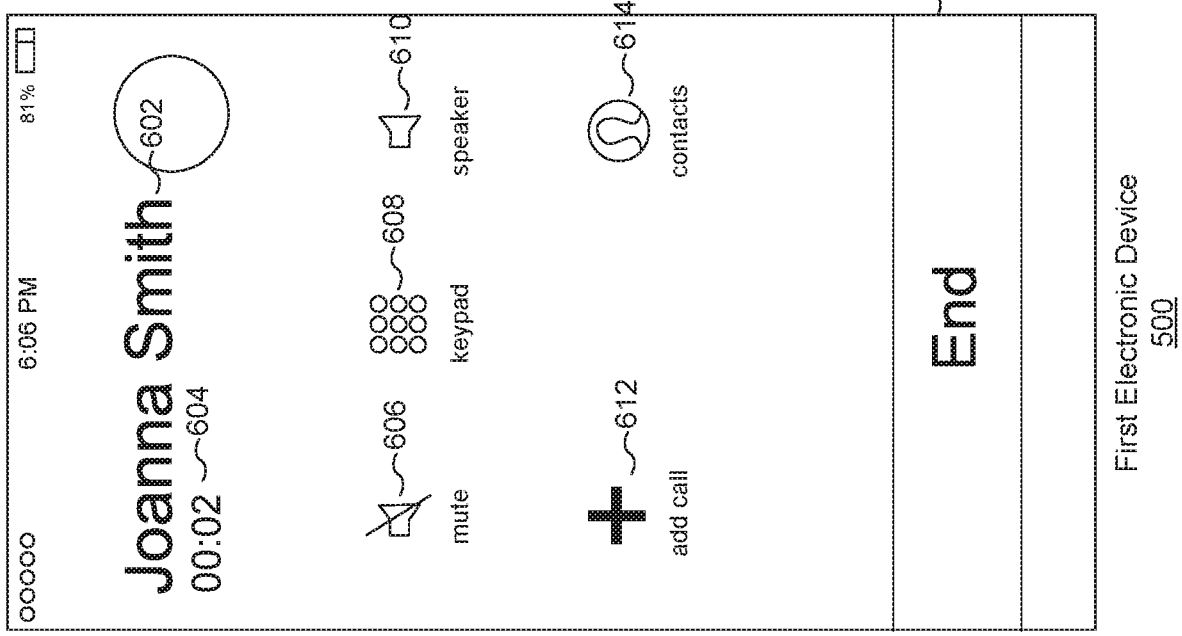

FIG. 6A illustrates exemplary user interfaces of a first electronic device 500 and a second electronic device 502. A phone call is presented on the first electronic device 500, and the user interface of the first electronic device optionally includes a caller identification 602, a call time 604, and call controls (mute 606, keypad 608, speaker 610, add call 612, contacts 614, and end call 616, among other possibilities). For example, presenting a phone call optionally includes playing audio data from the phone call. The phone call is not presented on the second electronic device 502, and the user interface of the second electronic device optionally includes a home screen user interface (or any other user interface of the second electronic device that is not a phone call user interface for presenting the phone call already presented on the first electronic device 500).

Figure 6B:
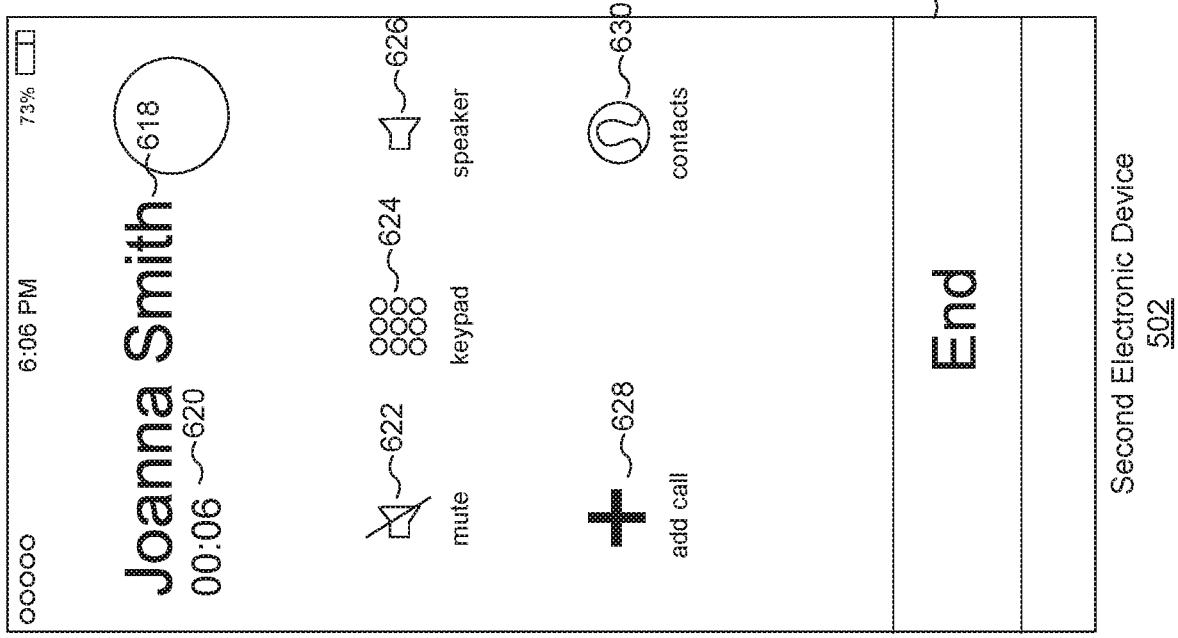
Figure 6B:
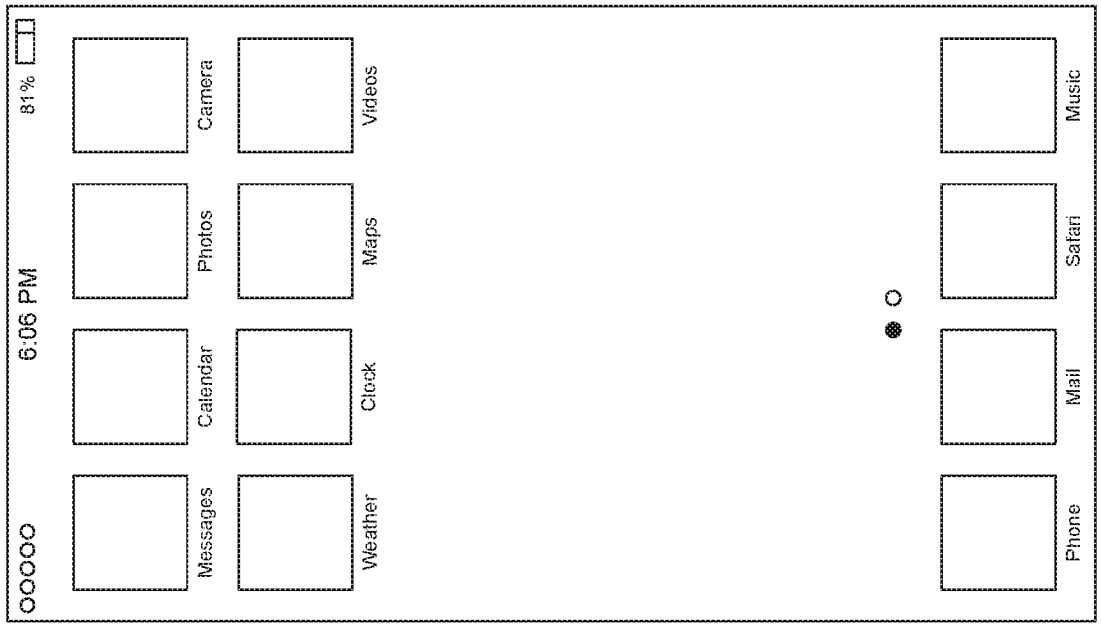

In some embodiments, the first electronic device 500 optionally receives a request to route the phone call to the second electronic device 502, and the first electronic device causes the phone call to be routed to the second electronic device, as illustrated in FIG. 6B. The phone call is presented on the second electronic device 502, and the user interface of the second electronic device optionally includes a caller identification 618, a call time 620, and call controls (mute 622, keypad 624, speaker 626, add call 628, contacts 630, and end call 632, among other possibilities). The phone call is not presented on the first electronic device 500, and the user interface of the first electronic device optionally includes a home screen user interface (or any other user interface of the first electronic device that is not a phone call user interface for presenting the phone call that has been routed to the second electronic device 502).

Figure 6C:
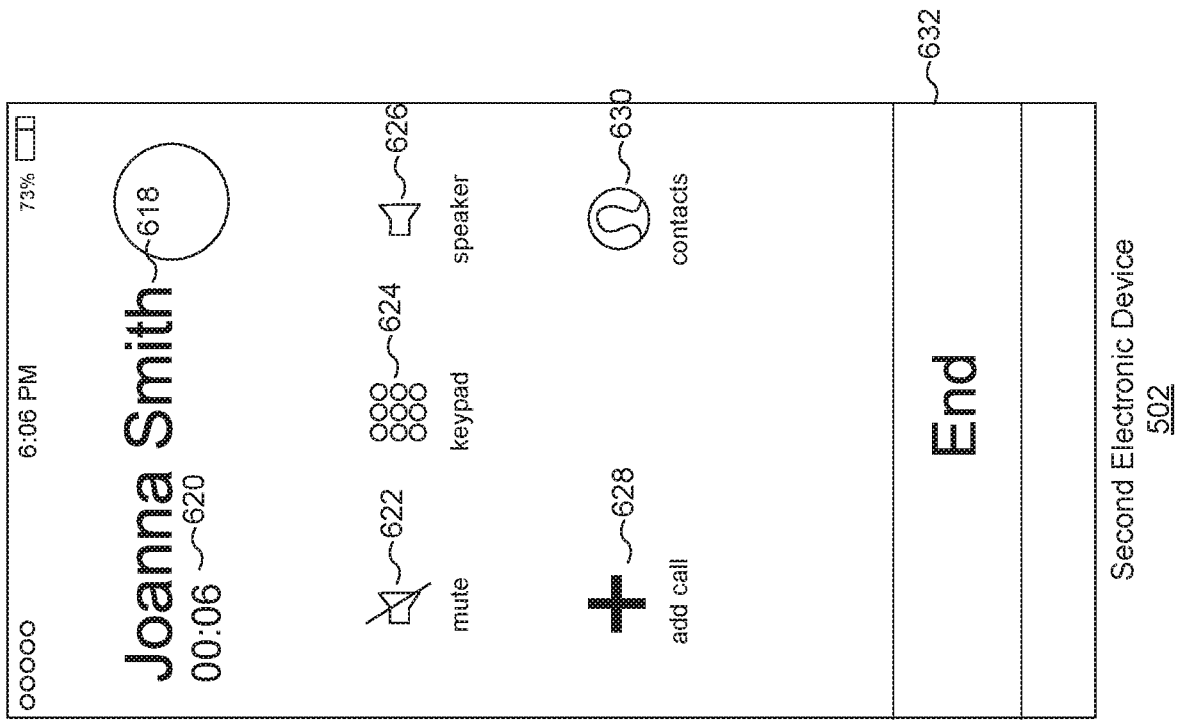
Figure 6C:
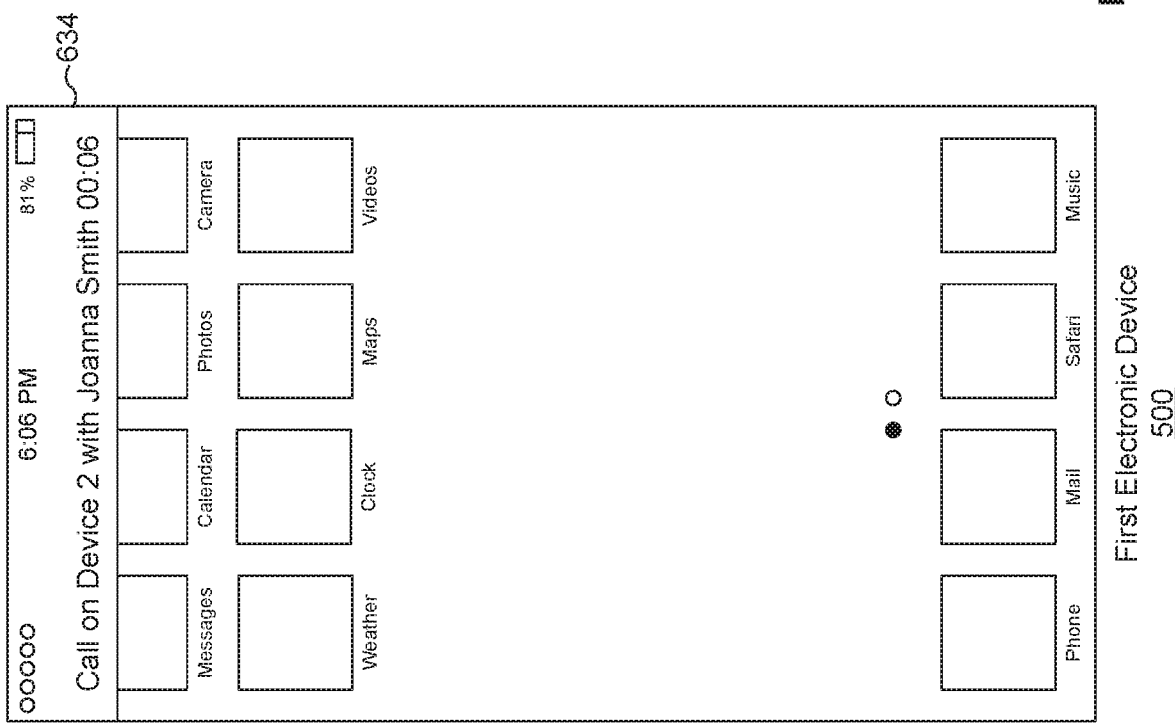

In some embodiments, after the phone call has been routed to the second electronic device 502, a user interface object 634 is optionally displayed in the user interface of the first electronic device 500, as illustrated in FIG. 6C. The user interface object 634 indicates that the phone call has been routed to the second electronic device 502. In some embodiments, the user interface object 634 further indicates that the phone call has been routed through the first electronic device 500 (e.g., if the phone call was routed using through-device routing).

Figure 6D:
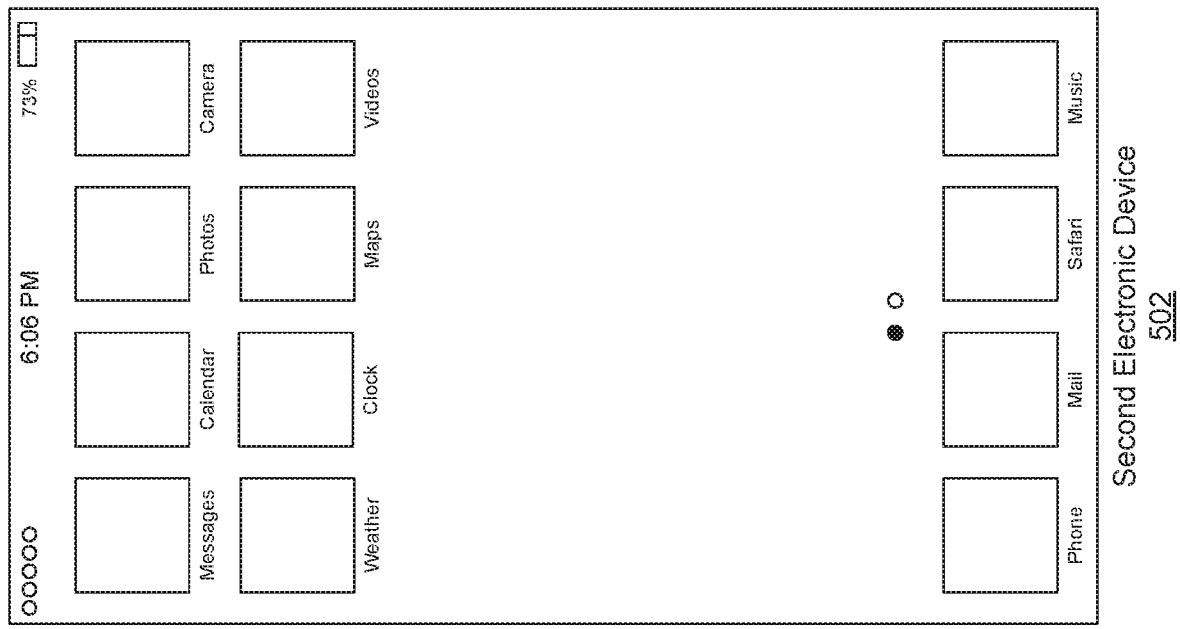
Figure 6D:
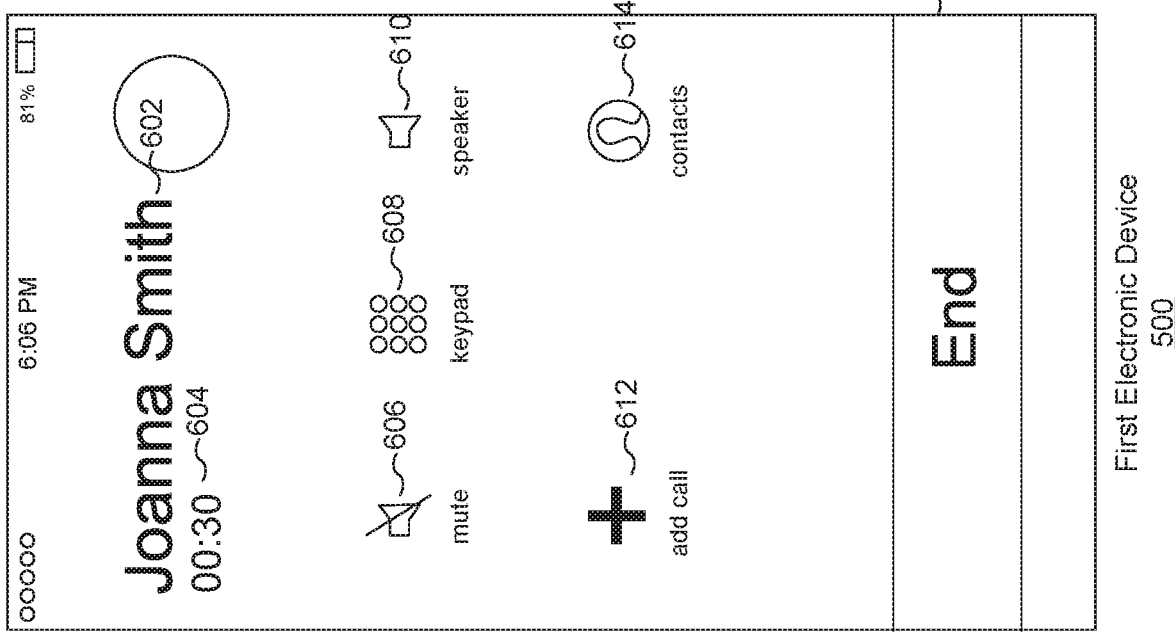
Figure 7A:
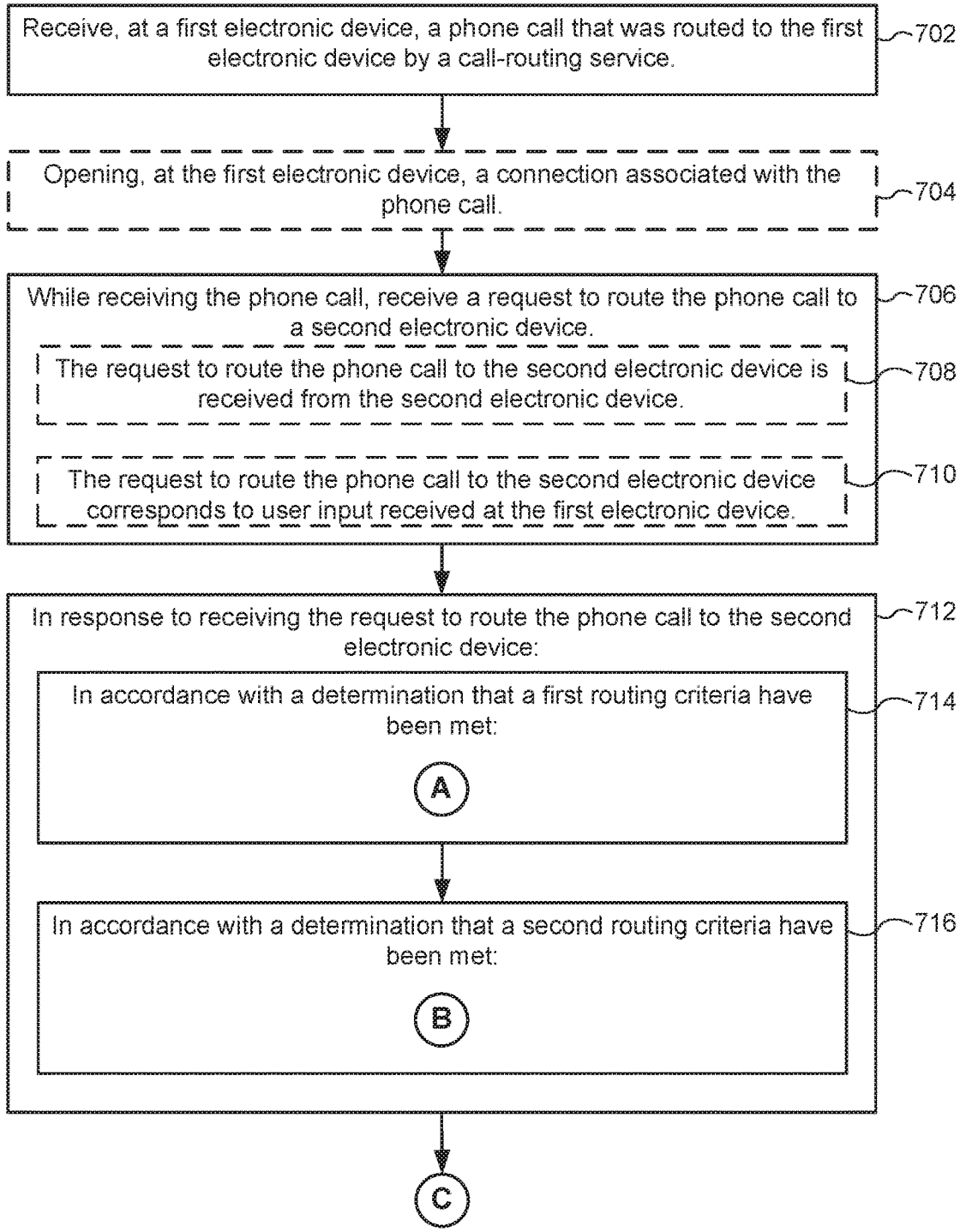
FIGS. 7A-7D are flow diagrams illustrating a method of causing a phone call to be routed from a first electronic device to a second electronic device in accordance with some embodiments.
Figure 7B:
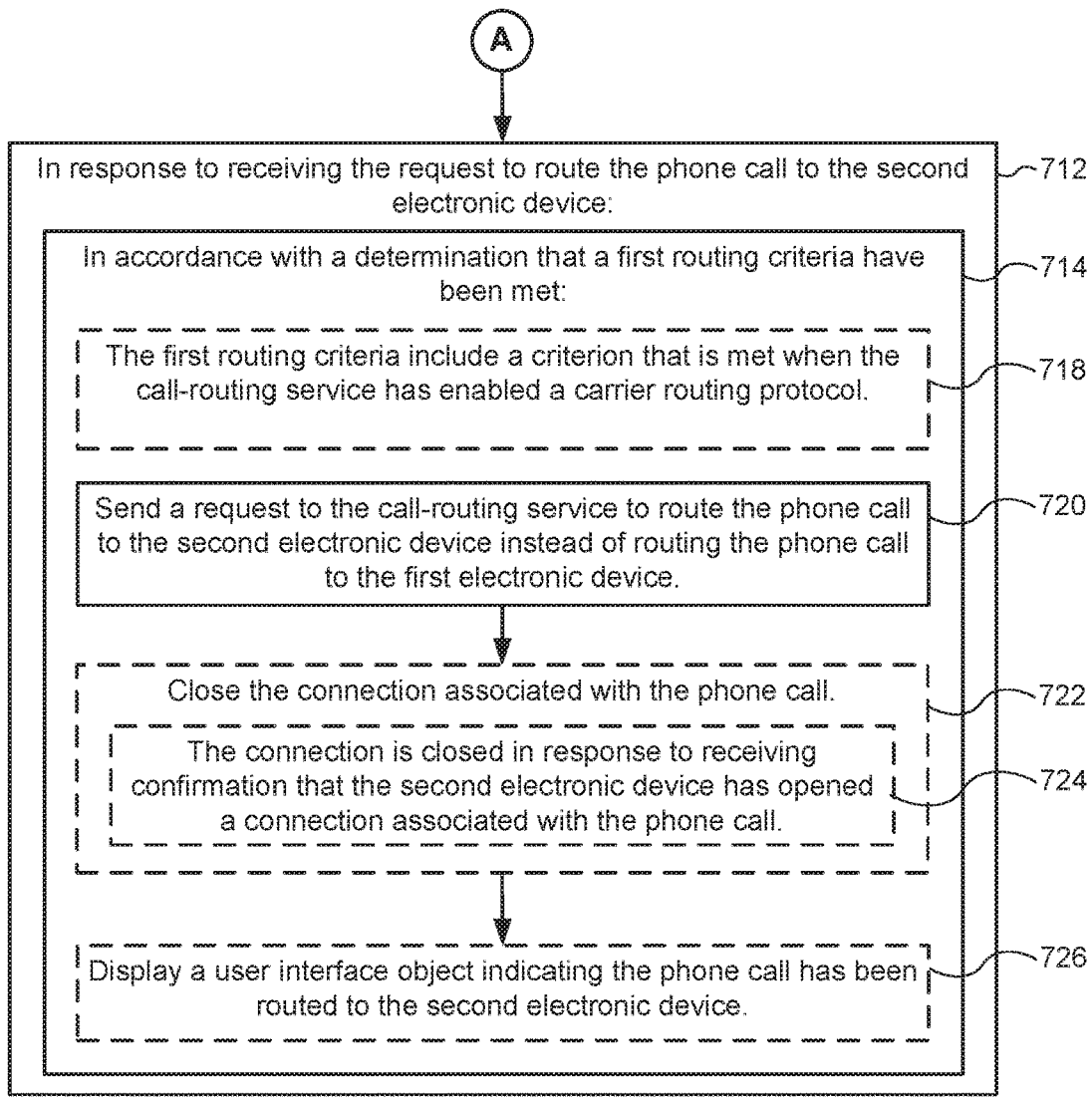
Figure 7C:
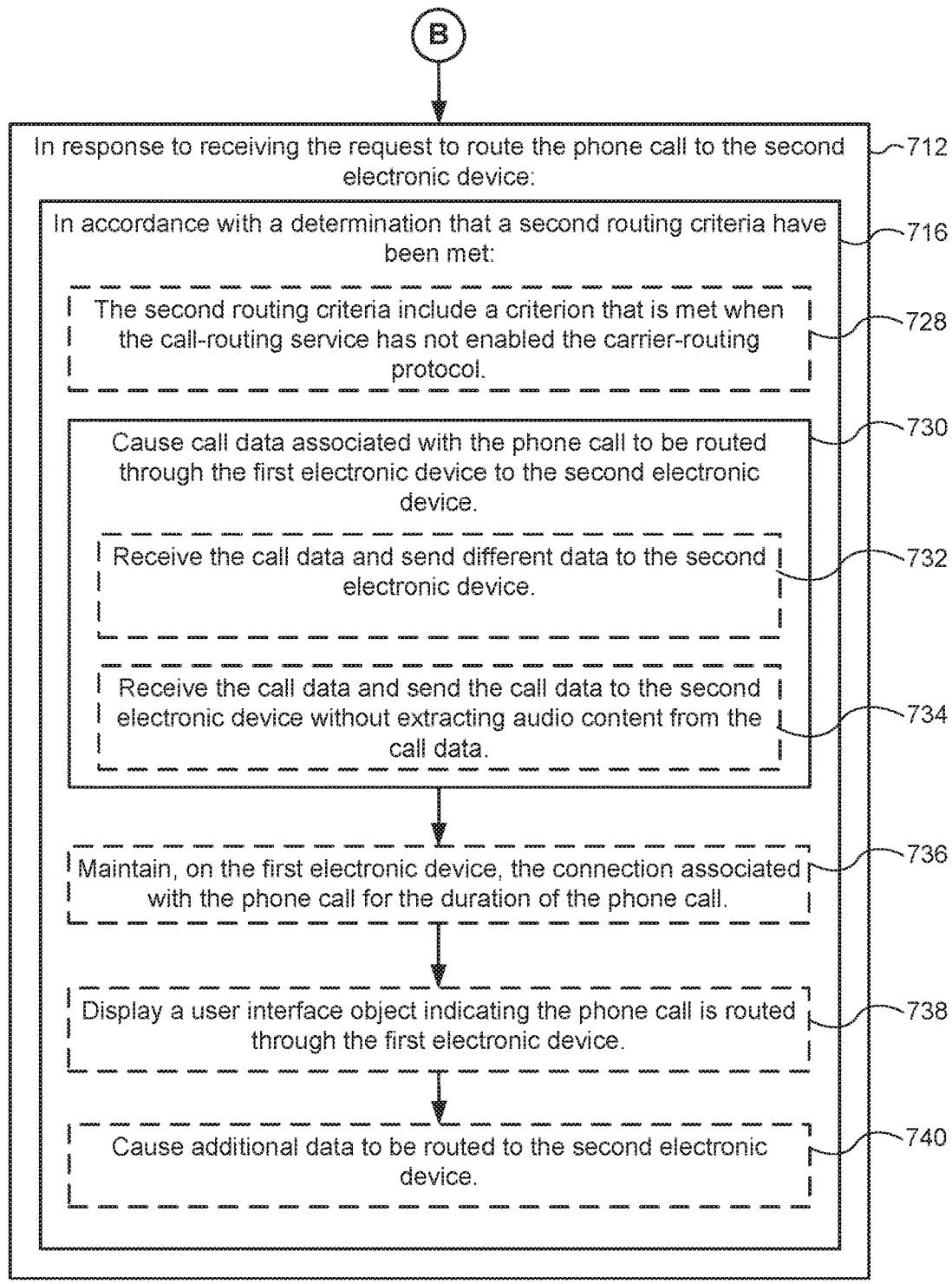
Figure 7D:
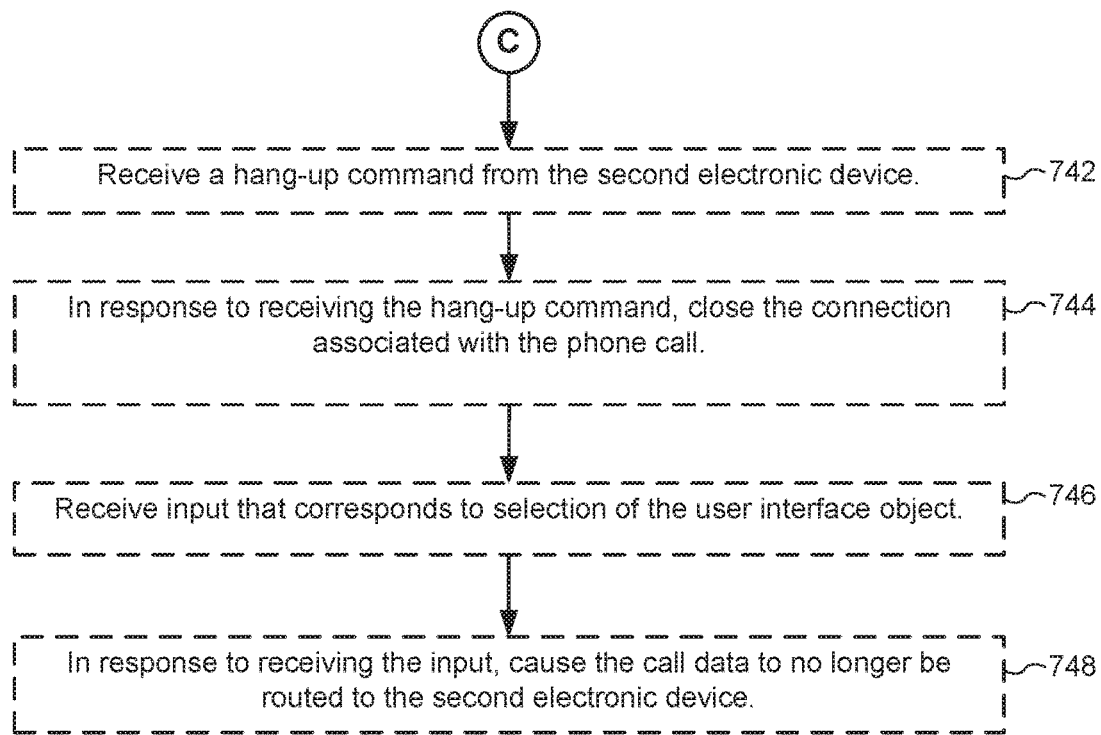

In some embodiments, the first electronic device 500 optionally receives input corresponding to selection of the user interface object 634, and in response to the input, the phone call is pulled back to the first electronic device 500, as illustrated in FIG. 6D.

FIGS. 7A-7D are flow diagrams illustrating a method of causing a phone call to be routed from a first electronic device to a second electronic device in accordance with some embodiments. The method is optionally performed at an electronic device as described above with reference to FIGS. 1A-B and 2-5 (e.g., electronic device 100, 300, 500, or 502, etc.). Some operations in method 700 are, optionally, combined and/or the order of some operations is, optionally, changed.

As described below, the method 700 provides ways of causing a phone call to be routed from a first electronic device to a second electronic device, using routing-service routing if available, or through-device routing as a fallback. The method reduces the cognitive burden on a user when interacting with a user interface on the device by providing an intuitive user interface for routing a phone call among electronic devices, thereby creating a more efficient human-machine interface. For battery-operated electronic devices, increasing the efficiency of the user's interaction with the user interfaces conserves power and increases the time between battery charges.

In some embodiments, a first electronic device 500 with one or more processors and memory receives (702), at the first electronic device, a phone call that was routed to the first electronic device by a call-routing service (e.g., a local exchange carrier associated with the phone call, a mobile network operator (MNO) associated with the phone call, a voice over Internet Protocol (VoIP) provider associated with the phone call, other phone carrier, etc.). In some embodiments, the phone call is optionally an audio-only call. In some embodiments, the phone call is optionally a video call. The phone call is optionally presented at the first electronic device, as illustrated in FIG. 6A.

While receiving the phone call, the first electronic device receives (706) a request to route the phone call to a second electronic device 502. For example, the first electronic device optionally receives user input on the first electronic device requesting to route the phone call to the second electronic device (push request received at the first electronic device), the first electronic device receives the request from a different electronic device such as the second electronic device (pull request received from the second electronic device), etc. In some embodiments, both devices are associated with a same user account and/or are on a same local network. In some embodiments, the request to route the phone call to the second electronic device is optionally received (708) from the second electronic device (and the request is sent in response to input on the second electronic device answering the phone call). In some embodiments, the request to route the phone call to the second electronic device optionally corresponds (710) to user input received at the first electronic device.

In response to receiving the request to route the phone call to the second electronic device (712), in accordance with a determination that a first routing criteria have been met (714), the first electronic device sends (720) a request to the call-routing service to route the phone call to the second electronic device instead of routing the phone call to the first electronic device (e.g., routing-service routing). In some embodiments, the first routing criteria optionally include (718) a criterion that is met when the call-routing service has enabled a carrier routing protocol (e.g., routing-service routing: if the carrier has can directly route the phone call to the second electronic device without going through the first electronic device). In some embodiments, the carrier routing protocol is optionally determined based on information stored on the first electronic device. In some embodiments, the carrier routing protocol is optionally determined based on communication with a remote device, such as a carrier server that sends information associated with the carrier routing protocol to the first electronic device.

Further in response to receiving the request to route the phone call to the second electronic device (712), in accordance with a determination that a second routing criteria have been met (716), the first electronic device causes (730) call data associated with the phone call to be routed through the first electronic device to the second electronic device. For example, the first electronic device optionally receives audio data associated with the phone call at the first electronic device and sends the received audio data to the second electronic device, etc. In some embodiments, the second routing criteria optionally include (728) a criterion that is met when the call-routing service has not enabled the carrier routing protocol.

In some embodiments, after the phone call has been routed to the second electronic device, the phone call is optionally presented at the second electronic device as illustrated in FIGS. 6B and 6C.

In some embodiments, before receiving the request to route the phone call, the first electronic device optionally opens (704) a connection associated with the phone call. Further in accordance with the determination that the first routing criteria (e.g., routing-service routing) have been met (714), the first electronic device closes (722) the connection associated with the phone call. In some embodiments, the connection associated with the phone call is closed in response to receiving confirmation that the second electronic device has opened a connection associated with the phone call (724).

In some embodiments, in accordance with the determination that the second routing criteria (e.g., through-device routing) have been met (716), the first electronic device maintains (736) the connection associated with the phone call for the duration of the phone call. In some embodiments, the first electronic device optionally receives (742) a hang-up command from the second electronic device. For example, in FIG. 6B, the second electronic devices optionally receives user input on the end call user interface object 632, and in response the second electronic device sends a hang-up command to the first electronic device. In response to receiving the hang-up command, the first electronic device optionally closes (744) the connection associated with the phone call. In some embodiments, in accordance with the determination that the second routing criteria have been met, the first electronic device optionally causes (740) additional data to be routed to the second electronic device (e.g., voicemail, SMS, etc.).

In some embodiments, causing call data associated with the phone call to be routed through the first electronic device to the second electronic device optionally includes receiving (732) the call data and sending different data to the second electronic device (e.g., audio data extracted from the call data, audio data and metadata, etc.).

In some embodiments, causing call data associated with the phone call to be routed through the first electronic device to the second electronic device optionally includes receiving (734) the call data and sending the call data to the second electronic device without extracting audio content from the call data (e.g., the call data is relayed, unchanged to the second electronic device).

In some embodiments, in accordance with the determination that the second routing criteria (e.g., through-device routing) have been met, the first electronic device displays (738) a user interface object indicating the phone call is routed through the first electronic device (e.g., on a display such as displays 112, 340, and/or 450 in FIGS. 1A-B and 2-4). For example, the first electronic device optionally displays a status bar a different size, different color, etc. In FIG. 6C, the first electronic device displays user interface object 634 indicating the phone call is routed through the first electronic device. In some embodiments, the first electronic device receives (746) input that corresponds to selection of the user interface object (e.g., detecting a tap gesture on the user interface object 634). In response to receiving the input, the first electronic device optionally causes (748) the call data to no longer be routed to the second electronic device (and start playing back the call audio on a speaker of the first electronic device, such as speaker 111 illustrated in FIG. 1A). For example, FIG. 6D illustrates the phone call presented on the first electronic device and not presented on the second electronic device.

In some embodiments, in accordance with the determination that the first routing criteria (e.g., routing-service routing) have been met, the first electronic device optionally displays (726) a user interface object indicating the phone call has been routed to the second electronic device (e.g., on a display such as displays 112, 340, and/or 450 in FIGS. 1-4). For example, the same status bar is optionally displayed to indicate an ongoing call whether routing-service routing is used or through-device routing is used, so as to harmonize the user interface no matter which routing scheme is supported by the carrier.

In some embodiments, there are optionally differences in functionality depending on the routing scheme. For example, if through-device routing is used, the phone call optionally ends on the second electronic device if the first electronic device is turned off or loses signal during the phone call. If routing-service routing is used, the phone call optionally continues on the second electronic device if the first electronic device is turned off or loses signal during the phone call. For another example, the first electronic device is optionally able to make a second phone call after routing the first phone call using routing-service routing. If through-device routing is used, the first electronic device is optionally unable to make a second phone call until the first phone call ends.

The operations in the information processing methods described above are, optionally, implemented by running one or more functional modules in an information processing apparatus such as general purpose processors (e.g., as described above with respect to FIGS. 1A and 3) or application specific chips.

The operations described above with reference to FIGS. 7A-7D are, optionally, implemented by components depicted in FIGS. 1A-1B. For example, receiving operation 702, receiving operation 706, sending operation 720, and causing operation 730 are, optionally implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations in FIGS. 7A-7D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900 and 1100) are also applicable in an analogous manner to method 700 described above with respect to FIGS. 7A-7D. For example, the user interfaces, user interface objects, affordances, phone controls, phone calls, routing schemes, and electronic devices described above with reference to method 700 optionally have one or more of the characteristics of the user interfaces, user interface objects, affordances, phone controls, phone calls, routing schemes, and electronic devices described herein with reference to other methods described herein (e.g., methods 900 and 1100). For brevity, these details are not repeated here.

Pull to First Device from Second Device

Many electronic devices provide communications capabilities (e.g., voice, text, and/or video communications). There is a need to provide a fast, efficient, and intuitive way for users to route phone calls (and other communications) among electronic devices. In particular, the embodiments below provide an intuitive way for a first electronic device to pull a phone call from a second electronic device to a first electronic device.

FIGS. 8A-8H illustrate exemplary user interfaces for pulling a phone call from a second electronic device to a first electronic device in accordance with some embodiments of the disclosure. The user interfaces in these figures are used to illustrate processes described below, including the processes described below with reference to FIGS. 9A-9C.

Figure 8A:
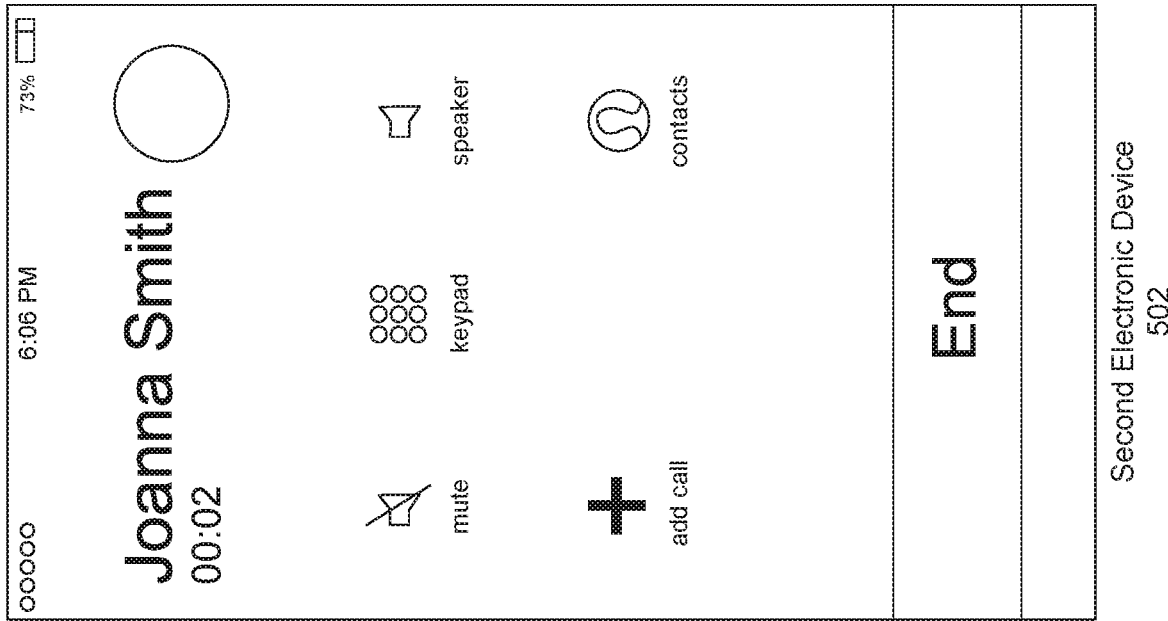
FIGS. 8A-8H illustrate exemplary user interfaces for pulling a phone call from a second electronic device to a first electronic device in accordance with some embodiments of the disclosure.
Figure 8A:
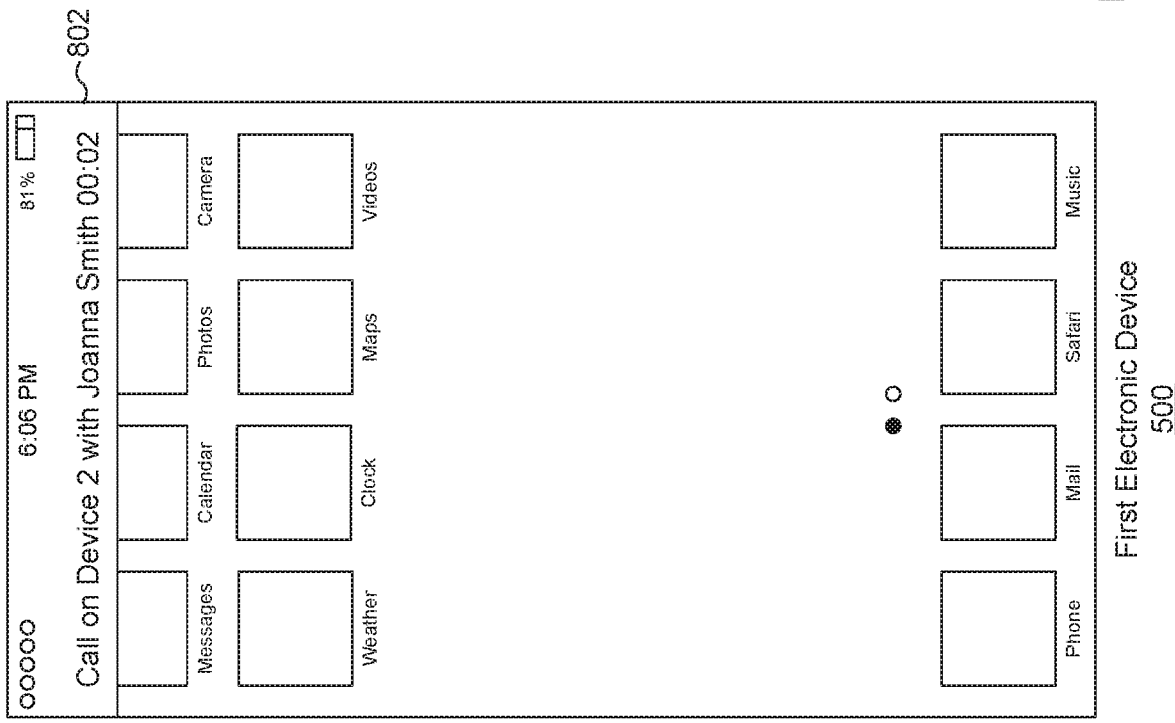
Figure 8B:
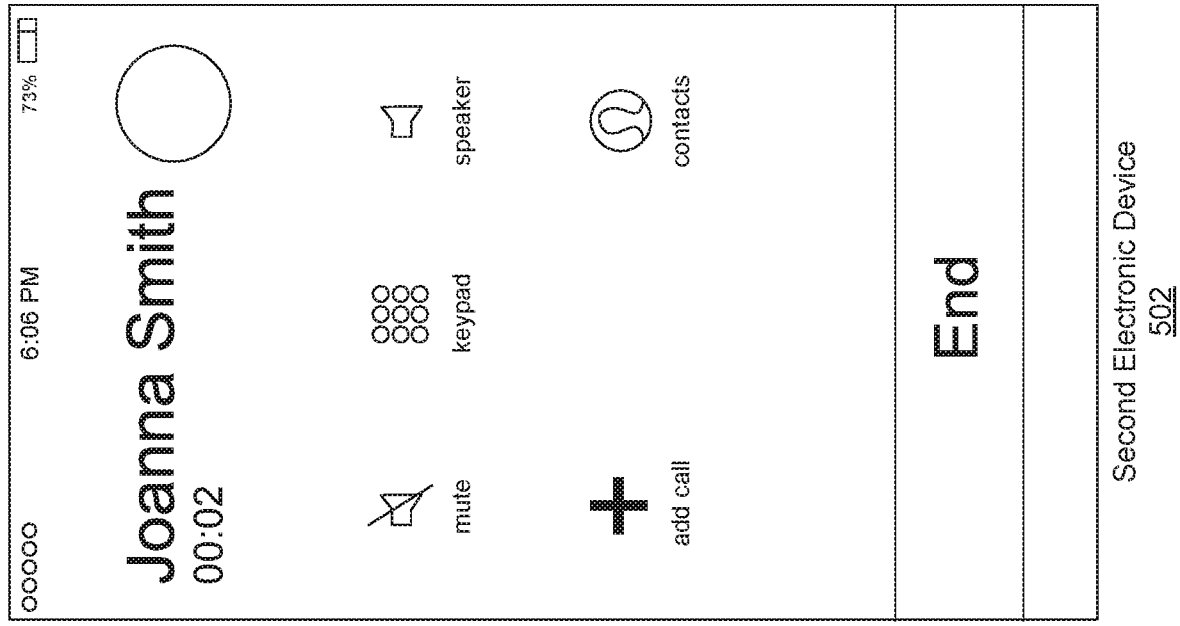
Figure 8B:
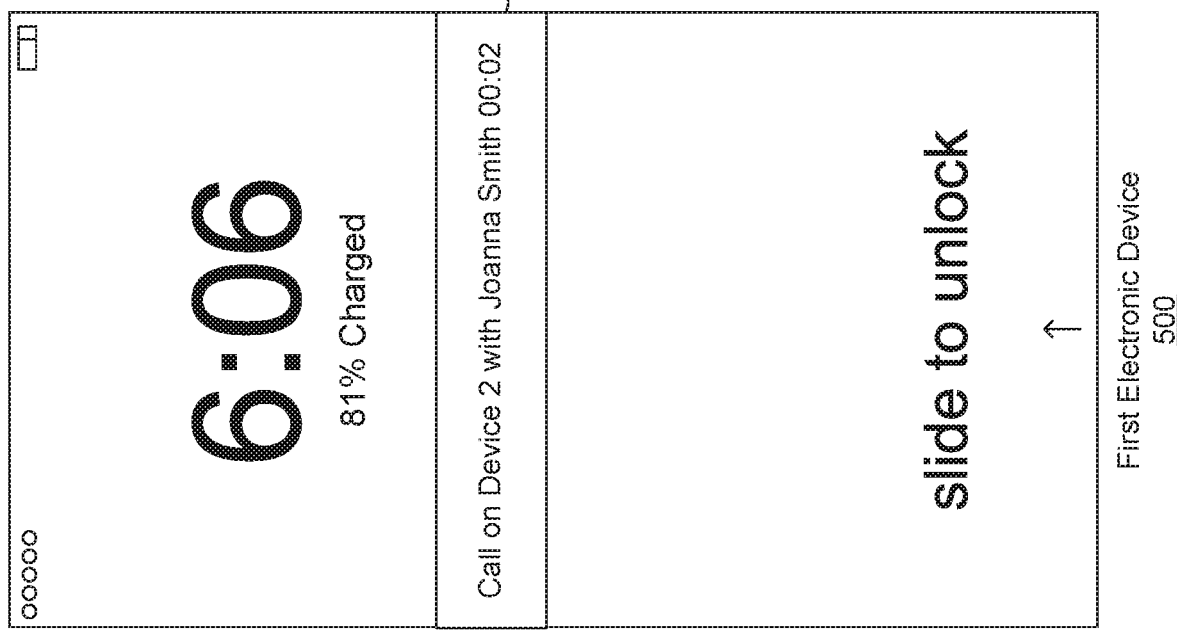
Figure 8C:
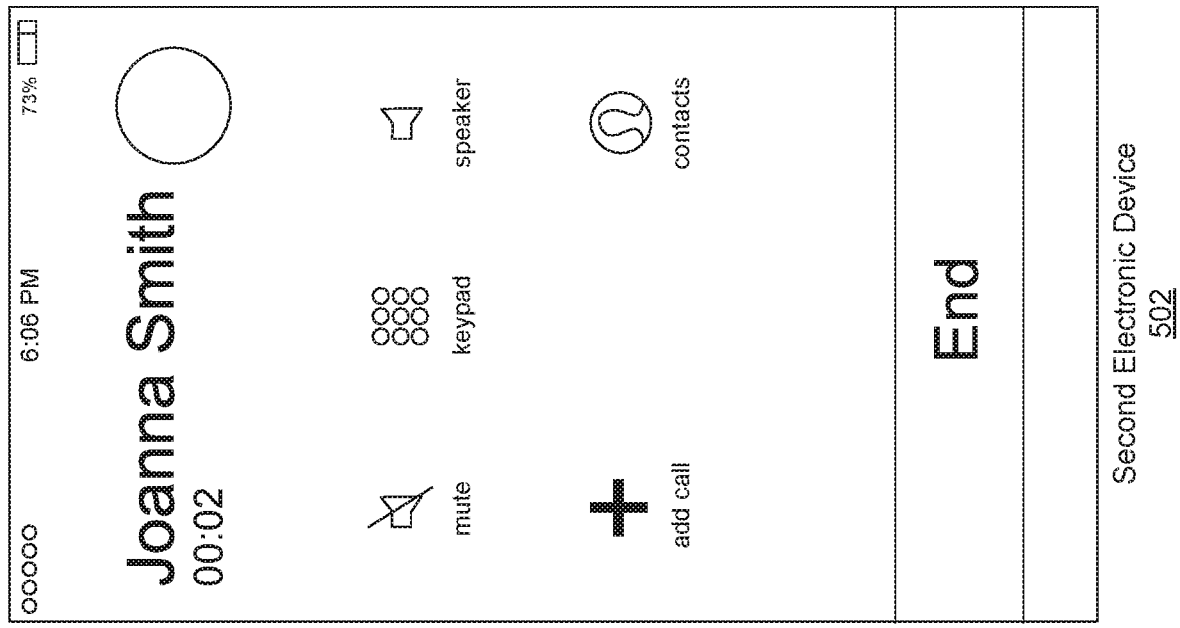
Figure 8C:
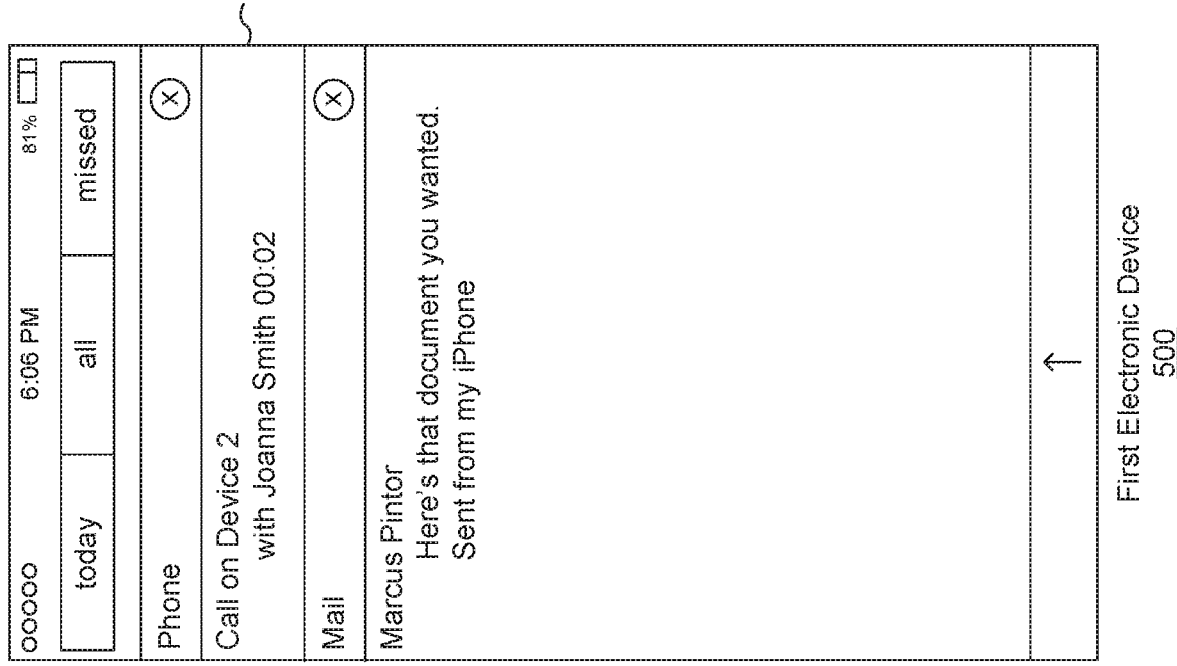
Figure 8D:
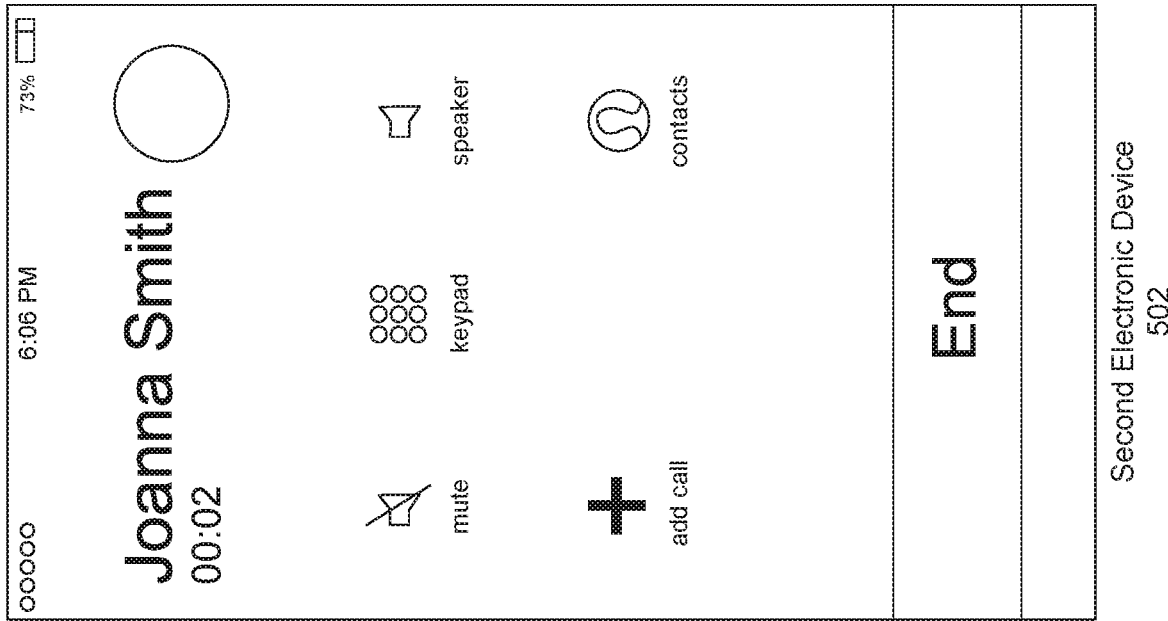
Figure 8D:
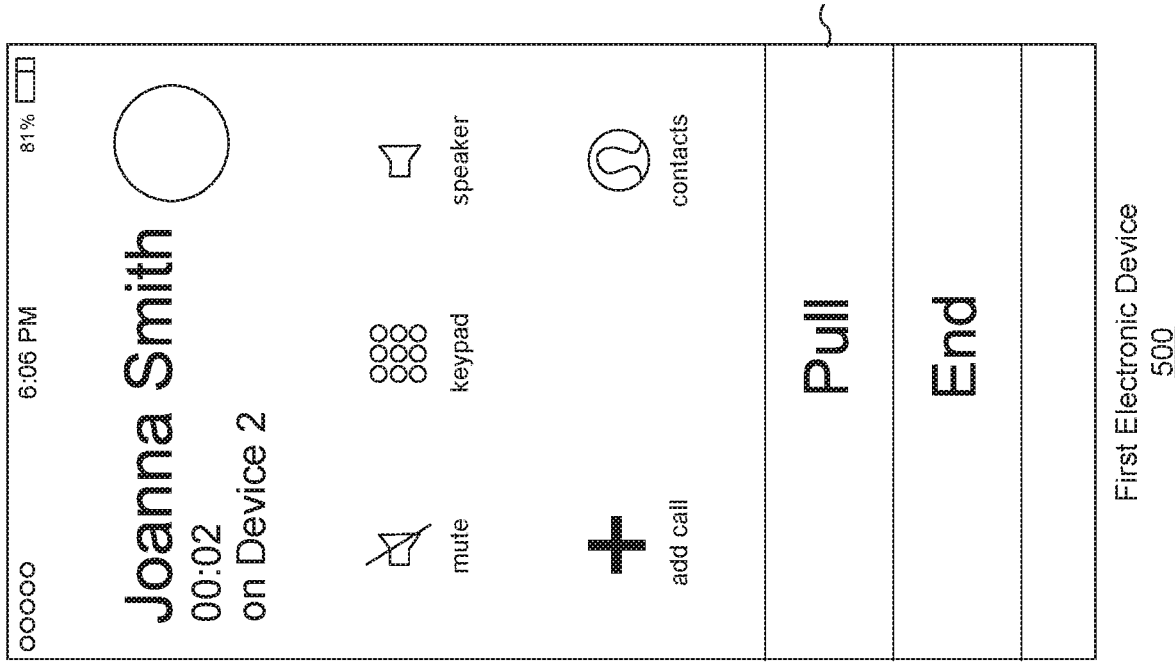

FIG. 8A illustrates example user interfaces of a first electronic device 500 and a second electronic device 502. A phone call is presented on the second electronic device 502, and the phone call is not presented on the first electronic device 500. The user interface of the first electronic device 500 includes a user interface object 802 indicating the phone call has been routed to the second electronic device 502. FIG. 8A illustrates the user interface object 802 displayed on a home screen of the first electronic device 502. In FIG. 8B, a user interface object 804 indicating the phone call has been routed to the second electronic device 502 is displayed on a lock screen of the first electronic device. In FIG. 8C, a user interface object 806 indicating the phone call has been routed to the second electronic device 502 is displayed on a notifications user interface of the first electronic device. In FIG. 8D, a user interface object 808 indicating the phone call has been routed to the second electronic device 502 is displayed in a phone call user interface of the first electronic device.

Figure 8E:
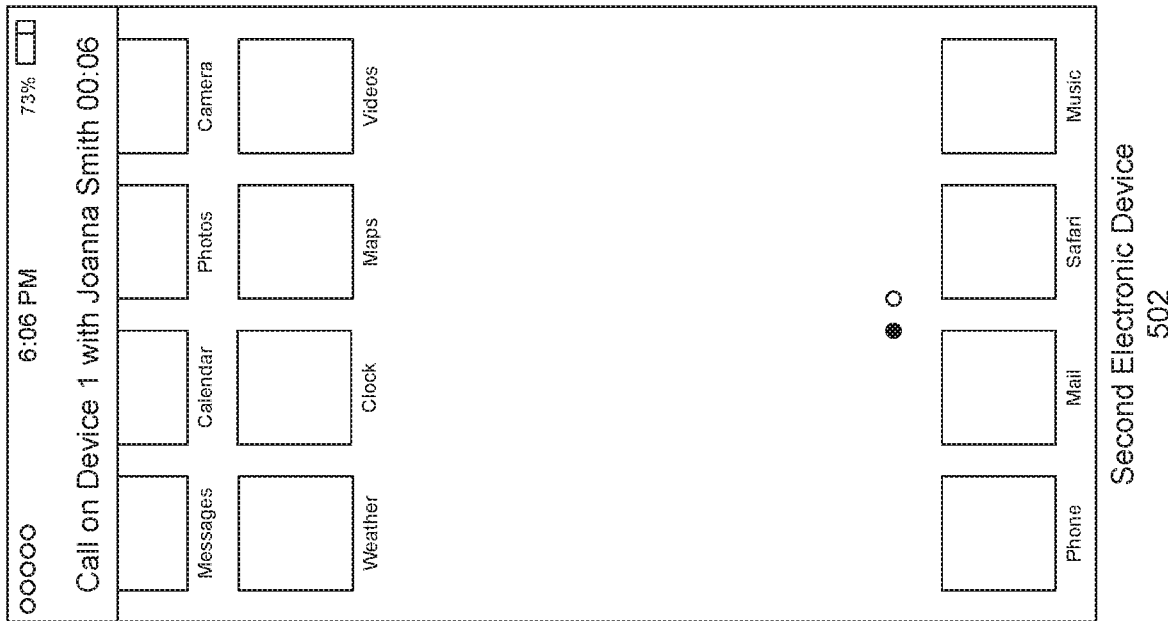
Figure 8E:
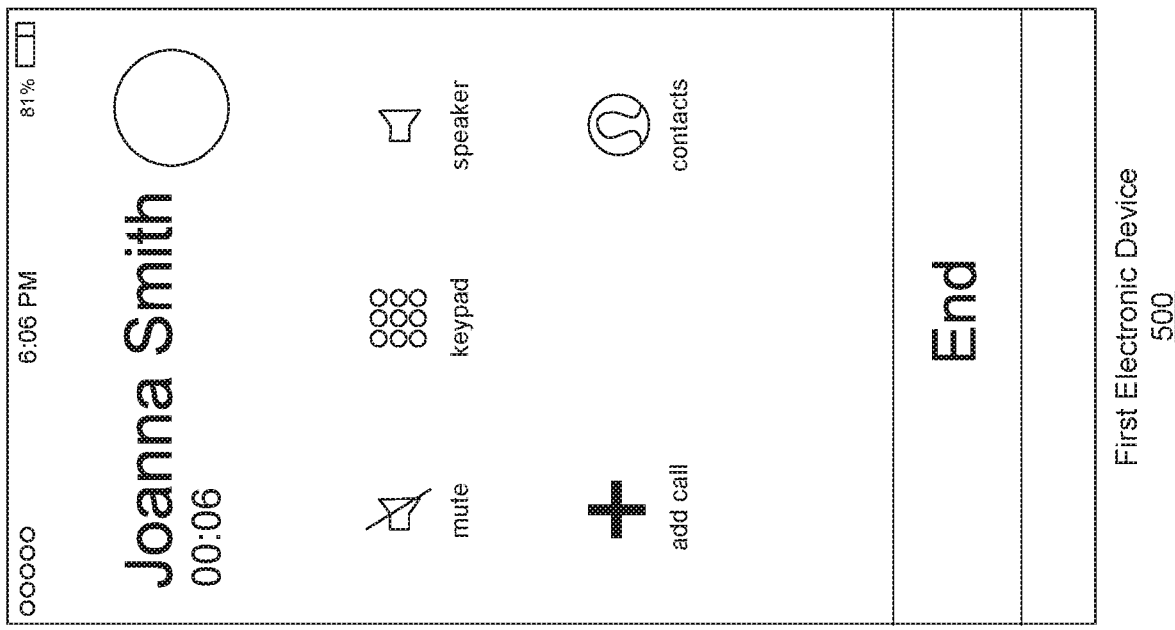

In some embodiments, input is optionally received on any of the user interface objects 802, 804, 806, and 808 to cause the phone call to be routed to the first electronic device 500 (e.g., the phone call may be pulled to the first electronic device). In response to the input, the phone call is optionally presented on the first electronic device 500, as illustrated in FIG. 8E.

Figure 8F:
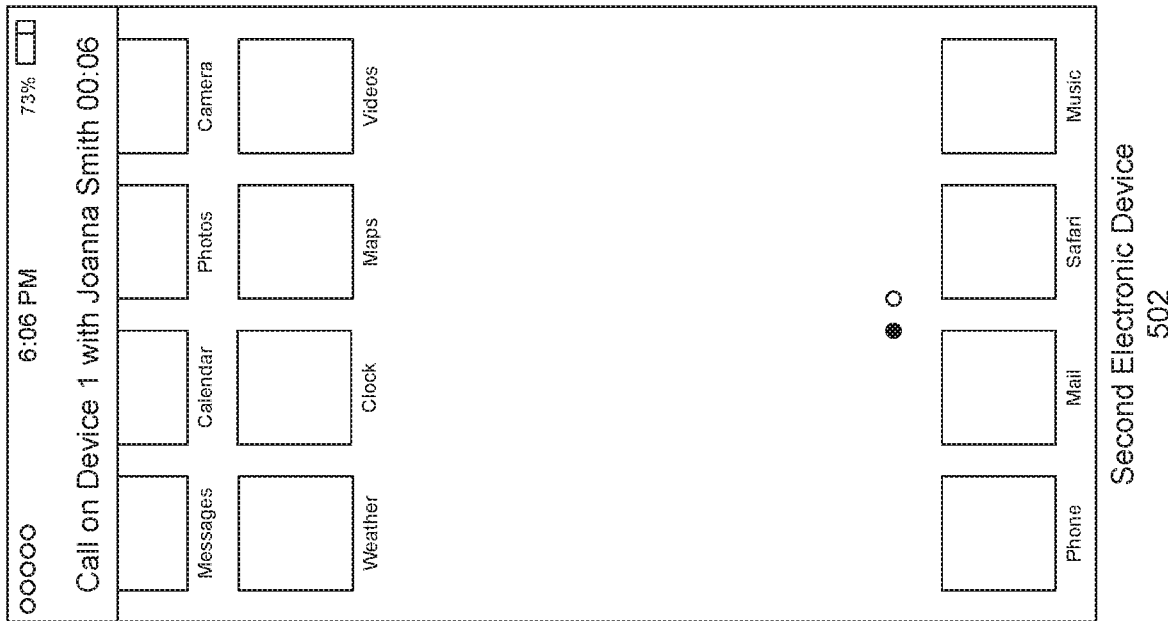
Figure 8F:
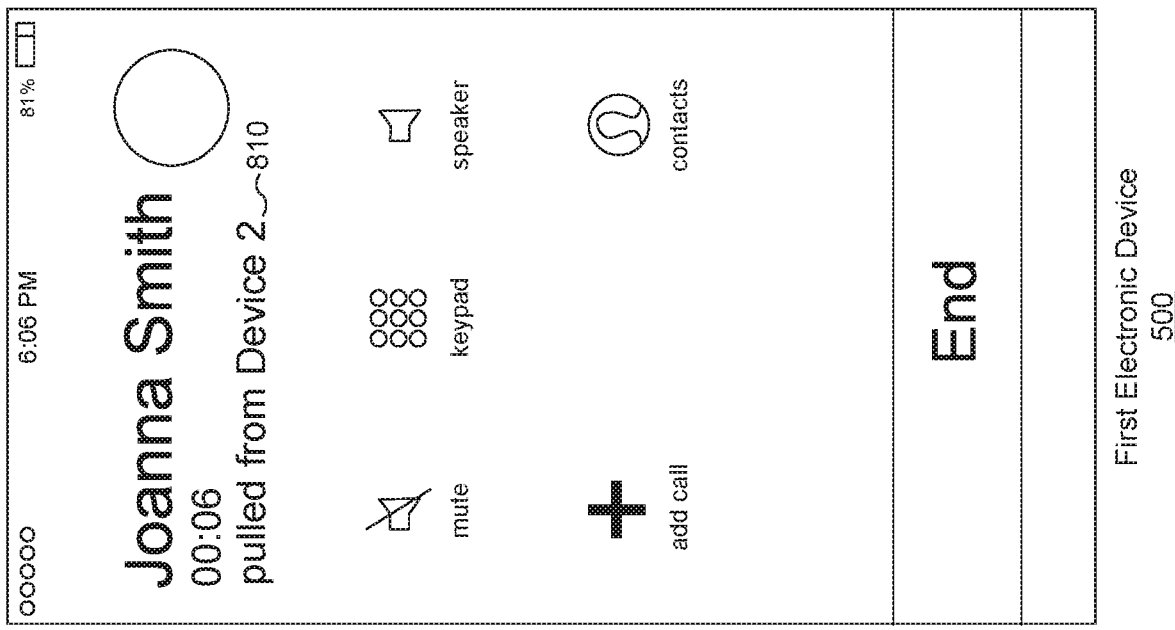
Figure 8G:
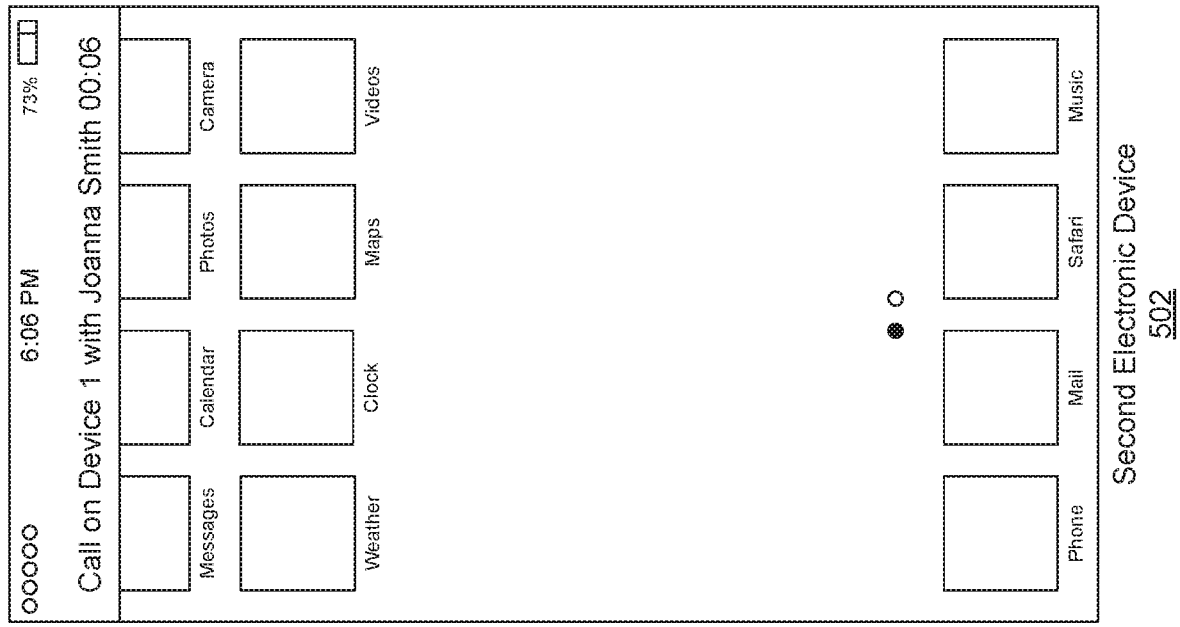
Figure 8G:
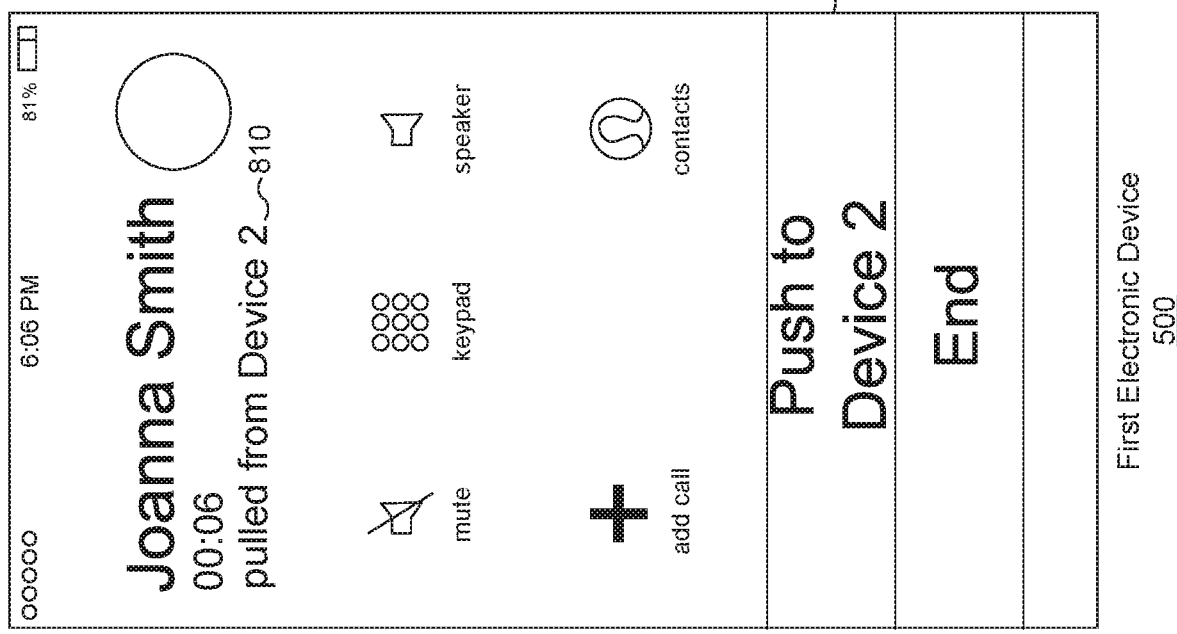
Figure 8H:
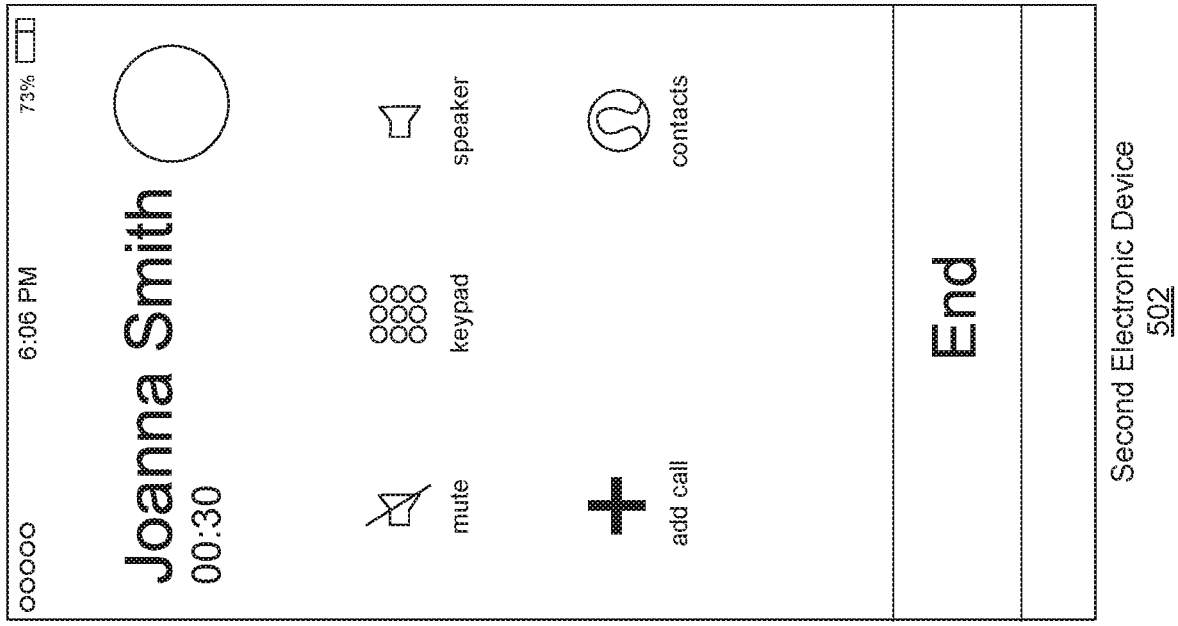
Figure 8H:
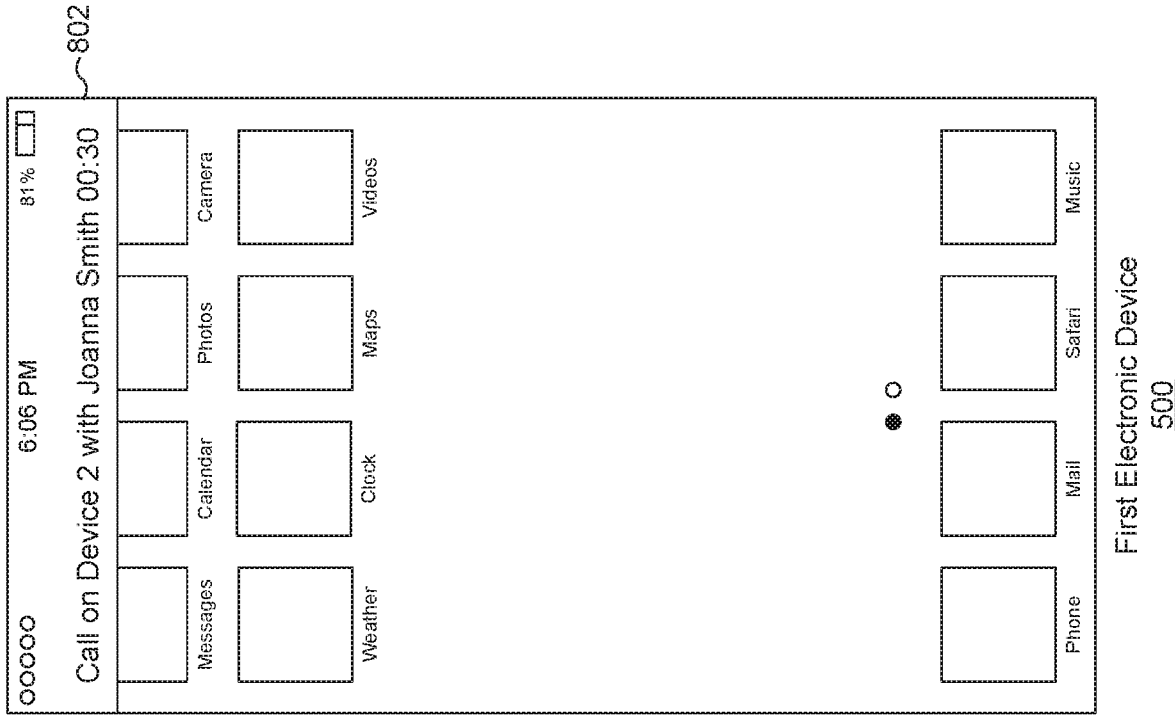

As illustrated in FIG. 8F, after the phone call is routed to the first electronic device, the user interface of the first electronic device 500 optionally includes an identifier 810 of the second electronic device 502 (e.g., indicating that the call was pulled from the second electronic device). In some embodiments, the user interface also optionally includes an affordance 812 for transferring the phone call back to the second electronic device, as illustrated in FIG. 8G. In response, to selection of the affordance 812, the phone call is optionally routed back to the second electronic device, as illustrated in FIG. 8H.

Figure 9A:
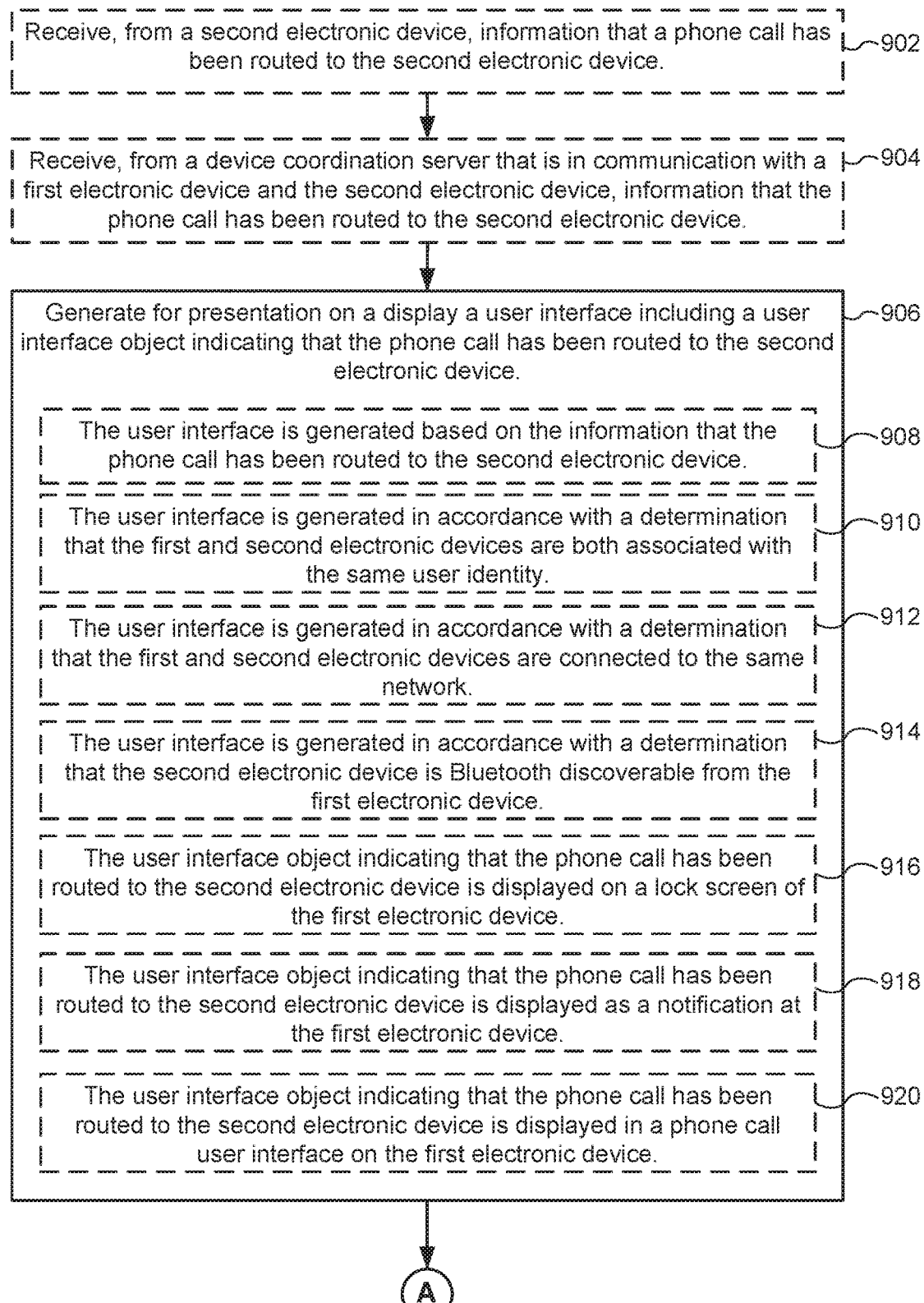
FIGS. 9A-9C are flow diagrams illustrating a method of pulling a phone call from a second electronic device to a first electronic device in accordance with some embodiments.
Figure 9B:
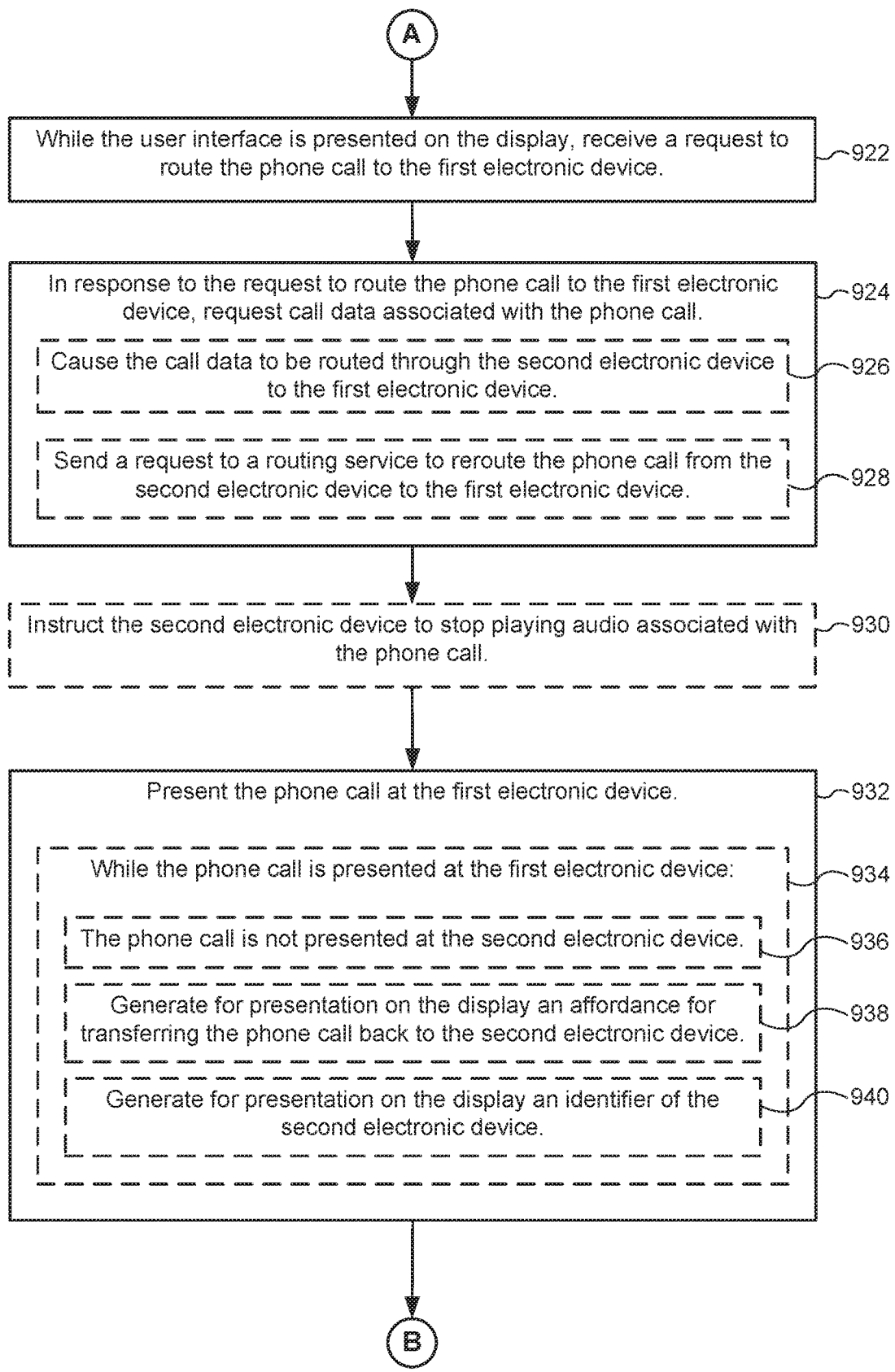
Figure 9C:
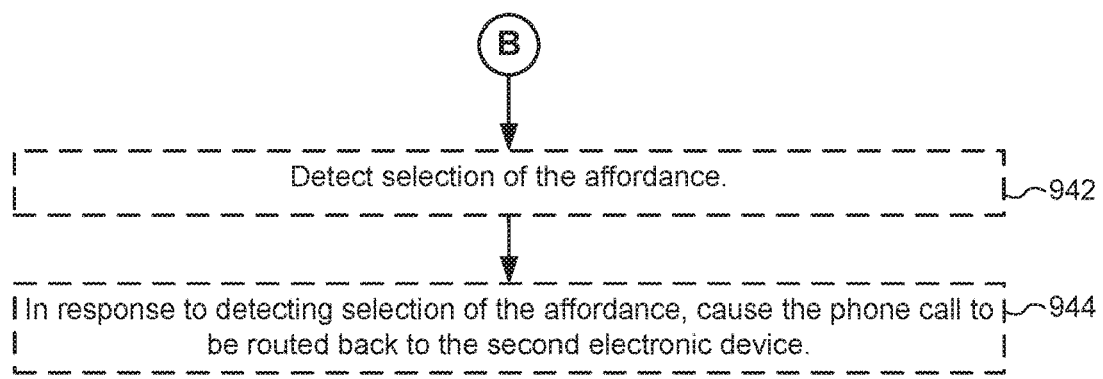

FIGS. 9A-9C are flow diagrams illustrating a method of pulling a phone call from a second electronic device to a first electronic device in accordance with some embodiments. The method is optionally performed at an electronic device as described above with reference to FIGS. 1-5 (e.g., electronic device 100, 300, 500, or 502, etc.). Some operations in method 900 are, optionally, combined and/or the order of some operations is, optionally, changed.

As described below, the method 900 provides ways of pulling a phone call from a second electronic device to a first electronic device. The method reduces the cognitive burden on a user when interacting with a user interface on the device by providing an intuitive user interface for routing a phone call among electronic devices, thereby creating a more efficient human-machine interface. For battery-operated electronic devices, increasing the efficiency of the user's interaction with the user interfaces conserves power and increases the time between battery charges.

In some embodiments, a first electronic device 500 with one or more processors and memory generates (906) for presentation on a display (e.g., a remote display device or a display that is integrated into the electronic device, such as displays 112, 340, and/or 450 in FIGS. 1-4) a user interface including a user interface object indicating that a phone call has been routed to a second electronic device (e.g., text, an icon, or a button indicating the phone call on the second electronic device). In some embodiments, the user interface object indicating that the phone call has been routed to the second electronic device is optionally displayed (916) on a lock screen of the first electronic device. In some embodiments, the user interface object indicating that the phone call has been routed to the second electronic device is optionally displayed (918) as a notification at the first electronic device. In some embodiments, the user interface object indicating that the phone call has been routed to the second electronic device is optionally displayed (920) in a phone call user interface on the first electronic device. For example, the user interface optionally includes any of user interface objects 802 (status bar), 804 (on a lock screen), 806 (notification), or 808 (in a phone call user interface) illustrated in FIGS. 8A-8D, among other possibilities.

While the user interface is presented on the display, the first electronic device receives (922) a request to route the phone call to the first electronic device (e.g., receiving user input on the first electronic device requesting to route the phone call to the first electronic device, receiving the request from a different electronic device, etc.). For example, the first electronic device optionally receives input selecting any of user interface objects 802 (status bar), 804 (on a lock screen), 806 (notification), or 808 (in a phone call user interface) illustrated in FIGS. 8A-8D, among other possibilities.

In response to the request, the first electronic device requests (924) call data (e.g., from a carrier associated with the phone call, from the second electronic device, etc.) associated with the phone call.

After requesting the call data, the first electronic device presents (932) the phone call at the first electronic device (e.g., in response to requesting the call data, the call is routed to the first electronic device and the first electronic device connects the phone call). For example, FIGS. 8E-8G illustrate the phone call presented in a user interface of the first electronic device.

In some embodiments, after requesting the call data, the first electronic device optionally instructs (930) the second electronic device to stop playing audio associated with the phone call (e.g., through a speaker or headset in communication with the second electronic device, such as speaker 111 illustrated in FIG. 1A).

In some embodiments, while the phone call is presented at the first electronic device (934), the phone call is optionally not presented (936) at the second electronic device (e.g., the first device and the second device are not devices that share a common phone line).

In some embodiments, requesting the call data optionally includes causing (926) the call data to be routed through the second electronic device to the first electronic device (e.g., using through-device routing, as described above). In some embodiments, requesting the call data optionally includes sending (928) a request to a routing service to reroute the phone call from the second electronic device to the first electronic device (e.g., using routing-service routing, as described above).

In some embodiments, the first electronic device optionally receives (902), from the second electronic device, information that the phone call has been routed to the second electronic device, and the user interface is generated based on the information (908). In some embodiments, the information that the phone call has been routed to the second electronic device is received prior to displaying user interface object indicating that a phone call has been routed to a second electronic device on the display. For example, user interface objects 802, 804, 806, and 808 in FIGS. 8A-8D include an identifier ("Device 2") of the second electronic device, and such an identifier is optionally generated based on information that the phone call has been routed to the second electronic device.

In some embodiments, the first electronic device optionally receives (904), from a device coordination server 506 (e.g., a server at a carrier, phone service provider, internet service provider, other service provider, etc. that optionally stores information regarding first and second electronic devices and optionally sends the information to other electronic devices) that is in communication with the first electronic device and the second electronic device, information that the phone call has been routed to the second electronic device, and the user interface is generated based on the information (904). For example, user interface objects 802, 804, 806, and 808 in FIGS. 8A-8D include an identifier ("Device 2") of the second electronic device, and such an identifier is optionally generated based on information from the device coordination server.

In some embodiments, while the phone call is presented at the first electronic device (934), the first electronic device optionally generates (938) for presentation on the display an affordance for transferring the phone call back to the second electronic device. For example, FIG. 8G illustrates an affordance 812 displayed on the first electronic device for transferring the phone call back to the second electronic device. In some embodiments, the first electronic device optionally detects (942) selection of the affordance, and in response to detecting selection of the affordance, the first electronic device causes (944) the phone call to be routed back to the second electronic device (using the same approach that was used to pull the call from the second electronic device). For example, FIG. 8H illustrates the phone call presented at the second electronic device after selection of the affordance 812 in FIG. 8G.

In some embodiments, while the phone call is presented at the first electronic device (934), the first electronic device optionally generates (940) for presentation on the display an identifier of the second electronic device (e.g., text indicating that the call is routed "from your iPhone", etc.). For example, FIGS. 8F and 8G illustrate an identifier 810 ("pulled from Device 2") of the second electronic device.

In some embodiments, the user interface object is optionally generated (910) in accordance with a determination that the first and second electronic devices are both associated with the same user identity. In some embodiments, the user interface object is optionally generated (912) in accordance with a determination that the first and second electronic devices are connected to the same network (e.g., the same WiFi, the same subnet, etc.). In some embodiments, the user interface object is optionally generated (914) in accordance with a determination that the second electronic device is Bluetooth discoverable from the first electronic device. For example, the first electronic device is optionally only able to pull phone calls from devices that are associated with the same user identity, on the same network, and/or Bluetooth discoverable from the first electronic device, among other possibilities (e.g., this allows routing only to devices that are compatible with the routing scheme and provides an element of security to the pushing/pulling/etc.).

The operations in the information processing methods described above are, optionally, implemented by running one or more functional modules in an information processing apparatus such as general purpose processors (e.g., as described above with respect to FIGS. 1A and 3) or application specific chips.

The operations described above with reference to FIGS. 9A-9C are, optionally, implemented by components depicted in FIGS. 1A-1B. For example, generating operation 906, receiving operation 922, requesting operation 924, and presenting operation 932 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations in FIGS. 9A-9C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 1100) are also applicable in an analogous manner to method 900 described above with respect to FIGS. 9A-9C. For example, the user interfaces, user interface objects, affordances, phone controls, phone calls, routing schemes, and electronic devices described above with reference to method 900 optionally have one or more of the characteristics of the user interfaces, user interface objects, affordances, phone controls, phone calls, routing schemes, and electronic devices described herein with reference to other methods described herein (e.g., methods 700 and 1100). For brevity, these details are not repeated here.

Push from First Device to Second Device

Many electronic devices provide communications capabilities (e.g., voice, text, and/or video communications). There is a need to provide a fast, efficient, and intuitive way for users to route phone calls (and other communications) among electronic devices. In particular, the embodiments below provide an intuitive way for a first electronic device to push a phone call from a first electronic device to a second electronic device.

FIGS. 10A-10I illustrate exemplary user interfaces for pushing a phone call from a first electronic device to a second electronic device in accordance with some embodiments of the disclosure. The user interfaces in these figures are used to illustrate processes described below, including the processes described below with reference to FIGS. 11A-11C.

Figure 10A:
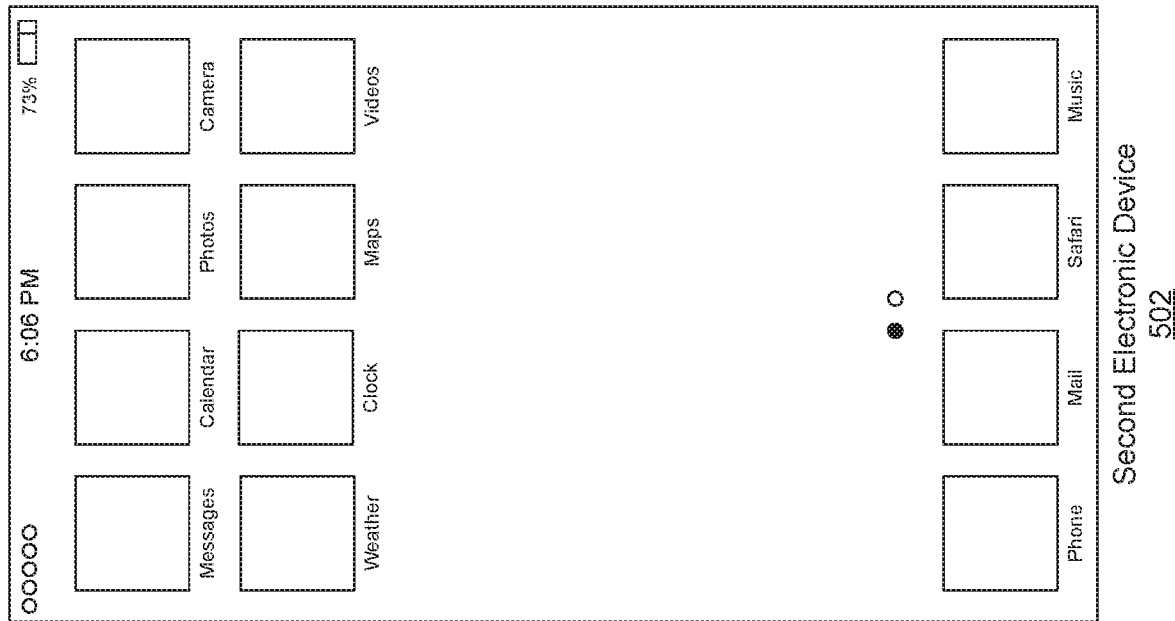
FIGS. 10A-10I illustrate exemplary user interfaces for pushing a phone call from a first electronic device to a second electronic device in accordance with some embodiments of the disclosure.
Figure 10A:
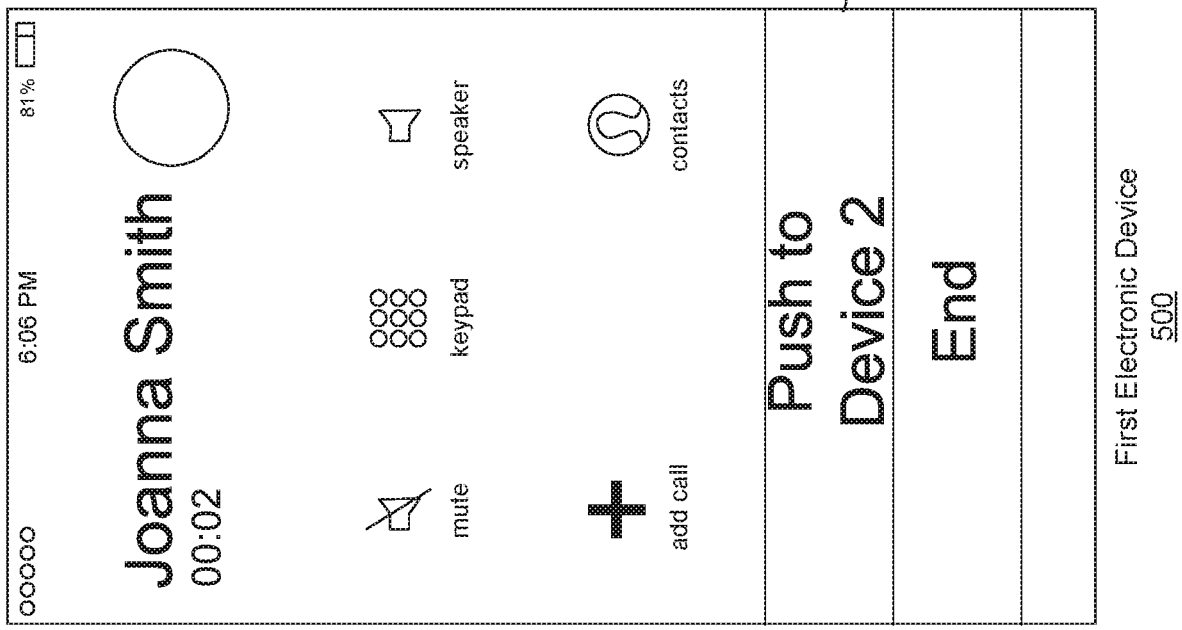
Figure 10B:
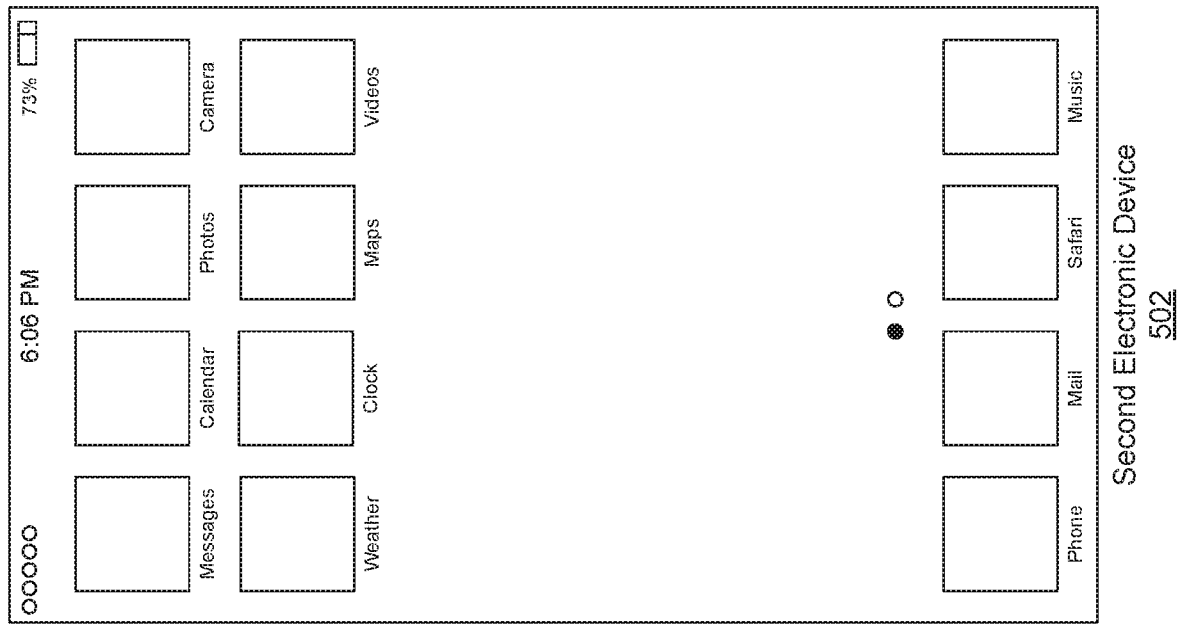
Figure 10B:
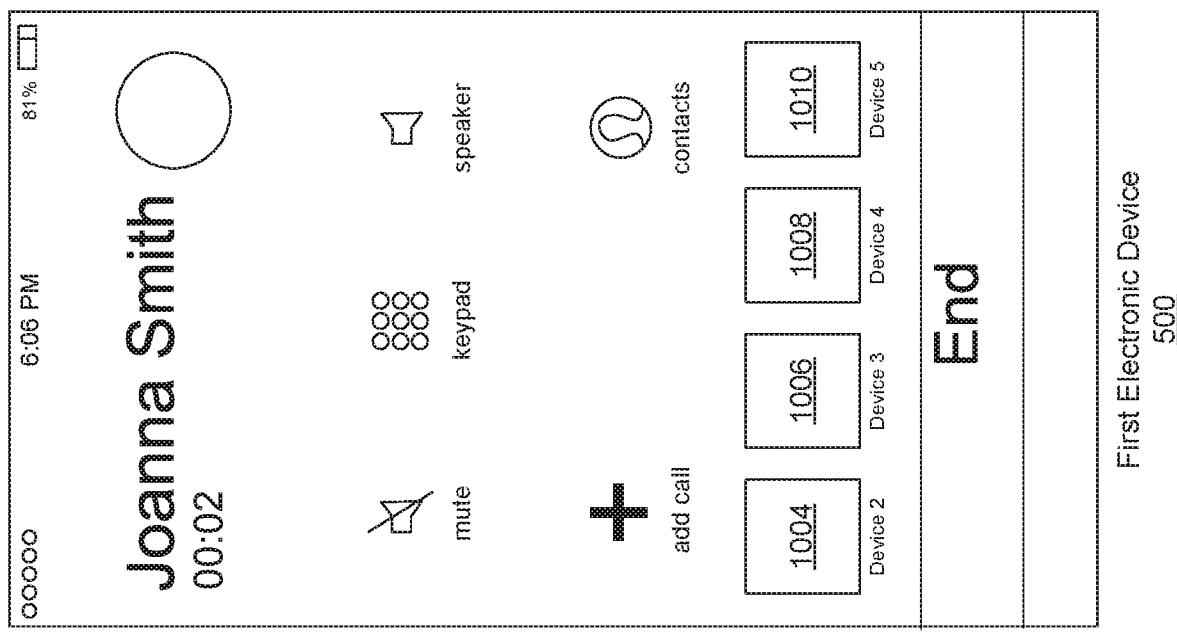
Figure 10C:
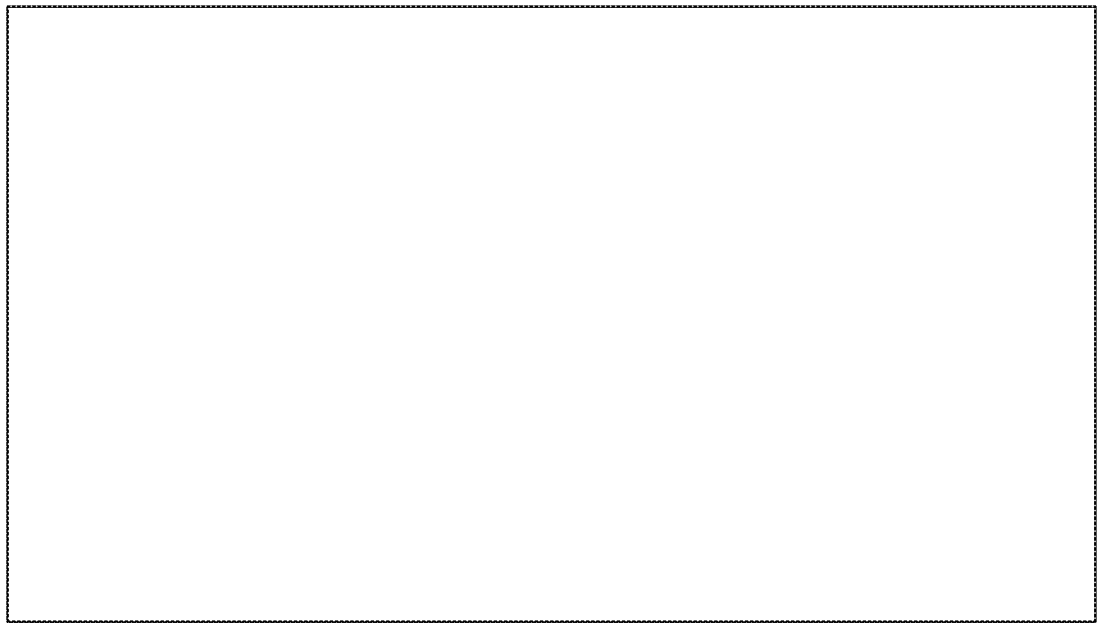
Figure 10C:
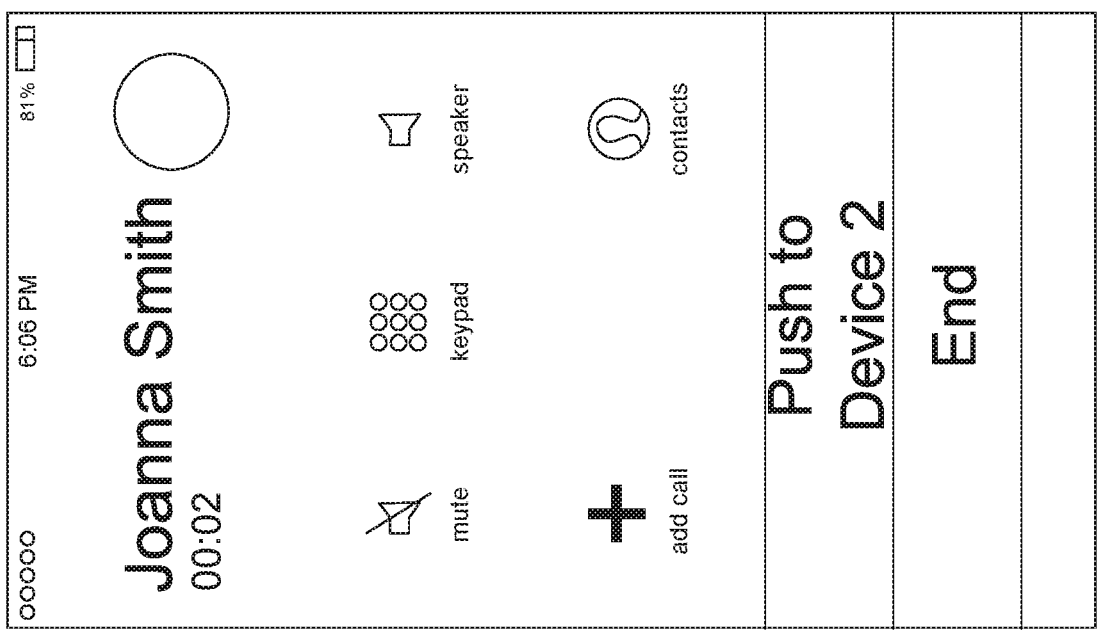

FIG. 10A illustrates example user interfaces of a first electronic device 500 and a second electronic device 502. A phone call is presented on the first electronic device 500, and the phone call is not presented on the second electronic device 502. The user interface of the first electronic device 500 includes an affordance 1002 associated with the second electronic device (e.g., the affordance includes text "Push to Device 2"). FIG. 10A illustrates the affordance 1002 displayed in a phone call user interface of the first electronic device 500. In some embodiments, the second electronic device is optionally selected as a device capable of receiving the phone call. In some embodiments, the second electronic device is optionally included in a plurality of electronic devices selected as devices capable of receiving the phone call. FIG. 10B illustrates a plurality of affordances 1004, 1006, 1008, and 1010, each associated with an electronic device capable of receiving the phone call. Further, FIG. 10C illustrates that the second electronic device is optionally selected as a device capable of receiving the phone call even when the second electronic device is in an inactive state (e.g., locked, sleep mode, hibernate, powered off, etc.).

Figure 10D:
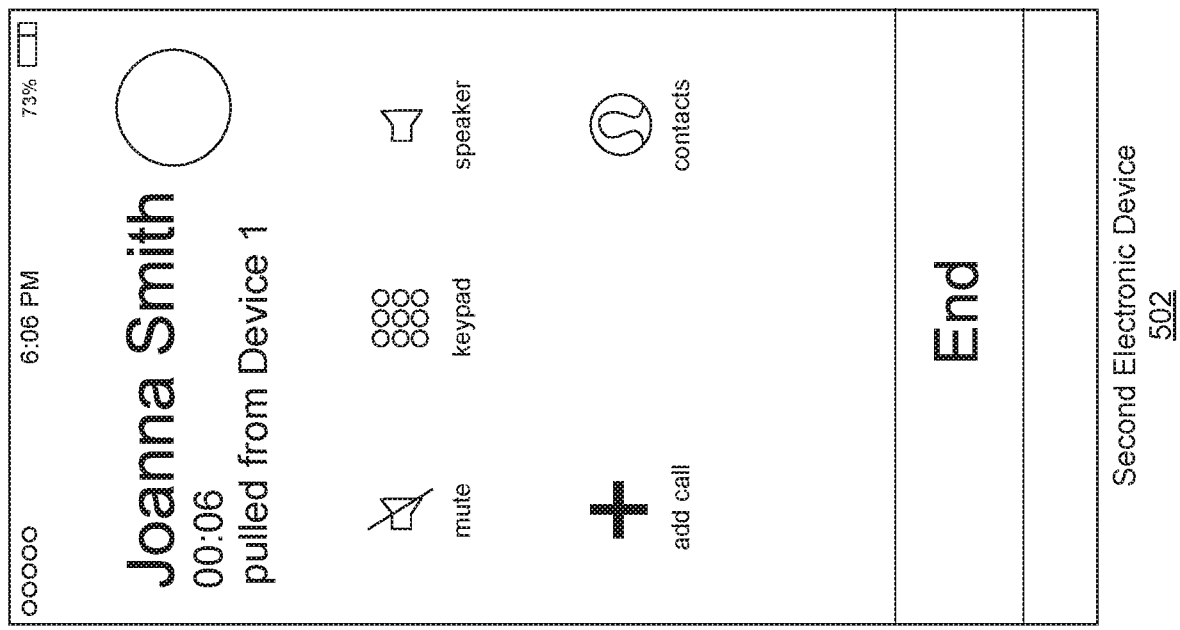
Figure 10D:
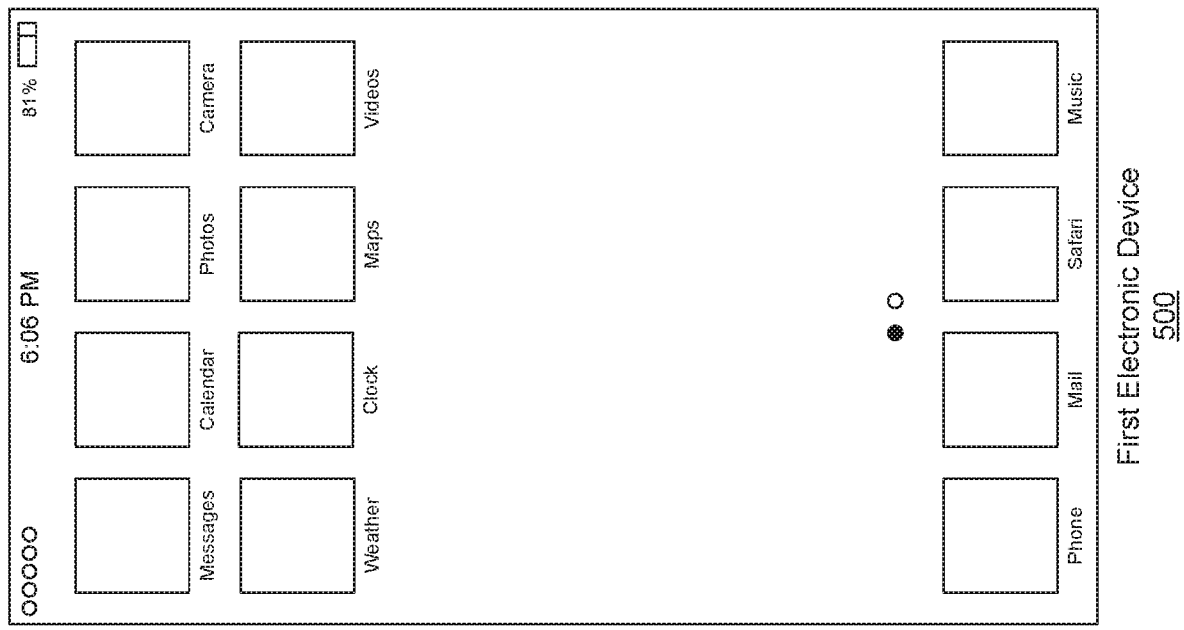

In some embodiments, input is optionally received on the affordance 1002 to cause a phone call application to be invoked on the second electronic device to receive the phone call and call data is routed to the second electronic device, as illustrated in FIG. 10D. Further, FIG. 10D illustrates that the phone call is no longer presented on the first electronic device.

Figure 10E:
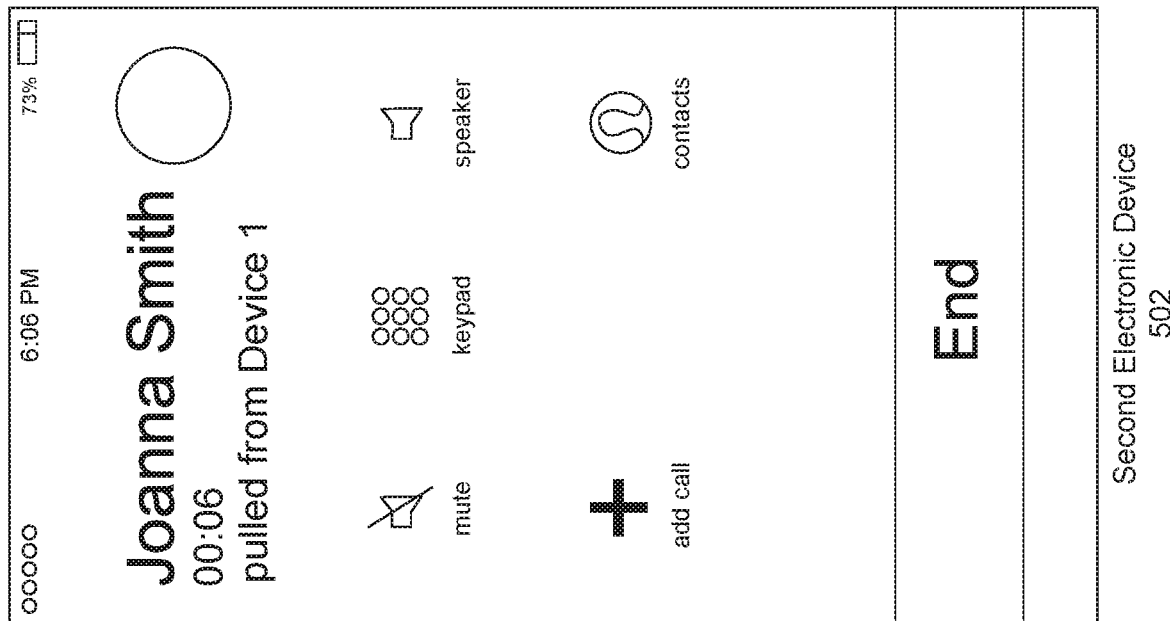
Figure 10E:
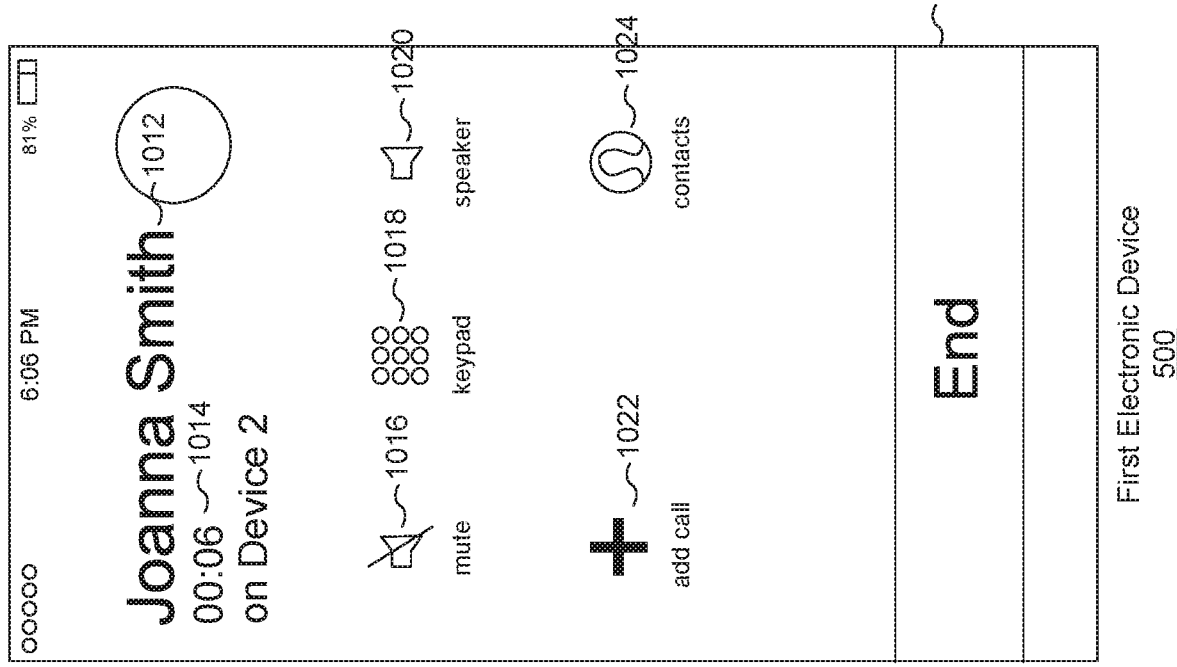

In some embodiments, a phone call interface is displayed on the first electronic device 500 even though the phone call is no longer presented on the first electronic device (e.g., audio of the phone call is not played on the first electronic device and/or call data associated with the phone call is not received, among other possibilities), as illustrated in FIG. 10E. The phone call interface optionally includes a caller identification 1012, a call time 1014, and call controls (mute 1016, keypad 1018, speaker 1020, add call 1022, contacts 1024, and end call 1026, among other possibilities). The call controls are optionally used to control the phone call on the second electronic device. For example, receiving user input on the end call control 1026 optionally causes a hang-up command to be sent to the second electronic device, which causes the call to hang-up on the second electronic device.

Figure 10F:
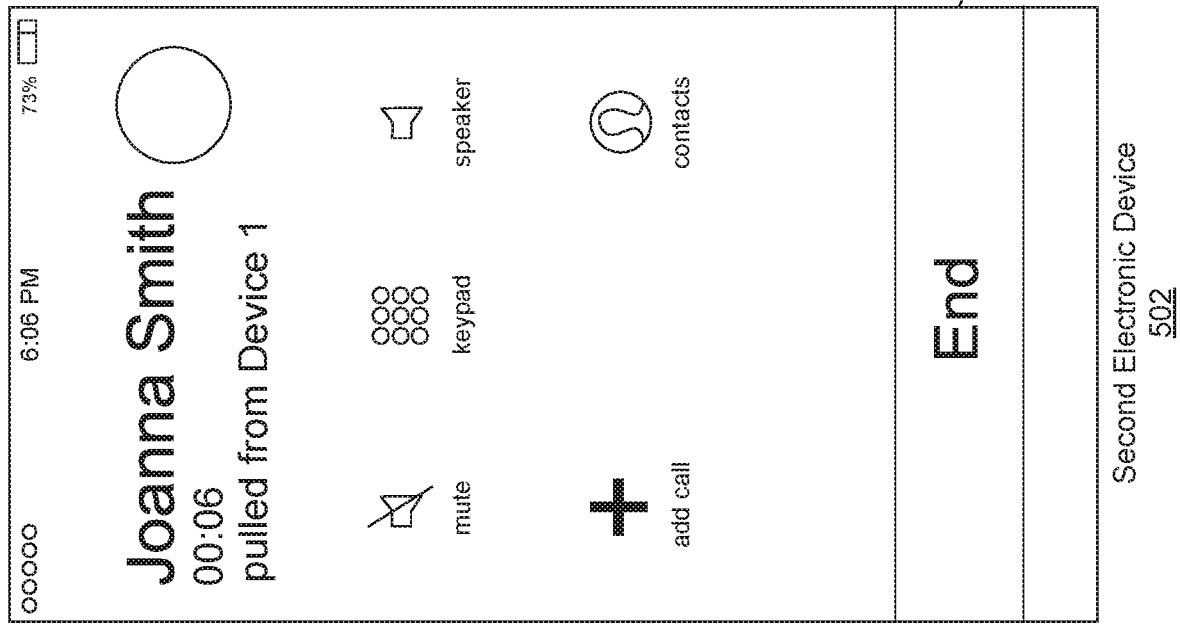
Figure 10F:
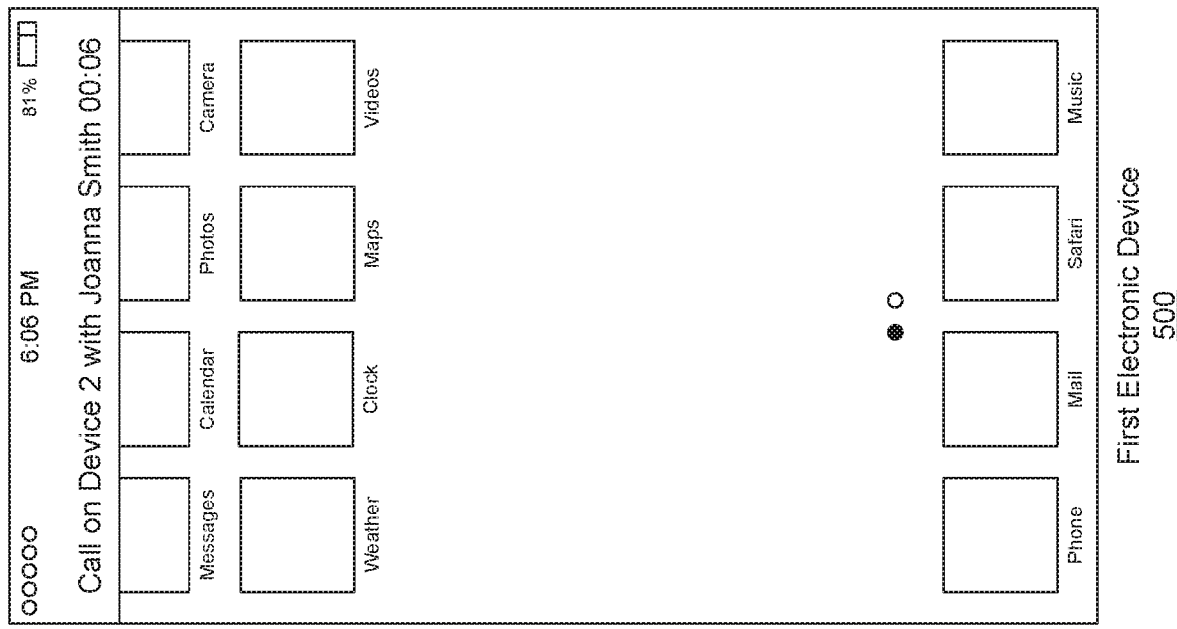
Figure 10G:
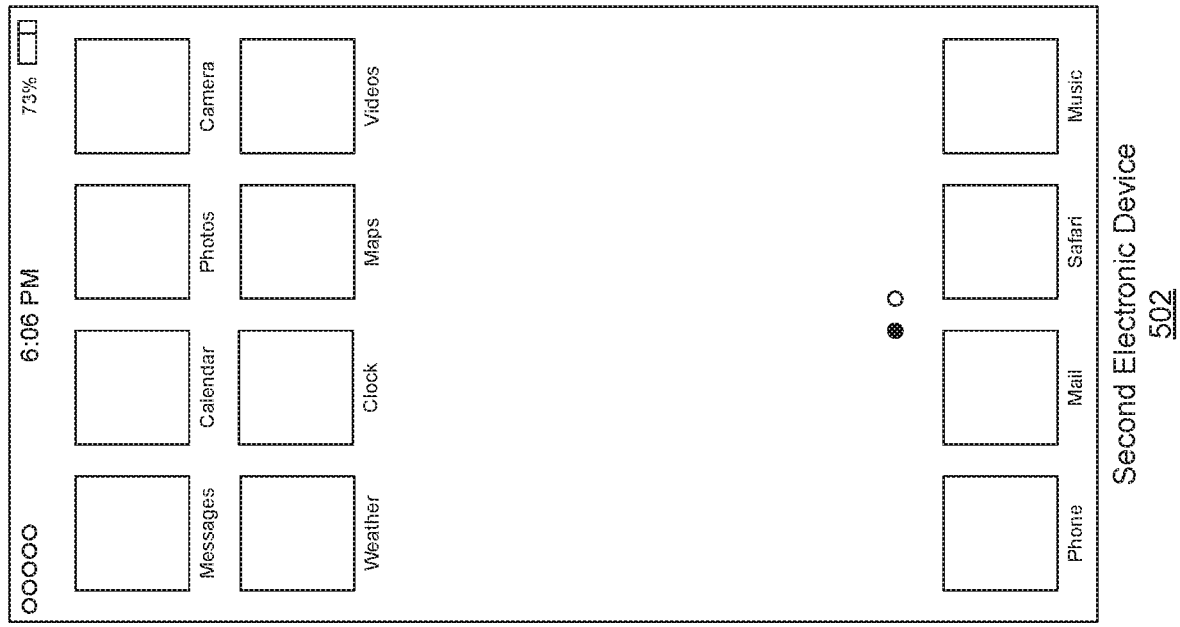
Figure 10G:
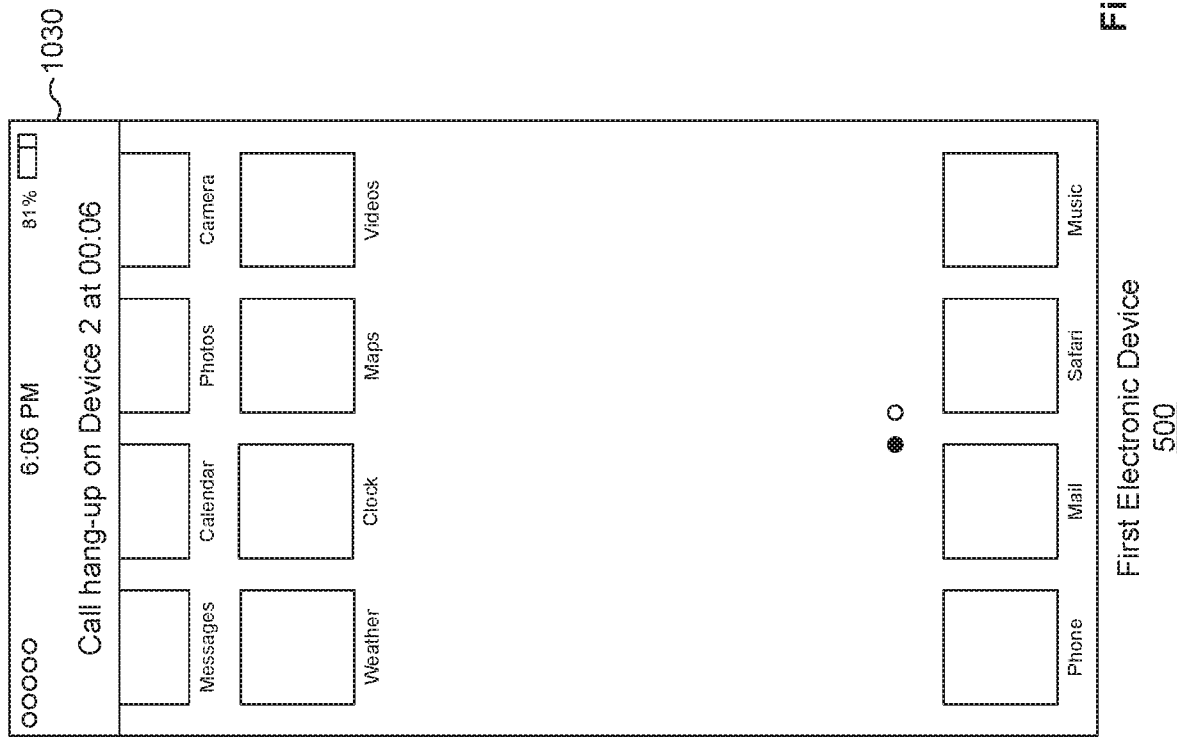

In some embodiments, hanging up the phone call at the second electronic device optionally causes a hang-up notification to be received at the first electronic device as illustrated in FIGS. 10F and 10G. FIG. 10F illustrates an end call control 1028 on the second electronic device. Receiving user input on the end call control 1028 optionally causes the second electronic device to hang-up the phone call, and the first electronic device optionally receives an indication that the second electronic device ended the phone call. In response to receiving the indication, the first electronic device optionally displays a notification 1030 that the second electronic device ended the call, as illustrated in FIG. 10G.

Figure 10H:
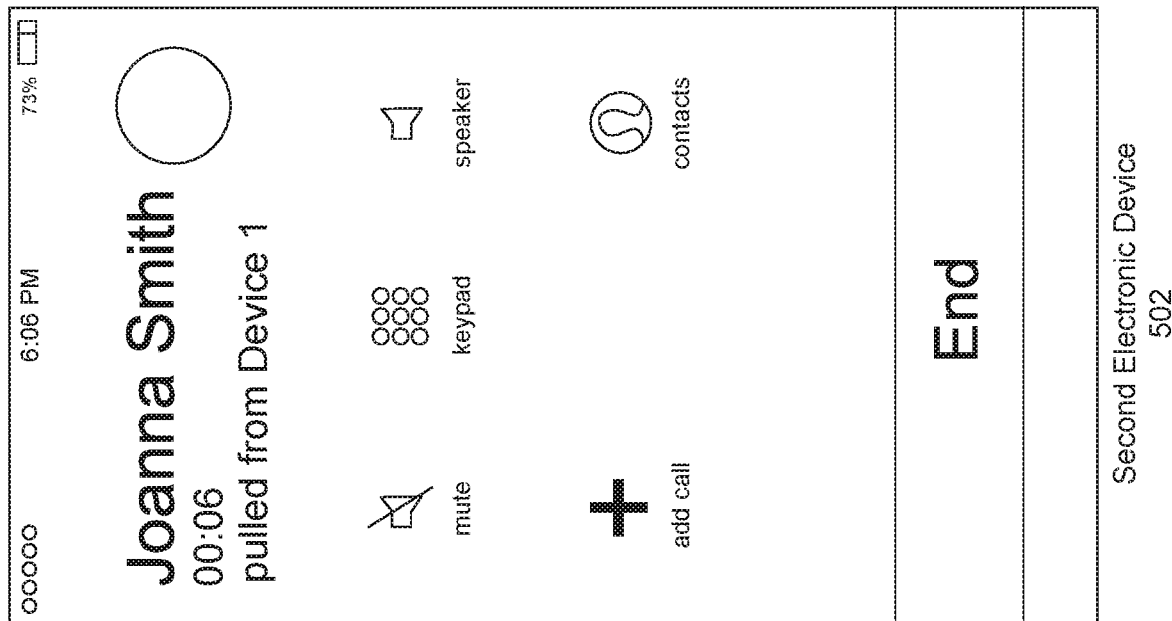
Figure 10H:
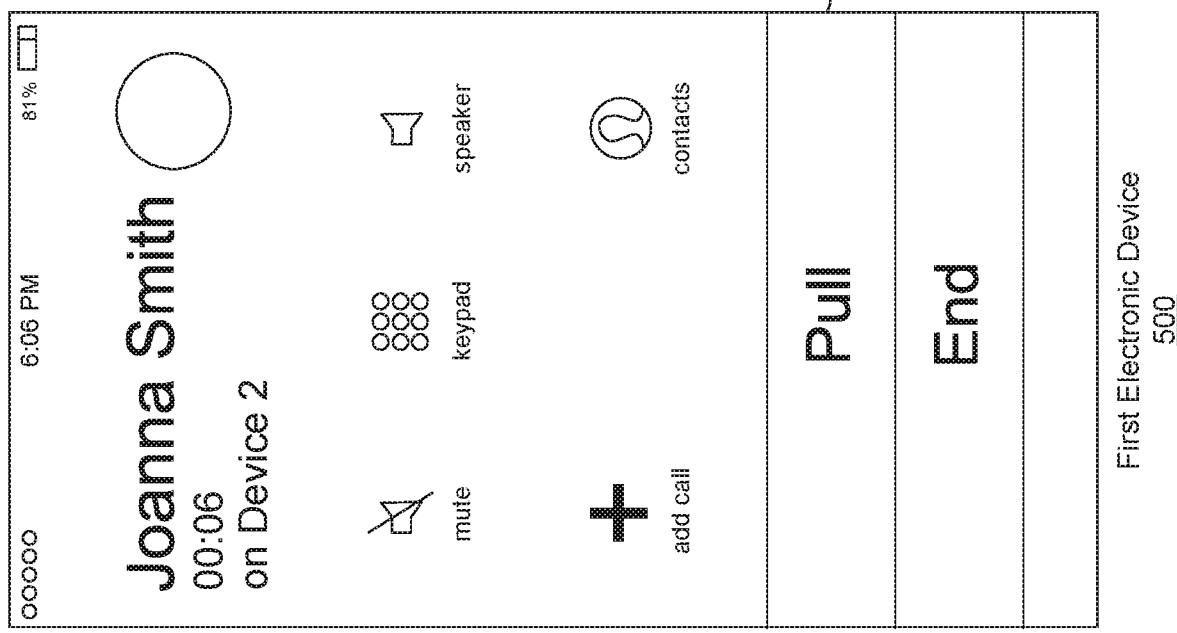
Figure 10I:
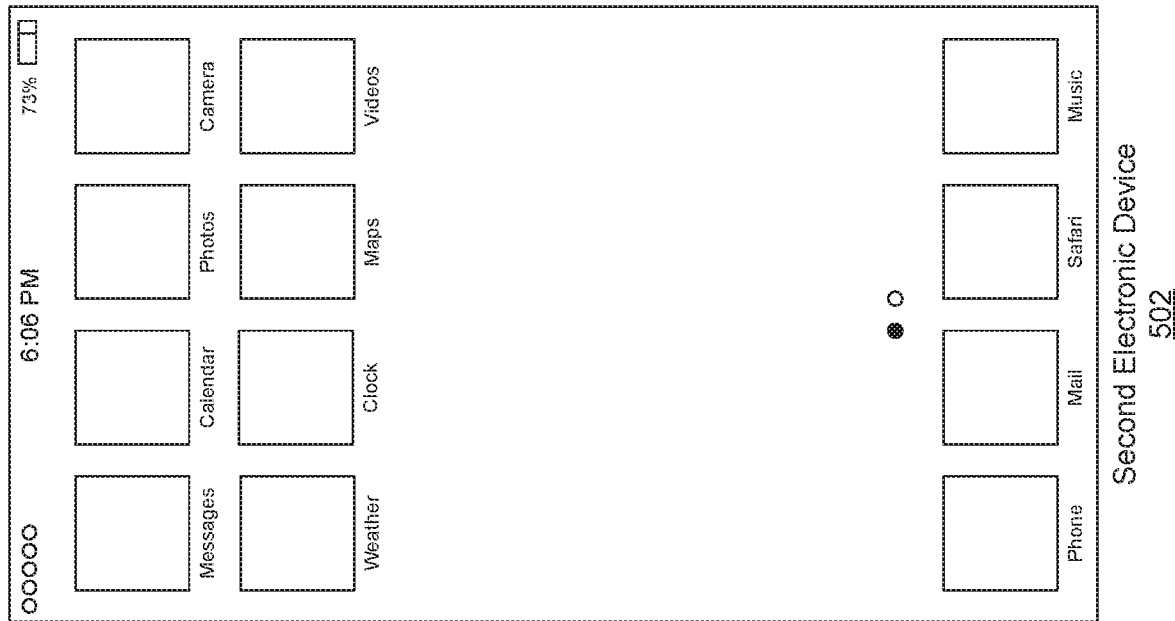
Figure 10I:
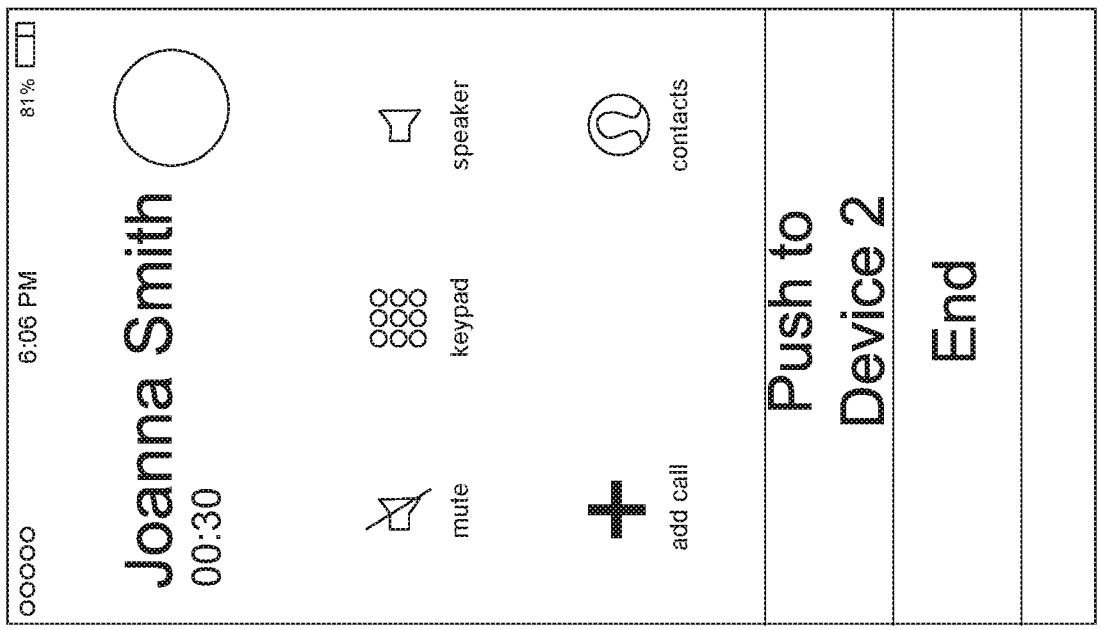

In some embodiments, after pushing the phone call to the second electronic device, the first electronic device optionally displays a phone call user interface including an affordance 1032 for causing the call data to be routed back to the first electronic device, as illustrated in FIG. 10H. In response to detecting selection of the affordance, the first electronic device optionally causes the phone call to be routed back to the first electronic device, as illustrated in FIG. 10I.

Figure 11A:
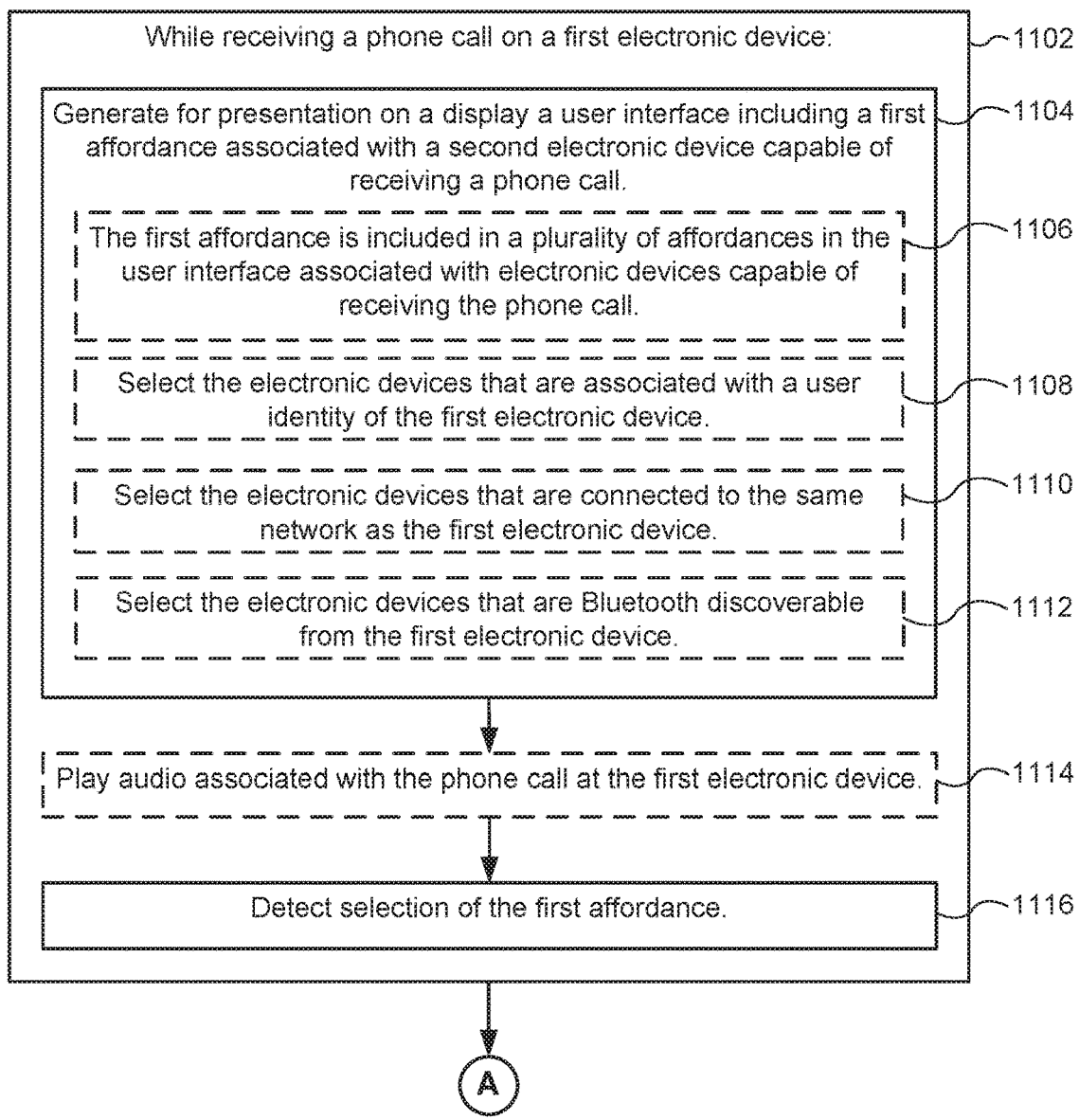
FIGS. 11A-11C are flow diagrams illustrating a method of pushing a phone call from a first electronic device to a second electronic device in accordance with some embodiments.
Figure 11B:
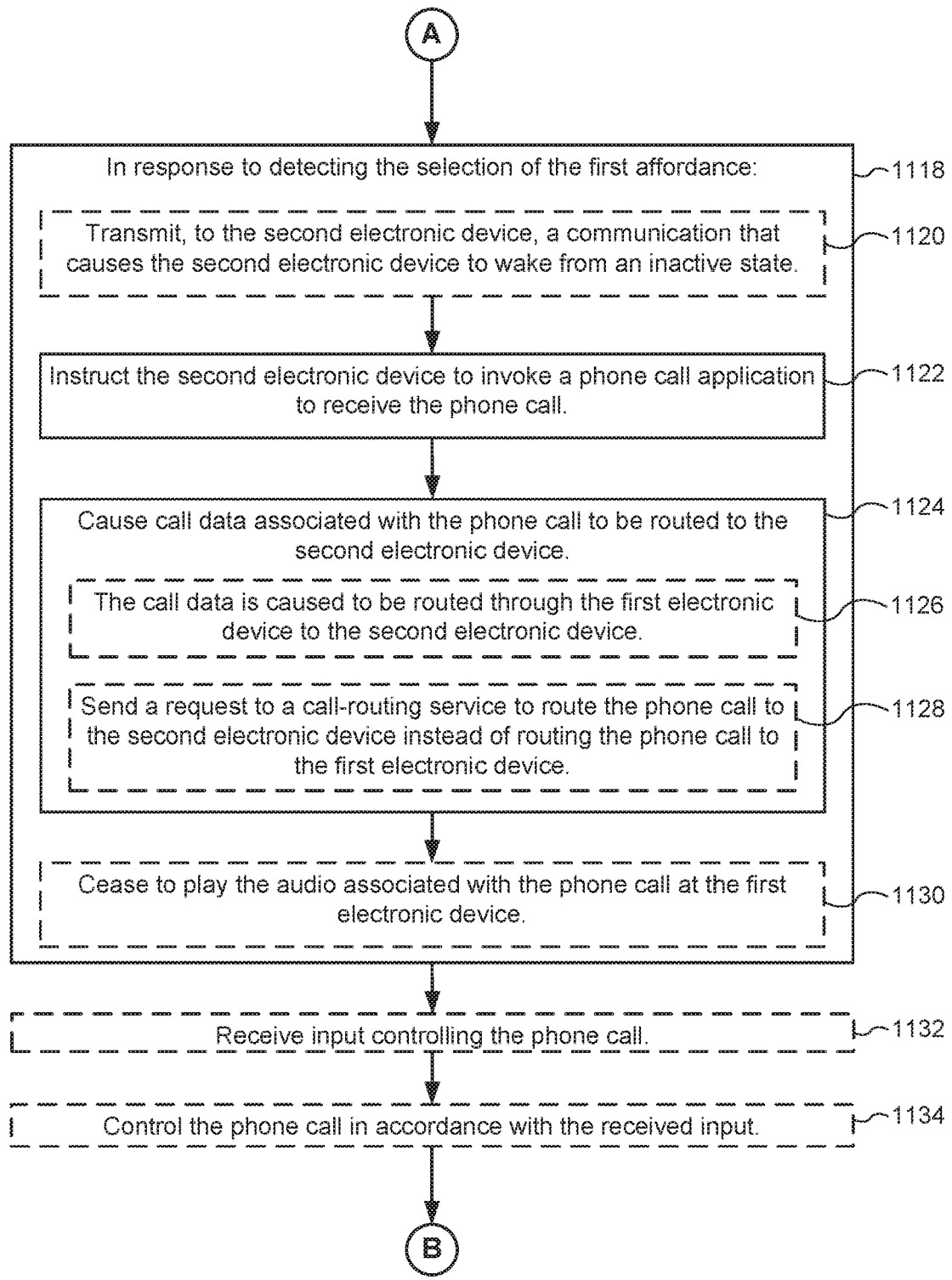
Figure 11C:
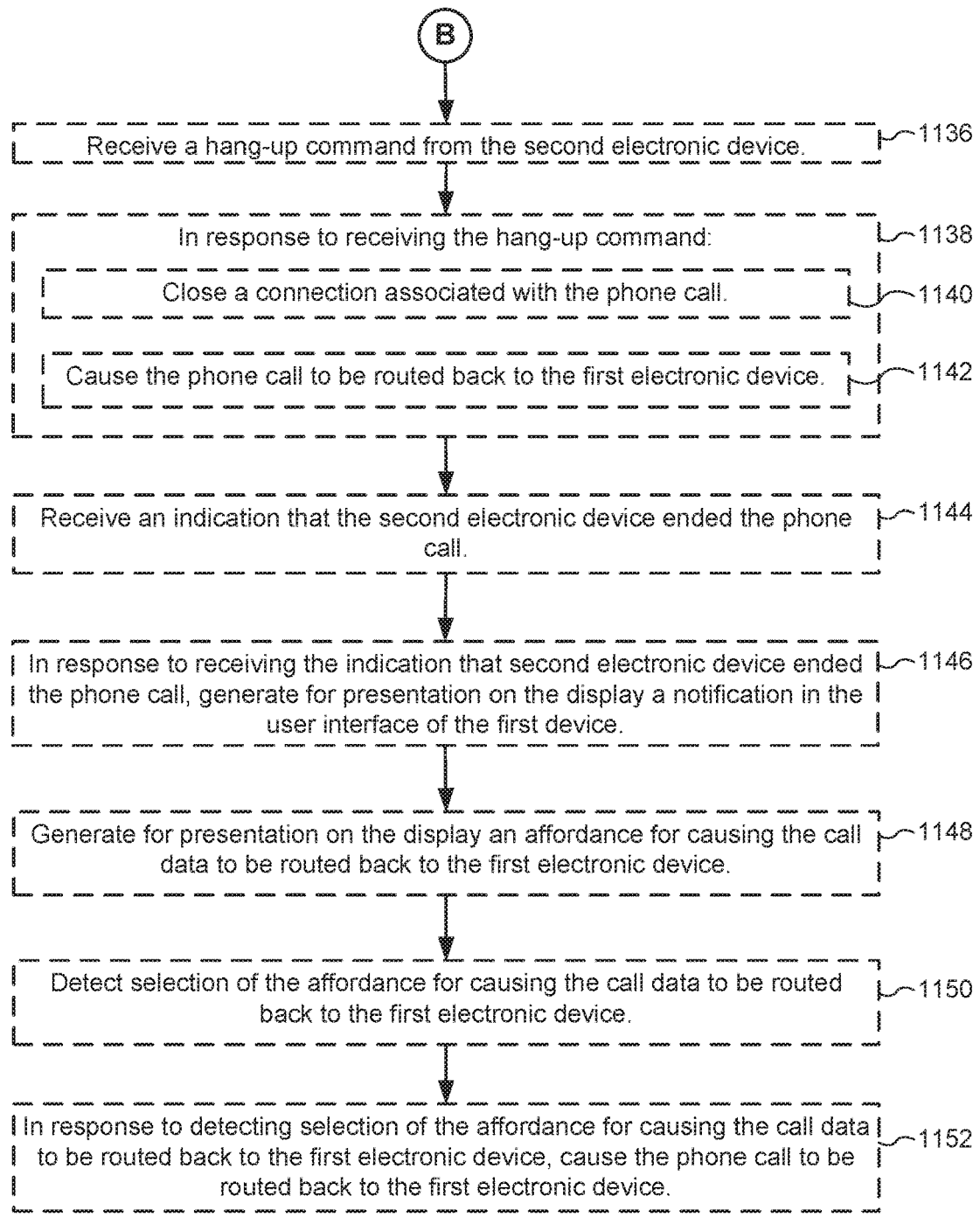

FIGS. 11A-11C are flow diagrams illustrating a method of pushing a phone call from a first electronic device to a second electronic device in accordance with some embodiments. The method is optionally performed at an electronic device as described above with reference to FIGS. 1-5 (e.g., electronic device 100, 300, 500, or 502, etc.). Some operations in method 1100 are, optionally, combined and/or the order of some operations is, optionally, changed.

As described below, the method 1100 provides ways of pushing a phone call from a first electronic device to a second electronic device. The method reduces the cognitive burden on a user when interacting with a user interface on the device by providing an intuitive user interface for routing a phone call among electronic devices, thereby creating a more efficient human-machine interface. For battery-operated electronic devices, increasing the efficiency of the user's interaction with the user interfaces conserves power and increases the time between battery charges.

In some embodiments, while receiving a phone call on a first electronic device 500 with one or more processors and memory (1102), the first electronic device generates (1104) for presentation on a display (e.g., a remote display device or a display that is integrated into the electronic device, such as displays 112, 340, and/or 450 in FIGS. 1-4) a user interface including a first affordance associated with a second electronic device 502 capable of receiving the phone call (e.g., a phone, a tablet, a computer, etc.). For example, FIG. 10A illustrates a user interface including a first affordance 1002 associated with the second electronic device.

The first electronic device detects (1116) selection of the first affordance (e.g., touch input on the first affordance, a click, a key press, etc.).

In response to detecting the selection of the first affordance (1118), the first electronic device instructs (1122) the second electronic device to invoke a phone call application to receive the phone call. For example, FIG. 10D illustrates the second electronic device displaying a user interface of a phone call application to receive the phone call. In some embodiments, in response to detecting selection of the first affordance (1118), the first electronic device transmits (1120), to the second electronic device, a communication that causes the second electronic device to wake from an inactive state (and/or unlock from a locked state). FIG. 10C illustrates the second electronic device in an inactive state (prior to receiving a communication causing it to wake from the inactive state). The phone call application is optionally invoked after the second electronic device wakes from the inactive state.

Further in response to detecting the selection of the first affordance (1118), the first electronic device causes (1124) call data associated with the phone call to be routed to the second electronic device (e.g., by routing the call data through the first electronic device, by instructing a carrier associated with the phone call to route the phone call to the second electronic device, etc.).

In some embodiments, after causing the call data to be routed to the second electronic device, the first electronic device receives (1132) input controlling the phone call (e.g., mute the call, put the call on hold, hang-up the call, etc.). For example, the first electronic device optionally receives input on phone call controls 1016-1026 illustrated in FIG. 10E. The first electronic device optionally controls the phone call in accordance with the received input (e.g., by sending to the second electronic device a corresponding command to mute the call, put the call on hold, hang-up the call, etc.).

In some embodiments, the first electronic device receives (1136) a hang-up command from the second electronic device. For example, a hang-up command is optionally sent by the second electronic device in response to input selecting the end call control 1028 illustrated in FIG. 10F. In response to receiving the hang-up command (1138), the first electronic device optionally closes (1140) a connection associated with the phone call. In some embodiments, in response to receiving the hang-up command (1138), the first electronic device optionally causes (1142) the phone call to be routed back to the first electronic device (e.g., instead of closing the connection).

In some embodiments, the first electronic device optionally receives (1144) an indication that the second electronic device ended the phone call. In response to receiving the indication that the second electronic device ended the phone call, the first electronic device optionally generates (1146) for presentation on the display a notification in the user interface of the first device (e.g., cease to display the call in progress status bar at the top of the display). For example, FIG. 10G illustrated the first electronic device displaying a notification 1030 that the second electronic device ended the phone call (e.g., "Call hang-up on Device 2 at 00:06").

In some embodiments, the call data is optionally caused (1126) to be routed through the first electronic device to the second electronic device (e.g., using through-device routing, as described above). In some embodiments, causing the call data to be routed to the second electronic device includes sending (1128) a request to a call-routing service to route the phone call to the second electronic device instead of routing the phone call to the first electronic device (e.g., using routing-service routing, as described above).

In some embodiments, while receiving the phone call on the first electronic device (1102), the first electronic device plays (1114) audio associated with the phone call at the first electronic device (e.g., through speaker 111 illustrated in FIG. 1A). In response to detecting the selection of the first affordance (1118), the first electronic device optionally ceases (1130) to play the audio associated with the phone call at the first electronic device.

In some embodiments, the first affordance is optionally included (1106) in a plurality of affordances in the user interface associated with electronic devices capable of receiving the phone call. In some embodiments, generating the plurality of affordances optionally includes (1108) selecting the electronic devices that are associated with a user identity of the first electronic device. In some embodiments, generating the plurality of affordances optionally includes (1110) selecting the electronic devices that are connected to the same network as the first electronic device (e.g., the same WiFi, the same subnet, etc.). In some embodiments, generating the plurality of affordances optionally includes selecting (1112) the electronic devices that are Bluetooth discoverable from the first electronic device. For example, FIG. 10B illustrates a plurality of affordances 1004-1010 capable of receiving the phone call (and are optionally associated with the same user identity as the first electronic device, on the same network as the first electronic device, and/or Bluetooth discoverable from the first electronic device, among other possibilities; this allows routing only to devices that are compatible with the routing scheme and provides an element of security to the pushing/pulling/etc.).

In some embodiments, after causing the call data associated with the phone call to be routed to the second electronic device, the first electronic device optionally displays (1148) an affordance for causing the call data to be routed back to the first electronic device. For example, FIG. 10H illustrates the first electronic device displaying an affordance 1032 for causing the call data to be routed back to the first electronic device. In some embodiments, the first electronic device optionally detects (1152) selection of the affordance for causing the call data to be routed back to the first electronic device. In response to detecting selection of the affordance for causing the call data to be routed back to the first electronic device, the first electronic device optionally causes the phone call to be routed back to the first electronic device. For example, FIG. 10I illustrates the phone call presented on the second electronic device after selection of the affordance 1032 in FIG. 10H.

The operations in the information processing methods described above are, optionally, implemented by running one or more functional modules in an information processing apparatus such as general purpose processors (e.g., as described above with respect to FIGS. 1A and 3) or application specific chips.

The operations described above with reference to FIGS. 11A-11C are, optionally, implemented by components depicted in FIGS. 1A-1B. For example, generating operation 1104, detecting operation 1116, instructing operation 1122, and causing operation 1124 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations in FIGS. 11A-11C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 900) are also applicable in an analogous manner to method 1100 described above with respect to FIGS. 11A-11C. For example, the user interfaces, user interface objects, affordances, phone controls, phone calls, routing schemes, and electronic devices described above with reference to method 1100 optionally have one or more of the characteristics of the user interfaces, user interface objects, affordances, phone controls, phone calls, routing schemes, and electronic devices described herein with reference to other methods described herein (e.g., methods 700 and 900). For brevity, these details are not repeated here.

Figure 12:
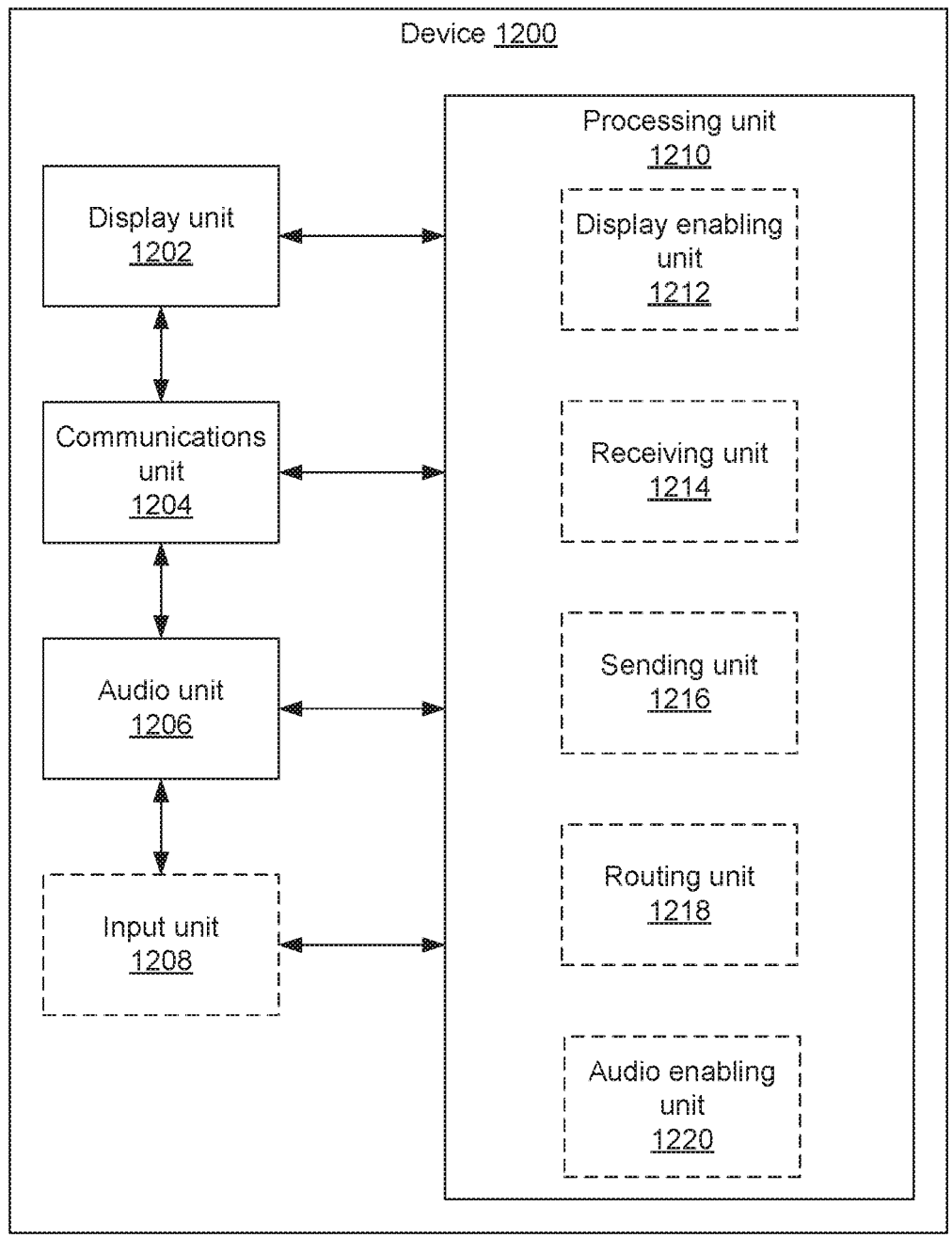
FIG. 12 shows a functional block diagram of an electronic device configured in accordance with the principles of the various described embodiments, in accordance with some embodiments of the disclosure.

In accordance with some embodiments, FIG. 12 shows a functional block diagram of an electronic device 1200 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein.

As shown in FIG. 12, an electronic device 1200 includes a display unit 1202 configured to display a user interface including one or more affordances and/or one or more user interface objects; a communications unit 1204 configured to send and receive call data, phone calls, commands, instructions, etc.; an audio unit 1206 to play audio (e.g., audio extracted from call data); optionally, an input unit 1208 to receive user input, selections, etc. (e.g., touch-sensitive surface, keyboard, mouse, or other input unit); and a processing unit 1210 coupled to the display unit 1202, the communications unit 1204, the audio unit 1206, and the input unit 1208. In some embodiments, the processing unit 1210 includes a display enabling unit 1212, a receiving unit 1214, a sending unit 1216, a routing unit 1218, and an audio enabling unit 1220.

In some embodiments, the processing unit 1210 is configured to receive, at the first electronic device, a phone call (e.g., with the receiving unit 1214) that was routed to the first electronic device by a call-routing service. The processing unit 1210 is further configured to, while receiving the phone call, receive a request (e.g., with the receiving unit 1214) to route the phone call to a second electronic device. The processing unit 1210 is further configured to, in response to receiving the request to route the phone call to the second electronic device, and in accordance with a determination that a first routing criteria have been met, send a request (e.g., with the sending unit 1216) to the call-routing service to route the phone call to the second electronic device instead of routing the phone call to the first electronic device. The processing unit 1210 is further configured to, in accordance with a determination that a second routing criteria have been met, cause call data associated with the phone call to be routed through the first electronic device to the second electronic device (e.g., with the routing unit 1218).

In some embodiments, the processing unit 1210 is configured to generate for presentation on a display a user interface (e.g., with the display enabling unit 1212) including a user interface object indicating that a phone call has been routed to a second electronic device. The processing unit 1210 is further configured to, while the user interface is presented on the display, receive a request (e.g., with the receiving unit 1214) to route the phone call to the first electronic device. The processing unit 1210 is further configured to, in response to the request, request (e.g., with the sending unit 1216) call data associated with the phone call. The processing unit 1210 is further configured to, after requesting the call data, present the phone call at the first electronic device (e.g., with the audio enabling unit 1220).

In some embodiments, the processing unit 1210 is configured to, while receiving a phone call on the first electronic device: generate for presentation on a display a user interface (e.g., with the display enabling unit 1212) including a first affordance associated with a second electronic device capable of receiving the phone call, and detect selection of the first affordance (e.g., with the receiving unit 1214). The processing unit 1210 is further configured to, in response to detecting the selection of the first affordance, instruct the second electronic device (e.g., with the sending unit 1216) to invoke a phone call application to receive the phone call, and cause call data associated with the phone call to be routed to the second electronic device (e.g., with the routing unit 1218).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A first electronic device, comprising:
one or more processors; and
memory storing one or more programs configured to be executed by the one or more processors, the one or more programs including instructions for:
   receiving, at the first electronic device, a phone call that was routed to the first electronic device by a call-routing service;
   while receiving the phone call, receiving a request to route the phone call to a second electronic device; and
   in response to receiving the request to route the phone call to the second electronic device:
      in accordance with a determination that a first routing criteria have been met, sending a request to the call-routing service to route the phone call to the second electronic device instead of routing the phone call to the first electronic device, wherein the first routing criteria include a criterion that is met when the call-routing service has enabled a carrier routing protocol; and
      in accordance with a determination that a second routing criteria have been met, causing call data associated with the phone call to be routed through the first electronic device to the second electronic device, wherein the second routing criteria include a criterion that is met when the call-routing service has not enabled the carrier routing protocol.

2. The first electronic device of claim 1, the one or more programs further including instructions for:
   before receiving the request to route the phone call, opening, at the first electronic device, a connection associated with the phone call; and
   in accordance with the determination that the first routing criteria have been met, closing the connection associated with the phone call.

3. The first electronic device of claim 2, wherein the connection associated with the phone call is closed in response to receiving confirmation that the second electronic device has opened a connection associated with the phone call.

4. The first electronic device of claim 2, the one or more programs further including instructions for:
   in accordance with the determination that the second routing criteria have been met, maintaining, on the first electronic device, the connection associated with the phone call for a duration of the phone call.

5. The first electronic device of claim 4, the one or more programs further including instructions for:
   receiving a hang-up command from the second electronic device; and
   in response to receiving the hang-up command, closing the connection associated with the phone call.

6. The first electronic device of claim 1, wherein causing call data associated with the phone call to be routed through the first electronic device to the second electronic device includes receiving the call data and sending different data to the second electronic device.

7. The first electronic device of claim 1, wherein causing call data associated with the phone call to be routed through the first electronic device to the second electronic device includes receiving the call data and sending the call data to the second electronic device without extracting audio content from the call data.

8. The first electronic device of claim 1, the one or more programs further including instructions for:
   in accordance with the determination that the second routing criteria have been met, displaying a user interface object indicating the phone call is routed through the first electronic device.

9. The first electronic device of claim 8, the one or more programs further including instructions for:
   receiving input that corresponds to selection of the user interface object; and
   in response to receiving the input, causing the call data to no longer be routed to the second electronic device.

10. The first electronic device of claim 8, the one or more programs further including instructions for:
    in accordance with the determination that the first routing criteria have been met, displaying another user interface object indicating the phone call has been routed to the second electronic device.

11. The first electronic device of claim 1, wherein the request to route the phone call to the second electronic device is received from the second electronic device.

12. The first electronic device of claim 1, wherein the request to route the phone call to the second electronic device corresponds to user input received at the first electronic device.

13. The first electronic device of claim 1, the one or more programs further including instructions for:
    in accordance with the determination that the second routing criteria have been met, causing additional data to be routed to the second electronic device.

14. A non-transitory computer-readable storage medium storing one or more programs configured to be executed by one or more processors of a first electronic device, the one or more programs including instructions for:
    receiving, at the first electronic device, a phone call that was routed to the first electronic device by a call-routing service;
    while receiving the phone call, receiving a request to route the phone call to a second electronic device; and
    in response to receiving the request to route the phone call to the second electronic device:
       in accordance with a determination that a first routing criteria have been met, sending a request to the call-routing service to route the phone call to the second electronic device instead of routing the phone call to the first electronic device, wherein the first routing criteria include a criterion that is met when the call-routing service has enabled a carrier routing protocol; and
       in accordance with a determination that a second routing criteria have been met, causing call data associated with the phone call to be routed through the first electronic device to the second electronic device, wherein the second routing criteria include a criterion that is met when the call-routing service has not enabled the carrier routing protocol.

15. The non-transitory computer-readable storage medium of claim 14, wherein the one or more programs further comprises instructions for:
    before receiving the request to route the phone call, opening, at the first electronic device, a connection associated with the phone call; and
    in accordance with the determination that the first routing criteria have been met, closing the connection associated with the phone call.

16. The non-transitory computer-readable storage medium of claim 15, wherein the connection associated with the phone call is closed in response to receiving confirmation that the second electronic device has opened a connection associated with the phone call.

17. The non-transitory computer-readable storage medium of claim 15, wherein the one or more programs further comprises instructions for:
    in accordance with the determination that the second routing criteria have been met, maintaining, on the first electronic device, the connection associated with the phone call for a duration of the phone call.

18. The non-transitory computer-readable storage medium of claim 17, wherein the one or more programs further comprises instructions for:
    receiving a hang-up command from the second electronic device; and
    in response to receiving the hang-up command, closing the connection associated with the phone call.

19. The non-transitory computer-readable storage medium of claim 14, wherein causing call data associated with the phone call to be routed through the first electronic device to the second electronic device includes receiving the call data and sending different data to the second electronic device.

20. The non-transitory computer-readable storage medium of claim 14, wherein causing call data associated with the phone call to be routed through the first electronic device to the second electronic device includes receiving the call data and sending the call data to the second electronic device without extracting audio content from the call data.

21. The non-transitory computer-readable storage medium of claim 14, wherein the one or more programs further comprises instructions for:
    in accordance with the determination that the second routing criteria have been met, displaying a user interface object indicating the phone call is routed through the first electronic device.

22. The non-transitory computer-readable storage medium of claim 21, wherein the one or more programs further comprises instructions for:
    receiving input that corresponds to selection of the user interface object; and
    in response to receiving the input, causing the call data to no longer be routed to the second electronic device.

23. The non-transitory computer-readable storage medium of claim 21, wherein the one or more programs further comprises instructions for:
    in accordance with the determination that the first routing criteria have been met, displaying another user interface object indicating the phone call has been routed to the second electronic device.

24. The non-transitory computer-readable storage medium of claim 14, wherein the request to route the phone call to the second electronic device is received from the second electronic device.

25. The non-transitory computer-readable storage medium of claim 14, wherein the request to route the phone call to the second electronic device corresponds to user input received at the first electronic device.

26. The non-transitory computer-readable storage medium of claim 14, wherein the one or more programs further comprises instructions for:

in accordance with the determination that the second routing criteria have been met, causing additional data to be routed to the second electronic device.

27. A method, comprising:

at a first electronic device:

receiving, at the first electronic device, a phone call that was routed to the first electronic device by a call-routing service;

while receiving the phone call, receiving a request to route the phone call to a second electronic device; and in response to receiving the request to route the phone call to the second electronic device:

in accordance with a determination that a first routing criteria have been met, sending a request to the call-routing service to route the phone call to the second electronic device instead of routing the phone call to the first electronic device, wherein the first routing criteria include a criterion that is met when the call-routing service has enabled a carrier routing protocol; and in accordance with a determination that a second routing criteria have been met, causing call data associated with the phone call to be routed through the first electronic device to the second electronic device, wherein the second routing criteria include a criterion that is met when the call-routing service has not enabled the carrier routing protocol.

28. The method of claim 27, further comprising:

before receiving the request to route the phone call, opening, at the first electronic device, a connection associated with the phone call; and in accordance with the determination that the first routing criteria have been met, closing the connection associated with the phone call.

29. The method of claim 28, wherein the connection associated with the phone call is closed in response to receiving confirmation that the second electronic device has opened a connection associated with the phone call.

30. The method of claim 28, further comprising:

in accordance with the determination that the second routing criteria have been met, maintaining, on the first electronic device, the connection associated with the phone call for a duration of the phone call.

31. The method of claim 30, further comprising:

receiving a hang-up command from the second electronic device; and in response to receiving the hang-up command, closing the connection associated with the phone call.

32. The method of claim 27, wherein causing call data associated with the phone call to be routed through the first electronic device to the second electronic device includes receiving the call data and sending different data to the second electronic device.

33. The method of claim 27, wherein causing call data associated with the phone call to be routed through the first electronic device to the second electronic device includes receiving the call data and sending the call data to the second electronic device without extracting audio content from the call data.

34. The method of claim 27, further comprising:

in accordance with the determination that the second routing criteria have been met, displaying a user interface object indicating the phone call is routed through the first electronic device.

35. The method of claim 34, further comprising:

receiving input that corresponds to selection of the user interface object; and in response to receiving the input, causing the call data to no longer be routed to the second electronic device.

36. The method of claim 34, further comprising:

in accordance with the determination that the first routing criteria have been met, displaying another user interface object indicating the phone call has been routed to the second electronic device.

37. The method of claim 27, wherein the request to route the phone call to the second electronic device is received from the second electronic device.

38. The method of claim 27, wherein the request to route the phone call to the second electronic device corresponds to user input received at the first electronic device.

39. The method of claim 27, further comprising:

in accordance with the determination that the second routing criteria have been met, causing additional data to be routed to the second electronic device.

* * * * *